US012318698B1

(12) United States Patent
Wakeford et al.

(10) Patent No.: US 12,318,698 B1
(45) Date of Patent: *Jun. 3, 2025

(54) SYSTEMS AND METHODS FOR ADJUSTING ONLINE GAME CONTENT AND ACCESS FOR MULTIPLE PLATFORMS

(71) Applicant: Electronic Arts Inc., Redwood City, CA (US)

(72) Inventors: Kent Wakeford, Hillsborough, CA (US); Tomi Huttula, San Rafael, CA (US)

(73) Assignee: Electronic Arts Inc., Redwood City, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 17/809,477

(22) Filed: Jun. 28, 2022

Related U.S. Application Data

(63) Continuation of application No. 16/800,325, filed on Feb. 25, 2020, now Pat. No. 11,383,169, which is a continuation of application No. 16/046,350, filed on Jul. 26, 2018, now Pat. No. 10,576,379, which is a continuation-in-part of application No. 15/925,441, filed on Mar. 19, 2018, now Pat. No. 10,183,223, and (Continued)

(51) Int. Cl.
| A63F 13/00 | (2014.01) |
| A63F 13/285 | (2014.01) |
| A63F 13/73 | (2014.01) |
| A63F 13/77 | (2014.01) |
| A63F 13/79 | (2014.01) |
| G06F 3/01 | (2006.01) |
| A63F 13/211 | (2014.01) |

(52) U.S. Cl.
CPC ............ *A63F 13/77* (2014.09); *A63F 13/285* (2014.09); *A63F 13/73* (2014.09); *A63F 13/79* (2014.09); *G06F 3/011* (2013.01); *A63F 13/211* (2014.09); *A63F 2300/5593* (2013.01)

(58) Field of Classification Search
None
See application file for complete search history.

(56) References Cited

U.S. PATENT DOCUMENTS

| 5,331,353 A | 7/1994 | Levenson et al. |
| 6,527,641 B1 | 3/2003 | Sinclair |

(Continued)

FOREIGN PATENT DOCUMENTS

WO    WO 2014/210286    12/2014

OTHER PUBLICATIONS

"Difference in Gameplay Mechanics Between Gold, Silver and Bronze" [online], Apr. 2, 2012 [retrieved Jan. 6, 2015]. Retrieved from the Internet <URL:http://forum.bioware.com/topic/309690-difference-in-gameplay-mechanicsbetween-gold-silver-and-bronze/>, 7 pages.

(Continued)

*Primary Examiner* — Paul A D'Agostino
(74) *Attorney, Agent, or Firm* — Knobbe, Martens, Olson & Bear, LLP

(57) ABSTRACT

Embodiments of systems and methods for enabling access to an online game, modifying user progress within the online game, monitoring user interactions with the online game, or adjusting user gameplay with the online game, via multiple platforms. The multiple platforms may include virtual reality platforms and non-virtual reality platforms.

20 Claims, 22 Drawing Sheets

Related U.S. Application Data a continuation-in-part of application No. 15/905,549, filed on Feb. 26, 2018, now Pat. No. 10,232,271, and a continuation-in-part of application No. 15/048,920, filed on Feb. 19, 2016, now Pat. No. 10,035,068, and a continuation-in-part of application No. 15/048,903, filed on Feb. 19, 2016, now Pat. No. 10,096,204, said application No. 15/925,441 is a continuation of application No. 15/048,958, filed on Feb. 19, 2016, now Pat. No. 9,919,218, said application No. 16/046,350 is a continuation-in-part of application No. 15/048,947, filed on Feb. 19, 2016, now Pat. No. 10,134,227, said application No. 15/905,549 is a continuation of application No. 15/048,932, filed on Feb. 19, 2016, now Pat. No. 9,901,818.

(56) References Cited

U.S. PATENT DOCUMENTS

| | | |
|---|---|---|
| 6,722,984 B1 | 4/2004 | Sweeney et al. |
| 6,896,618 B2 | 5/2005 | Benoy et al. |
| 6,913,536 B2 | 7/2005 | Tomizawa et al. |
| 7,713,118 B2 | 5/2010 | Roemer |
| 8,147,328 B2 | 4/2012 | Carroll et al. |
| 8,246,466 B2 | 8/2012 | Herrmann et al. |
| 8,255,297 B2 | 8/2012 | Morgenstern et al. |
| 8,287,383 B1 | 10/2012 | Etter et al. |
| 8,292,743 B1 | 10/2012 | Etter et al. |
| 8,296,781 B1 | 10/2012 | Lebaredian et al. |
| 8,328,642 B2 | 12/2012 | Mosites et al. |
| 8,348,747 B2 | 1/2013 | Arezina et al. |
| 8,360,870 B2 | 1/2013 | Herrmann et al. |
| 8,366,550 B2 | 2/2013 | Herrmann et al. |
| 8,388,452 B2 | 3/2013 | Auterio et al. |
| 8,527,332 B2 | 9/2013 | Selby |
| 8,595,336 B1 | 11/2013 | Tsern |
| 8,663,004 B1 | 3/2014 | Xu |
| 8,814,691 B2 | 8/2014 | Haddick et al. |
| 8,888,585 B1 | 11/2014 | Beechey |
| 8,944,908 B1 | 2/2015 | Wakeford et al. |
| 9,104,886 B1 | 8/2015 | Dolbakian et al. |
| 9,205,338 B1 | 12/2015 | Wakeford et al. |
| 9,224,060 B1 | 12/2015 | Ramaswamy |
| 9,555,324 B1 | 1/2017 | Harrington et al. |
| 9,669,296 B1 | 6/2017 | Hibbert et al. |
| 9,901,818 B1 | 2/2018 | Wakeford et al. |
| 9,919,218 B1 | 3/2018 | Wakeford et al. |
| 10,035,068 B1 | 7/2018 | Wakeford et al. |
| 10,096,204 B1* | 10/2018 | Wakeford ........... G07F 17/3241 |
| 10,127,769 B2 | 11/2018 | Harrington et al. |
| 10,134,227 B1 | 11/2018 | Wakeford et al. |
| 10,183,223 B2 | 1/2019 | Wakeford et al. |
| 10,232,271 B2 | 3/2019 | Wakeford et al. |
| 10,576,379 B1* | 3/2020 | Wakeford ............... A63F 13/73 |
| 2002/0090985 A1 | 7/2002 | Tochner et al. |
| 2002/0158917 A1 | 10/2002 | Sinclair et al. |
| 2003/0119576 A1 | 6/2003 | McClintic et al. |
| 2003/0119581 A1 | 6/2003 | Cannon et al. |
| 2003/0211889 A1 | 11/2003 | Walker et al. |
| 2005/0054439 A1 | 3/2005 | Rowe et al. |
| 2005/0076002 A1 | 4/2005 | Williams et al. |
| 2005/0113164 A1 | 5/2005 | Bueche et al. |
| 2005/0192097 A1 | 9/2005 | Farnham et al. |
| 2005/0282638 A1 | 12/2005 | Rowe |
| 2006/0105838 A1 | 5/2006 | Mullen |
| 2006/0287080 A1 | 12/2006 | Bychkov |
| 2007/0004496 A1 | 1/2007 | Gordon et al. |
| 2007/0013515 A1 | 1/2007 | Johnson et al. |
| 2007/0066403 A1 | 3/2007 | Conkwright |
| 2007/0132785 A1* | 6/2007 | Ebersole, Jr. ......... A63F 13/213 |
| | | 345/633 |
| 2007/0173323 A1 | 7/2007 | Johnson et al. |
| 2008/0182664 A1 | 7/2008 | Kaplan et al. |
| 2008/0200244 A1 | 8/2008 | Rowe et al. |
| 2008/0234034 A1 | 9/2008 | Tessmer et al. |
| 2008/0266250 A1 | 10/2008 | Jacob |
| 2008/0293466 A1 | 11/2008 | Arakawa et al. |
| 2008/0300049 A1 | 12/2008 | Anderson |
| 2008/0300055 A1 | 12/2008 | Lutnick et al. |
| 2008/0318668 A1 | 12/2008 | Ching et al. |
| 2009/0051114 A1 | 2/2009 | Robbers et al. |
| 2009/0077463 A1 | 3/2009 | Koster |
| 2009/0181771 A1 | 7/2009 | Sogabe |
| 2009/0181774 A1 | 7/2009 | Ratcliff |
| 2009/0183226 A1 | 7/2009 | Dean et al. |
| 2009/0251457 A1 | 10/2009 | Walker et al. |
| 2009/0318232 A1 | 12/2009 | Harris |
| 2010/0046553 A1 | 2/2010 | Daigle et al. |
| 2010/0056243 A1 | 3/2010 | Czyzewski et al. |
| 2010/0093434 A1 | 4/2010 | Rivas |
| 2010/0144424 A1 | 6/2010 | Rodgers et al. |
| 2010/0166065 A1 | 7/2010 | Perlman et al. |
| 2010/0273557 A1 | 10/2010 | Miyaki |
| 2010/0279762 A1 | 11/2010 | Sohn et al. |
| 2010/0304839 A1 | 12/2010 | Johnson |
| 2011/0093361 A1 | 4/2011 | Morales |
| 2011/0106607 A1 | 5/2011 | Alfonso et al. |
| 2011/0118022 A1 | 5/2011 | Aronzon et al. |
| 2011/0252079 A1 | 10/2011 | Werner et al. |
| 2011/0264246 A1 | 10/2011 | Pantoja et al. |
| 2011/0312423 A1 | 12/2011 | Nosites et al. |
| 2012/0009997 A1 | 1/2012 | Youm |
| 2012/0127284 A1 | 5/2012 | Bar-Zeev et al. |
| 2012/0129598 A1 | 5/2012 | Chao et al. |
| 2012/0150695 A1 | 6/2012 | Fan et al. |
| 2012/0172098 A1 | 7/2012 | Baker et al. |
| 2012/0244948 A1 | 9/2012 | Dhillon et al. |
| 2012/0244950 A1 | 9/2012 | Braun |
| 2012/0246301 A1 | 9/2012 | Vyrros et al. |
| 2012/0256954 A1* | 10/2012 | Soon-Shiong ........ A63F 13/335 |
| | | 345/633 |
| 2012/0258802 A1 | 10/2012 | Weston |
| 2012/0270623 A1 | 10/2012 | Walker et al. |
| 2012/0316999 A1 | 12/2012 | Koh et al. |
| 2012/0322545 A1 | 12/2012 | Arnone et al. |
| 2012/0329551 A1 | 12/2012 | Arezina et al. |
| 2013/0005437 A1 | 1/2013 | Bethke et al. |
| 2013/0014033 A1 | 1/2013 | Hamick et al. |
| 2013/0016123 A1* | 1/2013 | Skarulis .................. G06F 3/147 |
| | | 345/633 |
| 2013/0017870 A1 | 1/2013 | Parker et al. |
| 2013/0045804 A1 | 2/2013 | Ruke |
| 2013/0061260 A1 | 3/2013 | Maskatia et al. |
| 2013/0066695 A1 | 3/2013 | Just |
| 2013/0079082 A1 | 3/2013 | Bancel et al. |
| 2013/0079145 A1 | 3/2013 | Lam et al. |
| 2013/0085838 A1 | 4/2013 | Tennenholtz et al. |
| 2013/0137522 A1 | 5/2013 | Kusano et al. |
| 2013/0159519 A1 | 6/2013 | Hochberg et al. |
| 2013/0172085 A1 | 7/2013 | Harrington et al. |
| 2013/0184064 A1 | 7/2013 | Manning et al. |
| 2013/0196757 A1 | 8/2013 | Latta et al. |
| 2013/0225305 A1 | 8/2013 | Yang et al. |
| 2013/0254660 A1 | 9/2013 | Fujioka |
| 2013/0289744 A1 | 10/2013 | Bavar et al. |
| 2014/0024445 A1 | 1/2014 | Aller et al. |
| 2014/0024464 A1 | 1/2014 | Belakovsky |
| 2014/0028850 A1 | 1/2014 | Keating et al. |
| 2014/0031129 A1 | 1/2014 | Morrison |
| 2014/0066176 A1 | 3/2014 | Letourneau et al. |
| 2014/0094315 A1 | 4/2014 | Stine et al. |
| 2014/0113716 A1 | 4/2014 | Mukhopadhyay |
| 2014/0121015 A1 | 5/2014 | Massing et al. |
| 2014/0122720 A1 | 5/2014 | Jung et al. |
| 2014/0128161 A1 | 5/2014 | Latta et al. |
| 2014/0129630 A1 | 5/2014 | Nikan |
| 2014/0180849 A1 | 6/2014 | Kimberg et al. |
| 2014/0192084 A1 | 7/2014 | Latta et al. |
| 2014/0221084 A1 | 8/2014 | Morrison et al. |
| 2014/0258394 A1 | 9/2014 | Lucero et al. |
| 2014/0274308 A1 | 9/2014 | Guinn et al. |
| 2014/0278686 A1 | 9/2014 | Mullings |
| 2014/0280504 A1 | 9/2014 | Cronin |

(56) References Cited

U.S. PATENT DOCUMENTS

| | | |
|---|---|---|
| 2014/0302915 A1 | 10/2014 | Lyons et al. |
| 2014/0309002 A1 | 10/2014 | O'Gorman |
| 2014/0329589 A1 | 11/2014 | Hawver |
| 2014/0342818 A1 | 11/2014 | Smith et al. |
| 2014/0357344 A1 | 12/2014 | Grier |
| 2014/0357370 A1 | 12/2014 | Soelberg et al. |
| 2014/0358651 A1 | 12/2014 | Koh et al. |
| 2014/0370992 A1 | 12/2014 | Cudak et al. |
| 2014/0378214 A1 | 12/2014 | Suzuki et al. |
| 2015/0005052 A1 | 1/2015 | Harrington et al. |
| 2015/0011277 A1 | 1/2015 | Wakeford et al. |
| 2015/0080083 A1 | 3/2015 | Tamaoki et al. |
| 2015/0080127 A1 | 3/2015 | Tamaoki et al. |
| 2015/0170455 A1 | 6/2015 | Rad |
| 2015/0242340 A1 | 8/2015 | Ishikawa et al. |
| 2015/0253574 A1 | 9/2015 | Thurber |
| 2015/0362733 A1 | 12/2015 | Spivack |
| 2015/0372998 A1 | 12/2015 | Elien et al. |
| 2016/0012465 A1 | 1/2016 | Sharp |
| 2016/0035185 A1 | 2/2016 | Barrs et al. |
| 2016/0210618 A1 | 7/2016 | Pace et al. |
| 2016/0300388 A1 | 10/2016 | Stafford et al. |
| 2016/0352816 A1 | 12/2016 | Xiao |
| 2017/0135577 A1* | 5/2017 | Komogortsev ........ A61B 5/168 |
| 2017/0236445 A1 | 8/2017 | Nikolopoulos et al. |
| 2018/0178116 A1 | 6/2018 | Wakeford et al. |
| 2018/0317831 A1 | 11/2018 | Anderson et al. |
| 2023/0072423 A1* | 3/2023 | Osborn ................ G16H 20/30 |

OTHER PUBLICATIONS

A Cautious Celebration of Pay-or-Wait to Play Games, URL: http://www.michaelbraun.me/2014/07/a-cautious-celebration-of-pay-or-wait-to-play-games [retrieved Jan. 21, 2016] 3pgs.
Companion App (iFruit)-GTA 5 Wiki Guide-IGN, URL http:www.ign.com/wikis/gta-5/Companion-App-(iFruit)) [retrieved Jan. 20, 2016] 17pgs.
FIFA 16-Companion App-EA Sports, URL: https://www.easports.com/fifa/features/companion-app [retrieved Jan. 22, 2016] 5pgs.
PCT International Preliminary Report on Patentability for PCT/US2014/044297, dated Jan. 7, 2016, 6 pages.
The Free GTAV iFruit and Game Manual Companion Apps, URL: http://www.rockstargames.com/newswire/article/51371/the-free-gtav-ifruit-and-game-manual-companion-apps.html [retrieved on Jan. 20, 2016] 5 pgs.
The Queen's Wrath, URL: http://destiny.wikia.com/wiki/The-Queen's-Wrath [retrieved Jan. 22, 2016] 2 pgs.
Totilo, Assassin's Creed Unity Finally Drops App, Web Requirements for Unlocks [Update], Dated Feb. 18, 2015, 5pgs.
World of Warcraft Armory, URL: https://play.google.com/store/apps/details?id=com.blizzard.wow&hl=en [retrieved Jan. 20, 2016] 4pgs.

* cited by examiner

2400

| IDENTIFIER | PLATFORM |
|---|---|
| 1 | VR A |
| 2 | VR B |
| 3 | NON-VR A |
| 4 | NON-VR B |
| ... | ... |
| IDENTIFIER (N) | PLATFORM (N) |

| IDENTIFIER | GROUP ROLE |
|---|---|
| 1, 2 | GROUP ROLE A |
| 1 | GROUP ROLE B |
| 3 | GROUP ROLE C |
| 3, 4 | GROUP ROLE D |
| ... | ... |
| IDENTIFIER (N) | PLATFORM (N) |

FIG. 8

SYSTEMS AND METHODS FOR ADJUSTING ONLINE GAME CONTENT AND ACCESS FOR MULTIPLE PLATFORMS

INCORPORATION BY REFERENCE TO ANY PRIORITY APPLICATIONS

This application is a continuation of U.S. patent application Ser. No. 16/800,325, filed Feb. 25, 2020, which is a continuation of U.S. patent application Ser. No. 16/046,350, filed Jul. 26, 2018, which is a continuation-in-part of U.S. patent application Ser. No. 15/925,441, filed Mar. 19, 2018, now U.S. Pat. No. 10,183,223, which issued on Jan. 22, 2019, which is a continuation of U.S. patent application Ser. No. 15/048,958, filed Feb. 19, 2016, now U.S. Pat. No. 9,919,218, which issued on Mar. 20, 2018.

U.S. patent application Ser. No. 16/046,350 is also a continuation-in-part of U.S. patent application Ser. No. 15/905,549, filed Feb. 26, 2018, now U.S. Pat. No. 10,232,271, which issued on Mar. 19, 2019, which is a continuation of U.S. patent application Ser. No. 15/048,932, filed Feb. 19, 2016, now U.S. Pat. No. 9,901,818, which issued on Feb. 27, 2018.

U.S. patent application Ser. No. 16/046,350 is also a continuation-in-part of U.S. patent application Ser. No. 15/048,903, filed Feb. 19, 2016, now U.S. Pat. No. 10,096,204, which issued on Oct. 9, 2018.

U.S. patent application Ser. No. 16/046,350 is also a continuation-in-part of U.S. patent application Ser. No. 15/048,920, filed Feb. 19, 2016, now U.S. Pat. No. 10,035,068, which issued on Jul. 31, 2018. U.S. patent application Ser. No. 16/046,350 is also a continuation-in-part of U.S. patent application Ser. No. 15/048,947, filed Feb. 19, 2016, now U.S. Pat. No. 10,134,227, which issued on Nov. 20, 2018.

All applications and patents described above are hereby incorporated herein by reference in their entirety under 37 CFR 1.57.

BACKGROUND

Field of the Invention

This disclosure relates to systems and methods for determining, implementing, and providing platform specific virtual reality content in an online game and regulating access to the game content of the online game.

Description of the Related Art

Users may interact with online games via multiple platforms. Typically, online games are played via non-virtual reality platforms (e.g., mobile platform, computer, or game console). Virtual reality platforms may provide a more immersive nature of gameplay, and enhance the gaming experience for users.

Matching users of virtual reality platforms with users of non-virtual reality platforms may be difficult because users playing via virtual reality platforms may have greater interactive potential than users playing via non-virtual reality platforms. Systems and methods for increasing participation among users of virtual reality platforms may allow for greater interactions between users of virtual reality platforms.

Providing multiplayer games with alliance between users playing the online game via non-virtual reality platforms and virtual reality platforms presents challenges because users playing via virtual reality platforms may have greater interactive potential than users playing via non-virtual reality platforms.

Monetizing the online game in virtual-reality platforms may be a challenge because the immersion when playing the online game via a virtual reality may encourage some users to spend currency in the online game and/or discourage other users from spending currency. Some users may get too caught up in virtual reality, while others may be more invested and willing to spend. Encouraging users, having varying reactions to virtual reality immersion, to play the online game in a manner that most effectively encourages monetization presents a unique challenge for online game providers.

Incorporating virtual-reality platforms into online games accessible via mobile platforms presents a challenge because users may get caught up in virtual reality gameplay and avoid playing the online game via the mobile platforms. However, due to the immersive and restrictive nature of virtual reality, it may not be played as frequently or while a user is on-the-go. This may cause game providers to lose monetization of the online game via the mobile application play because users may stop playing the online game via the mobile platform once they have experienced virtual reality. Achieving a balance between enticing users to experience virtual reality without losing mobile platform gameplay presents a unique challenge for online game providers.

Incorporating virtual-reality platforms into online games accessible via mobile platforms presents a challenge because users may be hesitant to try virtual reality and/or users may get caught up in virtual reality game play and avoid playing the online game via the mobile platforms. Due to the immersive and restrictive nature of virtual reality, it may not be played as frequently or while a user is on-the-go. As such, game providers do not want to lose mobile application play because it may reduce the overall amount users play the game and/or spend money in the game. On the other hand, virtual reality increases in the level of interaction a user may experience with the online game. Achieving a balance between enticing users to experience virtual reality without losing mobile platform gameplay presents a unique challenge for online game providers.

SUMMARY

One aspect of the disclosure relates to systems and methods for providing virtual reality content in an online game. A game instance of the online game may be executed. The game instance may include the virtual reality content. Users of the online game may interact with the online game and/or each other via the users' client computing platforms. The client computing platforms may include virtual reality platforms and non-virtual reality platforms. In one aspect of the disclosure, virtual reality content in an online game may be provided by determining whether the users of the online game are attempting to join the game instance via the virtual reality platforms or the non-virtual reality platforms. Access to the game instance may be provided to users attempting to join the game instance via one or more of the virtual reality platforms. Access to the game instance may be denied to users attempting to join the game instance via one or more of the non-virtual reality platforms.

In one aspect of the disclosure, virtual reality content in an online game may be provided by determining a set of objectives to be achieved by the users. The set of objectives may include a first objective requiring one or more interactions of the users with the virtual reality content, a second objective not requiring the one or more interactions of the users with the virtual reality content, and/or other objectives. Users playing the online game via one or more of the virtual reality platforms during a time period may be required to achieve the first objective. Users playing the online game via one or more of the non-virtual reality platforms during the time period may be required to achieve the second objective.

In one aspect of the disclosure, virtual reality content in an online game may be provided by determining, for users interacting with the online game during a time period, one or more objectives to be achieved by the users to advance in the online game. The one or more objectives may require one or more interactions of the users with the virtual reality content. The users may be required to achieve the one or more objectives in the online game via operation of the virtual reality platforms.

Providing virtual reality content in an online game may be performed by one or more physical processors executing computer program components. In some implementations, the system may include one or more servers. The server(s) may be configured to communicate with one or more client computing platforms according to a client/server architecture. The users may access the system via client computing platform(s), for instance to engage in one or more games.

The physical processor(s) may be configured to execute one or more computer program components to provide virtual reality content in an online game. It is noted that the client computing platforms may include one or more computer program components that are the same as or similar to the computer program components of the physical processor(s) to facilitate in game actions.

In one aspect of the disclosure, the computer program components may include one or more of a game instance component, a platform component, an access component, and/or other components.

The game instance component may execute a game instance of the online game. The game instance may include the virtual reality content. In some implementations, the game instance of the online game may be executed during a time period. In some implementations, the time period may include a duration within 5 PM to 11 PM for a time zone in which the most number of users are located. In some implementations, the game instance of the online game may include a set of rewards for users interacting with the online game via the one or more of the virtual reality platforms. In some implementations, the game instance component may execute another instance of the online game. The other game instance may not include the virtual reality content.

The game instance component may use the game instance to generate game state information. The game state information may be transmitted to client computing platforms over a network. The game state information may facilitate presentation of views of the online game to users via the client computing platforms. The execution of the game instance may enable interaction by the users with the online game and/or each other by performing operations in the game instance in response to commands received over the network from the client computing platforms. The client computing platforms may include virtual reality platforms, non-virtual reality platforms, and/or other platforms.

In some implementations, the virtual reality platforms may include one or more of a virtual reality headset display, a motion controller, a haptic generator, and/or other virtual reality platforms. In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

The platform component may determine whether the users of the online game are attempting to join the game instance via the virtual reality platforms or the non-virtual reality platforms. The platform component may obtain client computing platform information. The client computing platform information may include information that identifies virtual reality capability of the client computing platform (e.g., virtual reality vs. non-virtual reality, etc.), a class of the client computing platform, a particular type of the client computing platform, and/or other information identifying the client computing platform. The client computing platform information may be obtained passively or actively.

The access component may, responsive to determination that an individual user is attempting to join the game instance via one or more of the virtual reality platforms, provide access to the game instance to such individual user. The access component may, responsive to determination that an individual user is attempting to join the game instance via one or more of the non-virtual reality platforms, deny access to the game instance to such individual user. In some implementations, the access component may, responsive to the determination that the individual user is attempting to join the game instance via the one or more of the non-virtual reality platforms, provide access to the other game instance to such individual user.

In some implementations, the access component may provide one or more rewards from a set of rewards to the users interacting with the online game via the one or more of the virtual reality platforms. In some implementations, the access component may provide the one or more rewards to the users interacting with the online game via the one or more of the virtual reality platforms in response to the users joining the game instance via the one or more of the virtual reality platforms during a time period. In some implementations, the access component may provide one or more rewards to the users interacting with the online game via the one or more of the virtual reality platforms in response to the users interacting with the game instance via the one or more of the virtual reality platforms for a certain duration within a time period.

In one aspect of the disclosure, the computer program components may include one or more of a game instance component, an objectives component, a platform component, a VR objectives component, a non-VR objectives component, and/or other components.

The game instance component may execute a game instance of the online game. The game instance may include the virtual reality content. The game instance component may use the game instance to generate game state information. The game state information may be transmitted to client computing platforms over a network. The game state information may facilitate presentation of views of the online game to users via the client computing platforms. The execution of the game instance may enable interaction by the users with the online game and/or each other by performing operations in the game instance in response to commands received over the network from the client computing platforms. The client computing platforms may include virtual reality platforms, non-virtual reality platforms, and/or other platforms.

The objectives component may determine a set of objectives to be achieved by the users. The set of objectives may include a first objective, a second objective, and/or other objectives. The first objective may require one or more interactions of the users with the virtual reality content. The second objective may not require the one or more interactions of the users with the virtual reality content.

In some implementations, the first objective may be characterized by a first game difficulty and the second objective may be characterized by a second game difficulty. The first game difficulty may be lower than the second game difficulty. In some implementations, the first objective may be characterized by a first type of gameplay and the second objective may be characterized by a second type of gameplay. The first type of gameplay may differ from the second type of gameplay. In some implementations, the first objective may be associated with a first reward and the second objective may be associated with a second reward. The first reward may differ from the second reward.

The platform component may determine whether the users of the online game are playing the online game via the virtual reality platforms or the non-virtual reality platforms during a time period. The platform component may obtain client computing platform information. The client computing platform information may include information that identifies virtual reality capability of the client computing platform (e.g., virtual reality vs. non-virtual reality, etc.), a class of the client computing platform, a particular type of the client computing platform, and/or other information identifying the client computing platform. The client computing platform information may be obtained passively or actively. In some implementations, the platform component may determine changes in the client computing platforms used by the users to interact with the online game during the time period.

The VR objectives component may, responsive to determination that an individual user is playing the online game via one or more of the virtual reality platforms during the time period, require such individual user to achieve the first objective in the online game via the one or more of the virtual reality platforms. In some implementations, the VR objectives component may, responsive to determination that an individual user changed from playing the online game via the one or more of the non-virtual reality platforms to the one or more of the virtual reality platforms during the time period, cancel the second objective for such individual user and require such individual user to achieve the first objective in the online game via the one or more of the virtual reality platforms. In some implementations, the VR objectives component may, responsive to determination that an individual user achieved the first objective, provide the first reward to such individual user.

The non-VR objectives component may, responsive to determination that an individual user is playing the online game via one or more of the non-virtual reality platforms during the time period, require such individual user to achieve the second objective in the online game via the one or more of the non-virtual reality platforms. In some implementations, the non-VR objectives component may, responsive to determination that an individual user changed from playing the online game via the one or more of the virtual reality platforms to the one or more of the non-virtual reality platforms during the time period, cancel the first objective for such individual user and require such individual user to achieve the second objective in the online game via the one or more of the non-virtual reality platforms. In some implementations, the non-VR objectives component may, responsive to determination that an individual user achieved the second objective, provide the second reward to such individual user.

In one aspect of the disclosure, the computer program components may include one or more of a game instance component, an objectives component, a progress component, and/or other components.

The game instance component execute a game instance of the online game during a time period. The game instance may include the virtual reality content. In some implementations, the game instance component may execute another instance of the online game. The other game instance may not include the virtual reality content.

The game instance component may use the game instance to generate game state information. The game state information may be transmitted to client computing platforms over a network. The game state information may facilitate presentation of views of the online game to users via the client computing platforms. The execution of the game instance may enable interaction by the users with the online game and/or each other by performing operations in the game instance in response to commands received over the network from the client computing platforms. The client computing platforms may include virtual reality platforms, non-virtual reality platforms, and/or other platforms.

The objectives component may, for users interacting with the online game during the time period, determine one or more objectives to be achieved by the users to advance in the online game. The one or more objectives may require one or more interactions of the users with the virtual reality content.

The progress component may require the users to achieve the one or more objectives in the online game via operation of the virtual reality platforms. In some implementations, the progress component may determine whether the users of the online game are playing the online game via the virtual reality platforms or the non-virtual reality platforms during the time period. The progress component may obtain client computing platform information. The client computing platform information may include information that identifies virtual reality capability of the client computing platform (e.g., virtual reality vs. non-virtual reality, etc.), a class of the client computing platform, a particular type of the client computing platform, and/or other information identifying the client computing platform. The client computing platform information may be obtained passively or actively.

In some implementations, the progress component may, responsive to determination that an individual user is playing the online game via one or more of the non-virtual reality platforms during the time period, effectuate presentation of an invitation to such user to change to one or more of the virtual reality platforms. In some implementations, the progress component may, responsive to determination that an individual user is playing the online game via one or more of the non-virtual reality platforms during the time period, provide access to the other game instance to such individual user.

One aspect of the disclosure relates to systems and methods for regulating access to game content of an online game. An online game may include game content that may be played cooperatively by groups of users. The game content may include a group roles set for the users in individual groups. The group roles set may include a first set of group roles, a second set of group roles, and/or other set(s) of group roles. Users of the online game may interact with the online game and/or each other via the users' client computing platforms. The client computing platforms may include virtual reality platforms and non-virtual reality platforms. Access to the game content of the online game may be regulated by executing a game instance of the online game and determining whether the users are attempting to play the game instance via the virtual reality platforms or the non-virtual reality platforms. The first set of group roles may be presented to users attempting to play the game instance via the virtual reality platforms. The second set of group roles may be presented to users attempting to play the game instance via the non-virtual reality platforms.

Regulating access to game content of an online game may be performed by one or more physical processors executing computer program components. In some implementations, the system may include one or more servers. The server(s) may be configured to communicate with one or more client computing platforms according to a client/server architecture. The users may access the system via client computing platform(s), for instance to engage in one or more games.

The physical processor(s) may be configured to execute one or more computer program components to regulate access to game content of an online game. The computer program components may include one or more of a game instance component, a platform component, a VR roles component, a non-VR roles component, and/or other components. It is noted that the client computing platforms may include one or more computer program components that are the same as or similar to the computer program components of the physical processor(s) to facilitate in game actions.

The game instance component may execute a game instance of the online game. The online game may include the game content that is played cooperatively by groups of users. The game content may include a group roles set for the users in individual groups. The group roles set may include a first set of group roles, a second set of group roles, and/or other set(s) of group roles. The first set of group roles may differ from the second set of group roles. In some implementations, the first set of group roles may be characterized by a first type of gameplay and the second set of group roles may be characterized by a second type of gameplay. The first type of gameplay may differ from the second type of gameplay.

The game instance component may use the game instance to generate game state information. The game state information may be transmitted to client computing platforms over a network. The game state information may facilitate presentation of views of the online game to users via the client computing platforms. The execution of the game instance may enable interaction by the users with the online game and/or each other by performing operations in the game instance in response to commands received over the network from the client computing platforms. The client computing platforms may include virtual reality platforms, non-virtual reality platforms, and/or other platforms.

In some implementations, the virtual reality platforms may include one or more of a virtual reality headset display, a motion controller, a haptic generator, and/or other virtual reality platforms. In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

The platform component may determine whether the users of the online game are attempting to play the game instance via the virtual reality platforms or the non-virtual reality platforms. The platform component may obtain client computing platform information. The client computing platform information may include information that identifies virtual reality capability of the client computing platform (e.g., virtual reality vs. non-virtual reality, etc.), a class of the client computing platform, a particular type of the client computing platform, and/or other information identifying the client computing platform. The client computing platform information may be obtained passively or actively. In some implementations, the platform component may determine changes in the client computing platforms used by the users to interact with the online game.

The VR roles component may, responsive to determination that an individual user is attempting to play the game instance via one or more of the virtual reality platforms, effectuate presentation of the first set of group roles to such individual user. In some implementations, the VR roles component may, responsive to determination that an individual user changed from playing the online game via the one or more of the non-virtual reality platforms to the one or more of the virtual reality platforms, effectuate presentation of the first set of group roles to such individual user.

In some implementations, effectuating presentation of the first set of group of roles may include receiving selection of a group role from the first set of group roles by the users attempting to play the game instance via one or more of the virtual reality platforms. In some implementations, effectuating presentation of the first set of group of roles may include selecting a group role from the first set of group roles for the users attempting to play the game instance via one or more of the virtual reality platforms. The selected group roles may be implemented for the users attempting to play the game instance via one or more of the virtual reality platforms.

The non-VR roles component may, responsive to determination that an individual user is attempting to play the game instance via one or more of the non-virtual reality platforms, effectuate presentation of the second set of group roles to such individual user. In some implementations, the non-VR roles component may, responsive to determination that an individual user changed from playing the online game via the one or more of the virtual reality platforms to the one or more of the non-virtual reality platforms, effectuate presentation of the second set of group roles to such individual user.

In some implementations, effectuating presentation of the second set of group of roles may include receiving selection of a group role from the second set of group roles by the users attempting to play the game instance via one or more of the non-virtual reality platforms. In some implementations, effectuating presentation of the second set of group of roles may include selecting a group role from the second set of group roles for the users attempting to play the game instance via one or more of the non-virtual reality platforms. The selected group roles may be implemented for the users attempting to play the game instance via one or more of the non-virtual reality platforms.

One aspect of the disclosure relates to determining and implementing platform specific online game customizations. The system may be configured to provide an online game that may be played via multiple platforms. The multiple platforms may include virtual reality platforms and non-virtual reality platforms. Interactions of the users with the online game when played through the virtual reality platforms and/or the non-virtual reality platforms may be monitored. The system may manage user profiles including user information based on the monitored interactions. User value metrics describing a given user's economic value to a game provider may be determined for the given user for a virtual reality platform associated with the given user, and for a non-virtual reality platform associated with the given user. Based on the user's economic value when playing the game via the virtual reality platform and/or when playing the game via the non-virtual reality platform, platform specific customizations may be determined. The platform specific customizations may be implemented when the given user plays the online game via the virtual reality platform and/or the non-virtual reality platform. As such, the game provider may push users to participate in an online game via a virtual reality platform and/or a non-virtual reality platform based on the user's value when playing the online game via the given platform.

A system for determining and implementing platform specific online game customizations may include one or more servers. The servers may operate in a client/server architecture with one or more client computing platforms. The client computing platforms may be associated with the users of the online game. The servers may be configured to execute one or more of: a game component, an interaction component, a user component, a valuation component, a customization component, and/or other components. The client computing platforms may be configured to execute one or more components the same as or similar to the servers.

The game component may be configured to execute a game instance of an online game played via multiple platforms. The multiple platforms may include virtual reality platforms and non-virtual reality platforms. For example, the virtual reality platforms may include a first platform associated with a first user. The non-virtual reality platforms may include a second platform associated with the first user. The game component may be configured to use the game instance to generate game state information that is transmitted to the client computing platforms over a network. The game state information may facilitate presentation of views of the online game to the users via the client computing platforms. The game component may transmit the game state information over the network to the client computing platforms. Transmitting the game state information may cause the client computing platforms to present views of the online game. Views of the online game presented via a virtual reality platform may include views presented on a head-mounted display device and/or other immersive views (e.g., causing the user to have the perception of being physically present in a virtual world). Views of the online game presented via a non-virtual reality platform may include views presented on a touch screen, mobile device display, television, computer monitor, and/or other displays (e.g., not fully immersive displays such that the user does not have the perception of being physically present in a virtual world).

Interaction component 3114 may be configured to monitor interactions of the users with the online game. The interaction component may monitor interactions of the users through the virtual reality platforms and/or the non-virtual reality platforms. For example, interactions of the first user with the online game when played through the first platform, the second platform, and/or any other platform may be monitored. Monitoring the interactions may include tracking and/or obtaining interaction information for storage in one or more user profiles associated with the users.

The user component may be configured to manage user profiles. The user profiles may include user information related to participating in the online game through the virtual reality platforms and/or the non-virtual reality platforms. The user information may include one or more of payment information, personal information, historic transaction information, character account information, platform information, and/or other information. The user information may be based on the interactions monitored. The user profiles may include a first user profile that includes user information for the first user. The user information for the first user may describe interactions of the first user with the online game when played through the first platform, the second platform, and/or any other platform.

The valuation component may be configured to determine user value metrics for the users on the virtual reality platforms and/or the non-virtual reality platforms. The user value metrics may indicate an economic value associated with a given user for a given platform. The valuation component may be configured to determine one or more of a first user value metric for the first user on the first platform (e.g., the virtual reality platform), a second user value metric for the first user on the second platform (e.g., the non-virtual reality platform), and/or other value metrics for the first user on other platforms. The valuation component may determine the user value metrics based on the user information stored in the user profiles. The first user value metric and the second user value metric may be determined based on the user information stored in the first user profile.

In some implementations, the user value metrics may include spend parameters. The spend parameters may indicate spending in the online game by individual ones of the users when playing the online game via the virtual reality platforms and/or the non-virtual reality platforms. The spend parameters may include one or more of: an amount of currency spent during a period of time, a total amount of currency spent, a spend velocity, an average amount of currency spent, a spend frequency, conversion rates of the different platforms, monetization through ads on the different platforms, and/or other spend parameters that impact value to the game provider.

The customization component may be configured to determine one or more platform specific game customizations for the online game. Platform specific customizations may include customizations and/or differences in the online game when played via a given platform associated with a user compared to when played via another platform associated with the user. One or more platform specific online game customizations may be determined based on the user value metrics for a given user. For example, a first game customization may be determined for the first platform (e.g., the virtual reality platform) and/or the second platform (e.g., the non-virtual reality platform) based on a comparison of the first user value metric and the second user value metric.

The platform specific customizations may include an alteration and/or customization of one or more aspects of the online game. The one or more aspects of the online game that may be customized may include one or more of: a reward, a strength and/or power of one or more user characters, a spawn rate or recovery rate of one or more user characters, a power of attacks, a resistance to attacks, speed or responsiveness of controlled units, a quality or effectiveness of virtual items, a quantity of available virtual items, availability of user actions, wait periods associated with one or more actions, and/or other customizations. The platform specific online game customizations may increase and/or decrease the difficulty of the online game when played via a given platform.

The customization component may be configured to implement one or more platform specific online game customizations determined. For example, the customization component may implement the first game customization that customizes one or more aspects of the online game for the first user when played via the first platform (e.g., the virtual reality platform) and/or when played via the second platform (e.g., the non-virtual reality platform). In some implementations, a user may and/or may not be made aware of the platform specific customizations. The customization component may be configured to effectuate presentation of a customization notification. The customization notification may include information indicating one or more of the customizations determined such that the first user is made aware that the first game customization impacts gameplay of the online game when played via the first platform or the second platform, but not when played via the non-customized platform. In some implementations, the user may not be made aware of a given game customization, and/or that the given game customization impacts gameplay of the online game when played via the first platform or the second platform, but not when played via a non-customized platform.

One aspect of the disclosure relates to making progress of a user character obtained in an online game via a non-virtual reality interface available in a virtual reality interface. The system may be configured to provide an online game that may be played via multiple platforms. The multiple platforms may include virtual reality platforms and non-virtual reality platforms. The non-virtual reality platforms may have limited functionality. For example, actions available to be performed via a non-virtual reality platform may be limited compared to those available to be performed via a virtual reality platform. Progress made by a user via the non-virtual reality platform may be monitored such that the user is awarded an amount of a virtual resource based on the progress. The user may request to exchange at least a portion of the virtual resource for an enhancement of the an ability for a virtual character. The system may receive the request and enhance the ability for the virtual character wherein the enhancement is reflected in the online game via the virtual reality platform. As such, the system and/or method described herein may encourage users to play the game and progress within the game via non-virtual reality platforms, while also incentivizing users within the virtual reality platform.

A system that makes progress of a user character obtained in an online game via a non-virtual reality interface available in a virtual reality interface may include one or more servers. The servers may operate in a client/server architecture with one or more client computing platforms. The client computing platforms may be associated with the users of the online game. The servers may be configured to execute one or more of: a game component, a gameplay component, a user component, an award component, an ability component, and/or other components. The client computing platforms may be configured to execute one or more components the same as or similar to the servers.

The game component may be configured to execute a game instance of an online game played via multiple platforms. The multiple platforms may include virtual reality platforms and non-virtual reality platforms. For example, the virtual reality platforms may include a first platform associated with a first user. The first platform may provide a virtual reality interface to the first user. The non-virtual reality platforms may include a second platform associated with the first user. The second platform may provide a non-virtual reality interface to the first user. The second platform may have limited functionality compared to the first platform.

The game component may be configured to use the game instance to generate game state information that is transmitted to the client computing platforms over a network. The game state information may facilitate presentation of views of the online game to the users via the client computing platforms. The game component may transmit the game state information over the network to the client computing platforms. Transmitting the game state information may cause the client computing platforms to present views of the online game. Views of the online game presented via a virtual reality platform providing a virtual reality interface may include views presented via head-mounted display device and/or other immersive views (e.g., causing the user to have the perception of being physically present in a virtual world). Views of the online game presented via a non-virtual reality platform providing a non-virtual reality interface may include views presented on a touch screen, mobile device display, television, computer monitor, and/or other displays (e.g., not fully immersive displays such that the user does not have the perception of being physically present in a virtual world).

The gameplay component may be configured to monitor gameplay progress made by the first user through actions requested via the second platform (e.g., the non-virtual reality platform). For example, the gameplay progress may include one or more of defeating a boss, winning a battle, resisting an attack, building and/or rebuilding a virtual entity, healing a virtual character and/or a non-user character, unlocking game content, developing a skill, leveling-up, completing one or more experience segments of the online game, and/or other progress within the online game.

The user component may be configured to manage one or more user accounts associated with individual users of the online game. The user accounts may include user information regarding the individual users of the online game. For example, the user accounts may include inventory information, virtual resources and/or currency information, gameplay progress information, and/or other information. A virtual resource may be a resource that can be exchanged to enhance one or more abilities for a virtual character. The virtual resources may include one or more of virtual currency, virtual items, energy, non-player characters, building materials, natural virtual resources, and/or other virtual resources.

The award component may be configured to award an amount of virtual resources to the first user for the gameplay progress made by the first user through actions requested via the second platform. The virtual resource may be redeemable for enhanced abilities for one or more virtual characters controlled by the user in the online game. The abilities for a virtual character associated with the user may include an ability to access a game level, an ability to access game content, an ability to access and/or use virtual items, a stamina associated with the virtual character, an identity and/or corresponding skills of the virtual character, a healing rate associated with the virtual character, a respawn rate for the virtual character, a skill of the virtual character, a power of the virtual character, an ability of the user and/or virtual character to perform one or more actions, a resistance of the virtual character, and/or other abilities.

The ability component may be configured to receive a request from the second platform to exchange at least a portion of the amount of the virtual resource for an enhancement of a first ability for a first virtual character controlled by the first user in the online game. The ability component may be configured to enhance the first ability for the first virtual character in response to receipt of the request. Enhancing an ability may include improving the ability, changing the ability, adjusting the ability, increasing the ability, enabling the ability, and/or otherwise enhancing the ability. Enhancement of the first ability for the first virtual character may be reflected in the online game via the first platform. The first user may be able to perform actions within the virtual reality interface in accordance with the enhancement.

One aspect of the disclosure relates to making game content from a single online game available to users via multiple platforms. The system may be configured to provide an online game that may be played via multiple platforms. The multiple platforms may include virtual reality platforms and non-virtual reality platforms. The system may be configured to monitor the gameplay of the users via the virtual reality platforms. If the amount of gameplay by a user via the virtual reality platform reaches a threshold amount of gameplay, the system may limit access to the online game via the virtual reality platform. The user's access to the online game via the virtual reality platform may be restricted until the user satisfies a requirement. While the virtual reality platform is restricted and/or while the requirement is unsatisfied, the online game may be available to the user via the non-virtual reality platform. As such, the user may still be able to play the online game via the non-virtual reality platform. Thus, the system and/or method described herein may limit users gameplay via the virtual reality platforms while encouraging users to remain engaged with the online game via the non-virtual reality platforms.

A system for making game content from a single online game accessible to users via multiple platforms may include one or more servers. The servers may operate in a client/server architecture with one or more client computing platforms. The client computing platforms may be associated with the users of the online game. The client computing platforms may include virtual reality platforms and non-virtual reality platforms. The servers may be configured to execute one or more of: a game component, a gameplay component, a user component, a platform component, a requirement component, a notification component, and/or other components. The client computing platforms may be configured to execute one or more components the same as or similar to the servers.

The game component may be configured to execute a game instance of an online game played via multiple platforms. The multiple platforms may include virtual reality platforms and non-virtual reality platforms. For example, the virtual reality platforms may include a first platform associated with a first user. The non-virtual reality platforms may include a second platform associated with the first user. The game component may be configured to use the game instance to generate game state information that is transmitted to client computing platforms over a network. The game state information may facilitate presentation of views of the online game to the users via the client computing platforms. The game component may transmit the game state information over the network to the client computing platforms. Transmitting the game state information may cause the client computing platforms to present views of the online game. Views of the online game presented via a virtual reality platform may include views presented on a head-mounted display device and/or other immersive views (e.g., causing the user to have the perception of being physically present in a virtual world). Views of the online game presented via a non-virtual reality platform may include views presented on a touch screen, television, computer monitor, and/or other non-immersive views (e.g., not fully immersive such that the user does not have the perception of being physically present in a virtual world).

Gameplay component 4114 may be configured to monitor gameplay by the users via the virtual reality platforms. Monitoring the gameplay of users may include monitoring an amount of gameplay via the virtual reality platform and/or the non-virtual reality platform associated with the user. For example, monitoring the gameplay by the first user may include monitoring an amount of gameplay by the first user via the first platform (e.g., the virtual reality platform).

The amount of gameplay may indicate an amount of time playing the game via a given platform. The amount of time may include one or more of a cumulative amount of time, an amount of time for a given period of time (e.g., hour(s), day(s), week(s), month(s), etc.), an amount of time per play session, an amount of time per level within the online game, an average amount of time, a frequency, and/or any other amount of time. In some implementations, the amount of gameplay may relate to a user's activity within the online game. The amount of gameplay may include one or more of a quantity of experience segments completed, a level achieved, a boss defeated, an amount of virtual items and/or resources used and/or obtained, an amount of stamina depleted and/or obtained, one or more actions performed, and/or other amounts of gameplay. Experience segments may include portions of the online game that may be completed and/or played by the users. For example, experience segments may include one or more of a game tile, game level, event, challenge, quest, nodes, mini-game, and/or other experience segment within the online game.

The platform component may be configured to limit gameplay of the online via the virtual reality platforms. Gameplay via the virtual reality platforms may be limited responsive to the amount of gameplay reaching a gameplay threshold. The gameplay threshold may be a limit on the amount of gameplay a user may participate in via a given platform (e.g., the virtual reality platform or the non-virtual reality platform) for a given period of time and/or segment of the online game. Limiting gameplay via the virtual reality platform may include restricting access to the online game via the virtual reality platform. Access via the virtual reality platform associated with the user may be restricted until a requirement is satisfied. For example, responsive to the amount of gameplay by the first user via the first platform (e.g., the virtual reality platform) reaching a gameplay threshold, access to the online game through the first platform may be restricted for the first user.

The platform component may enable the user to play the online game via another platform when access to the online game via a given platform is limited and/or while the requirement is unsatisfied. For example, the users may be able to play the online game via the non-virtual reality platforms while the gameplay of the online game via the virtual reality platforms is restricted. As such, the first user may be able to play the online game via the second platform (e.g., the non-virtual reality platform) while the first requirement is unsatisfied.

In some implementations, the requirement component may be configured to determine the requirement based on the amount of gameplay by the user via the virtual reality platform and/or the non-virtual reality platform. As such, the requirement component may be configured to determine the first requirement based on one or both of the amount of gameplay by the first user via the first platform (e.g., the virtual reality platform), and the second amount of gameplay by the first user via the second platform (e.g., the non-virtual reality platform). The requirement component may be configured to determine whether the requirement (e.g., the first requirement) has been satisfied by the user (e.g., the first user). The notification component may be configured to effectuate presentation of a notification to a user via a given platform. The notification presented may indicate that the gameplay threshold has been reached and/or the requirement.

One aspect of the disclosure relates to making game content from a single online game available to users via multiple platforms. The system may be configured to provide an online game that may be played via multiple platforms. The multiple platforms may include virtual reality platforms and non-virtual reality platforms. The system may be configured to monitor the gameplay of the users via the virtual reality platforms. If the amount of gameplay by a user via the virtual reality platform reaches a threshold amount of gameplay, the system may limit access to the online game via the virtual reality platform. The user's access to the online game via the virtual reality platform may be restricted until the user satisfies a requirement. While the virtual reality platform is restricted and/or while the requirement is unsatisfied, the online game may be available to the user via the non-virtual reality platform. As such, the user may still be able to play the online game via the non-virtual reality platform. Thus, the system and/or method described herein may limit users gameplay via the virtual reality platforms while encouraging users to remain engaged with the online game via the non-virtual reality platforms.

A system for making game content from a single online game accessible to users via multiple platforms may include one or more servers. The servers may operate in a client/server architecture with one or more client computing platforms. The client computing platforms may be associated with the users of the online game. The client computing platforms may include virtual reality platforms and non-virtual reality platforms. The servers may be configured to execute one or more of: a game component, a gameplay component, a user component, a platform component, a requirement component, a notification component, and/or other components. The client computing platforms may be configured to execute one or more components the same as or similar to the servers.

The game component may be configured to execute a game instance of an online game played via multiple platforms. The multiple platforms may include virtual reality platforms and non-virtual reality platforms. For example, the virtual reality platforms may include a first platform associated with a first user. The non-virtual reality platforms may include a second platform associated with the first user. The game component may be configured to use the game instance to generate game state information that is transmitted to client computing platforms over a network. The game state information may facilitate presentation of views of the online game to the users via the client computing platforms. The game component may transmit the game state information over the network to the client computing platforms. Transmitting the game state information may cause the client computing platforms to present views of the online game. Views of the online game presented via a virtual reality platform may include views presented on a head-mounted display device and/or other immersive views (e.g., causing the user to have the perception of being physically present in a virtual world). Views of the online game presented via a non-virtual reality platform may include views presented on a touch screen, television, computer monitor, and/or other non-immersive views (e.g., not fully immersive such that the user does not have the perception of being physically present in a virtual world).

Gameplay component 5114 may be configured to monitor gameplay by the users via the virtual reality platforms. Monitoring the gameplay of users may include monitoring an amount of gameplay via the virtual reality platform and/or the non-virtual reality platform associated with the user. For example, monitoring the gameplay by the first user may include monitoring an amount of gameplay by the first user via the first platform (e.g., the virtual reality platform).

The amount of gameplay may indicate an amount of time playing the game via a given platform. The amount of time may include one or more of a cumulative amount of time, an amount of time for a given period of time (e.g., hour(s), day(s), week(s), month(s), etc.), an amount of time per play session, an amount of time per level within the online game, an average amount of time, a frequency, and/or any other amount of time. In some implementations, the amount of gameplay may relate to a user's activity within the online game. The amount of gameplay may include one or more of a quantity of experience segments completed, a level achieved, a boss defeated, an amount of virtual items and/or resources used and/or obtained, an amount of stamina depleted and/or obtained, one or more actions performed, and/or other amounts of gameplay. Experience segments may include portions of the online game that may be completed and/or played by the users. For example, experience segments may include one or more of a game tile, game level, event, challenge, quest, nodes, mini-game, and/or other experience segment within the online game.

The platform component may be configured to limit gameplay of the online via the virtual reality platforms. Gameplay via the virtual reality platforms may be limited responsive to the amount of gameplay reaching a gameplay threshold. The gameplay threshold may be a limit on the amount of gameplay a user may participate in via a given platform (e.g., the virtual reality platform or the non-virtual reality platform) for a given period of time and/or segment of the online game. Limiting gameplay via the virtual reality platform may include restricting access to the online game via the virtual reality platform. Access via the virtual reality platform associated with the user may be restricted until a requirement is satisfied. For example, responsive to the amount of gameplay by the first user via the first platform (e.g., the virtual reality platform) reaching a gameplay threshold, access to the online game through the first platform may be restricted for the first user.

The platform component may enable the user to play the online game via another platform when access to the online game via a given platform is limited and/or while the requirement is unsatisfied. For example, the users may be able to play the online game via the non-virtual reality platforms while the gameplay of the online game via the virtual reality platforms is restricted. As such, the first user may be able to play the online game via the second platform (e.g., the non-virtual reality platform) while the first requirement is unsatisfied.

In some implementations, the requirement component may be configured to determine the requirement based on the amount of gameplay by the user via the virtual reality platform and/or the non-virtual reality platform. As such, the requirement component may be configured to determine the first requirement based on one or both of the amount of gameplay by the first user via the first platform (e.g., the virtual reality platform), and the second amount of gameplay by the first user via the second platform (e.g., the non-virtual reality platform). The requirement component may be configured to determine whether the requirement (e.g., the first requirement) has been satisfied by the user (e.g., the first user). The notification component may be configured to effectuate presentation of a notification to a user via a given platform. The notification presented may indicate that the gameplay threshold has been reached and/or the requirement.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 7-8 illustrate exemplary data structures storing platform information and group role information.

DETAILED DESCRIPTION OF THE PREFERRED EMBODIMENT

The following describes multiple embodiments based on virtual reality and non-virtual reality platforms, including systems and methods for changing access to one or more platforms, game content, or gameplay, for example.

Providing Virtual Reality Content in an Online Game

Figure 1A:
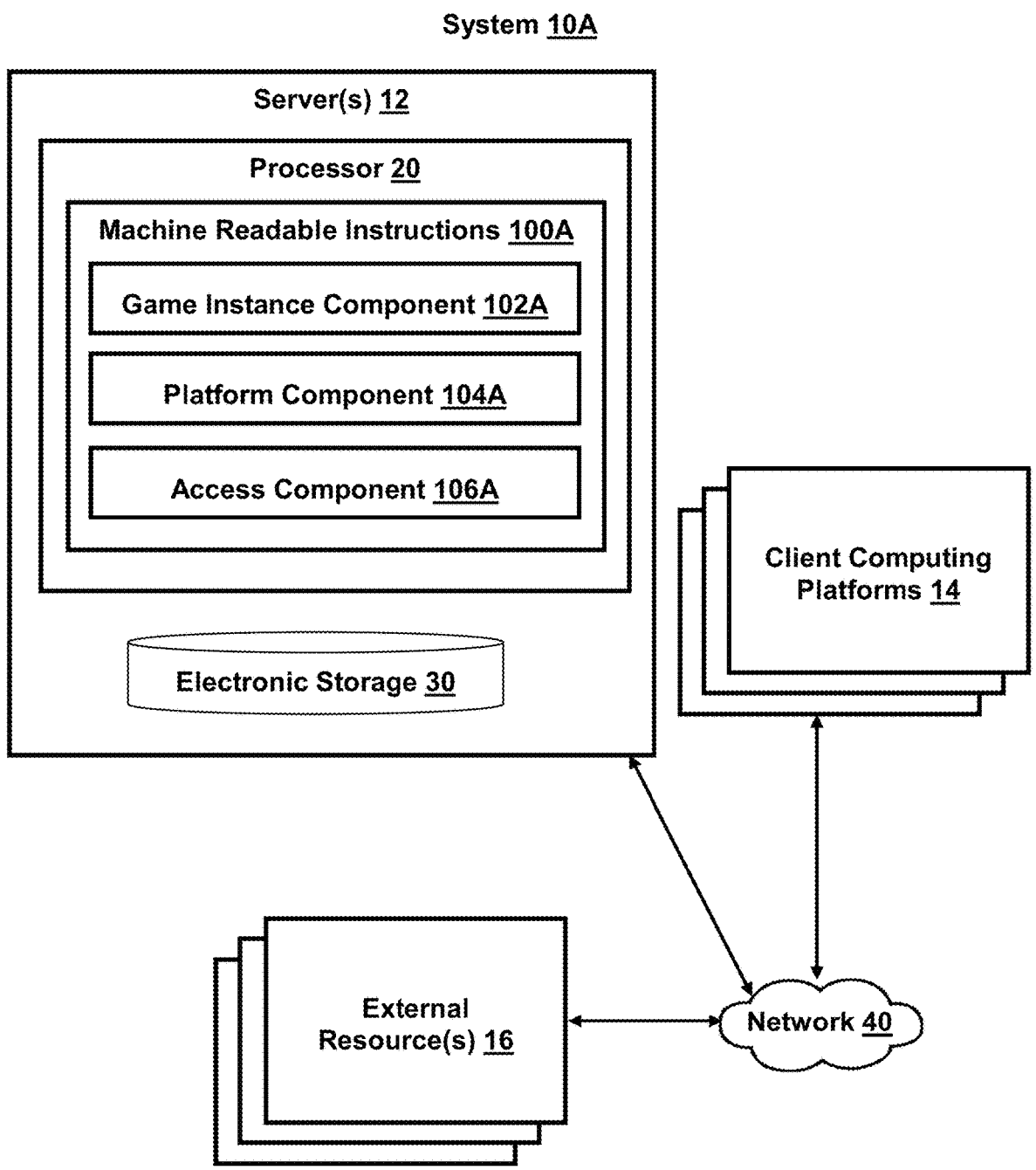
FIGS. 1A-1C illustrate systems for providing virtual reality content in an online game.
Figure 1B:
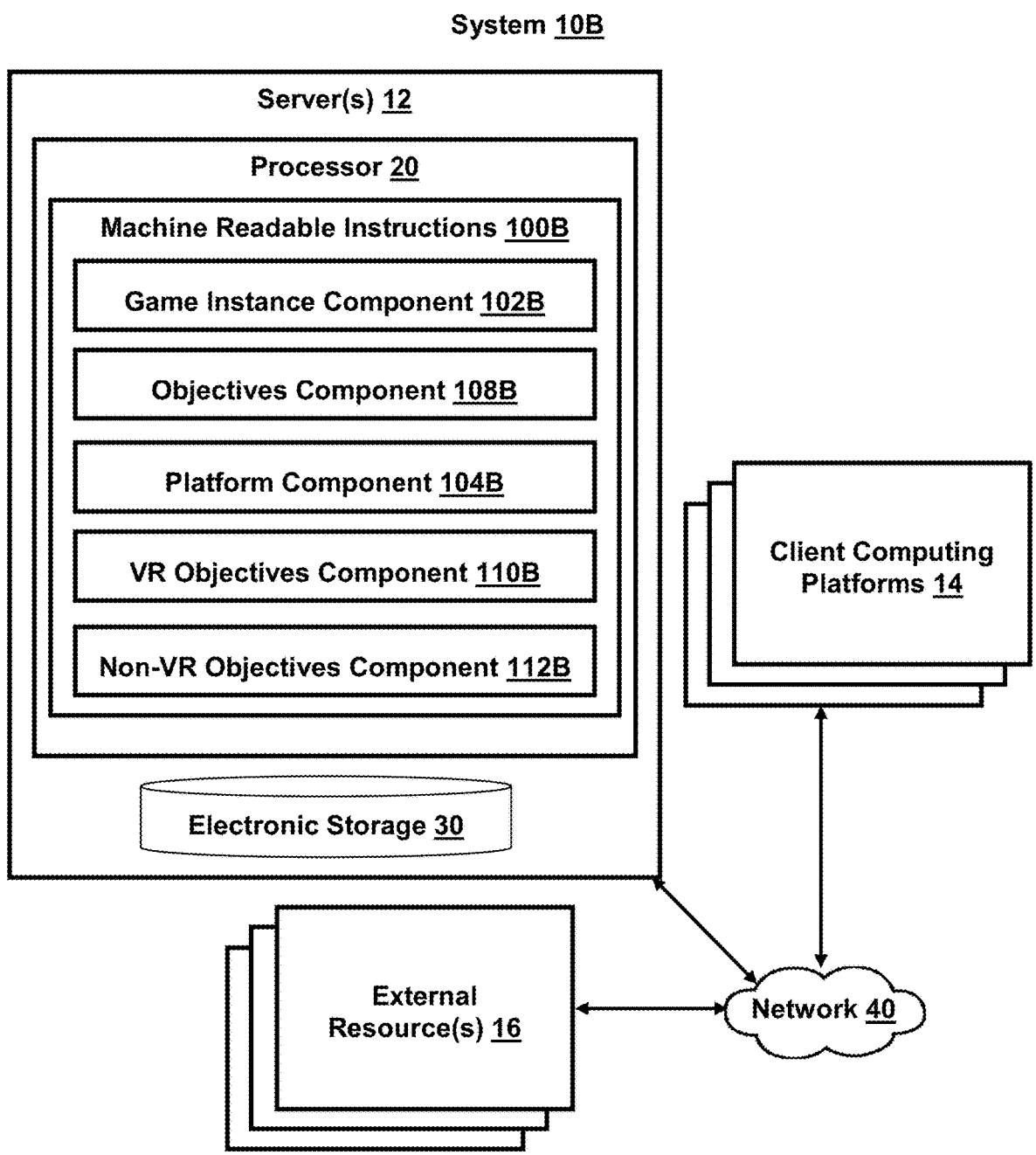
Figure 1C:
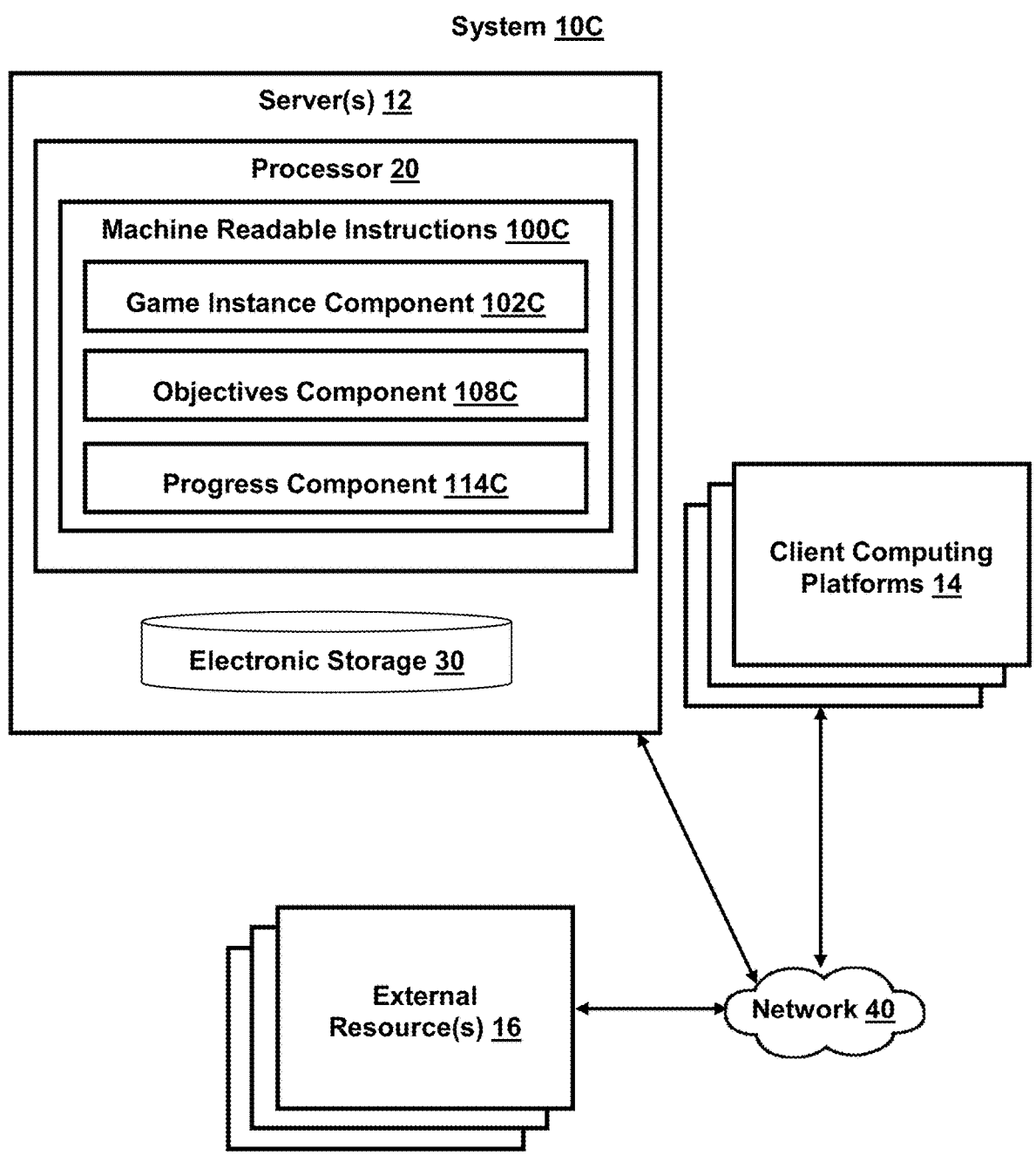
Figure 3:
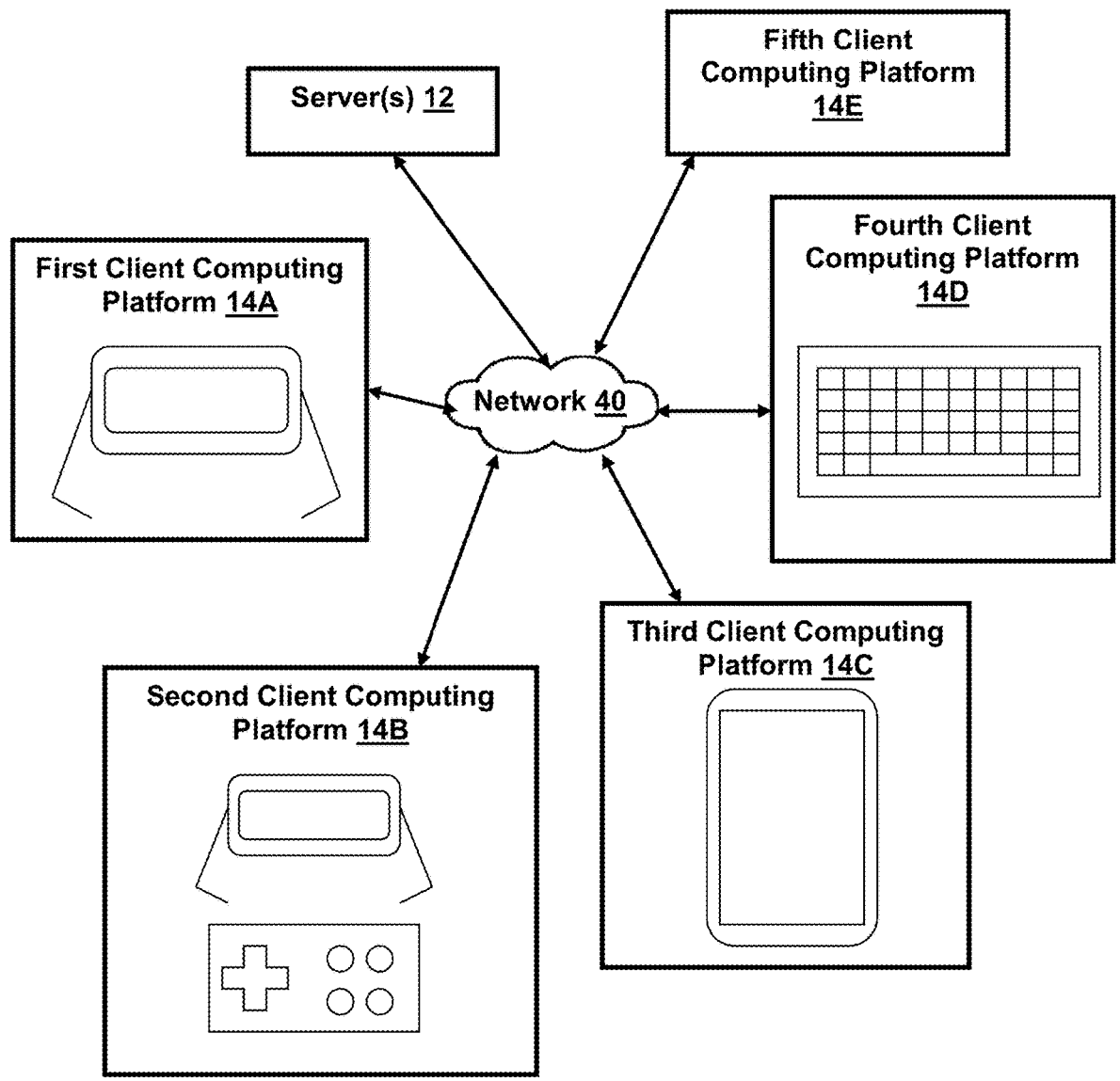
FIG. 3 illustrates an exemplary connection between server(s) and client computing platforms.

FIGS. 1A-1C illustrates systems 10A-10C configured to provide virtual reality content in an online game. Providing one or more of the online games may include hosting the online games over a network. In some implementations, as shown in these examples, systems 10A-10C may include one or more servers 12 configured for hosting online games. Users may access systems 10A-10C, the online game, and/or a game instance of the online game via client computing platforms 14, such as client computing platforms 14A-E as shown in FIG. 3. Systems 10A-10C may include one or more of server(s) 12, client computing platforms 14, external resource(s) 16, processor 20, electronic storage 30, network 40, and/or other components. Server(s) 12, client computing platforms 14, external resource(s) 16, and/or other components may be connected via network 40.

Client computing platforms 14 may include virtual reality platforms and/or non-virtual reality platforms. Virtual reality platforms may refer to platforms that allow users of a game to interact with a virtual space as the users would interact with the real world. The virtual reality platforms may provide one or more sensory experience that simulates the users' presence in the virtual space. Sensory experience provided by virtual reality platforms may include one or more of experience based on sight, touch, hearing, smell and/or other sensory experience. As non-limiting examples, the virtual reality platforms may include one or more of a virtual reality headset display, a motion controller, a haptic generator, and/or other virtual reality platforms.

In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

Virtual reality platforms may present views of the online game in a manner that simulates the users' immersion within the online game. The online game may have a higher interactive potential when played via the virtual reality platforms than when played via the non-virtual reality platforms. For example, the virtual reality platforms may be able to support additional and/or increased motion inputs, views, visibility, feedback and/or other interactions a user may have with the online game.

External resources 16 may include sources of information, hosts and/or providers of virtual environments outside of systems 10A-10C, external entities participating with systems 10A-10C, and/or other resources.

Server(s) 12 may include electronic storage 30. Electronic storage 30 may include electronic storage media that electronically stores information. Electronic storage 30 may store software algorithms, information determined by processor 20, information received remotely, information received from server(s) 12, information received from client computing platforms 14, and/or other information that enables systems 10A-10C and/or server(s) 12 to function properly. For example, electronic storage 30 may store information relating to an online game, information relating to a game instance of an online game, information relating to virtual reality platforms and non-virtual reality platforms, information relating to objectives, information relating to rewards, information relating to one or more computer components, and/or other information.

Server(s) 12 may be configured to communicate with one or more client computing platforms 14 according to a client/server architecture, and with each other. Server(s) 12 may include processor 20 configured to execute one or more machine readable instructions 100. In some implementations, client computing platforms 14 may include one or more computer program components that are the same as or similar to the computer program components of physical processor 20 to facilitate in game actions.

Game instance components 102A-C of systems 10A-C may execute a game instance of the online game. The game instance may include the virtual reality content. Virtual reality content may refer to content in the online game that requires interaction via virtual reality platforms. Virtual reality content may require input from virtual reality platforms and/or output to virtual reality platforms. For example, virtual reality content may require one or more movements and/or gestures of a user (e.g., hand motion, head motion, body motion, etc.) registered by the virtual reality platforms to interact with the virtual reality content. As another example, virtual reality content may provide output from the online game via the virtual reality platforms (e.g., displaying views of the game instance, generating vibrations, etc.).

The game instance of the online game may comprise a simulated virtual space, e.g., a virtual space that is accessible by users via clients (e.g., client computing platforms 14) that present the views of the virtual space to a user. The virtual space may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

It should be understood the above description of the manner in which state of the virtual space associated with the online game as determined by game instance component 102A-C is not intended to be limiting. Game instance component 102A-C may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Game instance component 102A-C may be configured to use the game instance to generate game state information that is transmitted to client computing platforms 14 over network 40. The execution of the instance of the online game by game instance component 102A-C may include determining a game state associated with the online game. The game state information may facilitate presentation of views of the online game to the users via client computing platforms 14. The game state information may include information defining the virtual space in which the online game is played.

Game instance component 102A-C may be configured to transmit the game state information over network 40 to the client computing platforms 14, causing client computing platforms 14 to present views of the online game. The game state information may be communicated (e.g., via streaming visual data, via object/position data, and/or other state information) from server(s) 12 to client computing platforms 14 for presentation to users.

The game state information determined and transmitted to a given client computing platform 14 may correspond to a view for a user character being controlled by a user via the given client computing platform 104. The state determined and transmitted to a given client computing platform 104 may correspond to a location in a virtual space associated with the online game. The view described by the game state information for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

Views of the online game presented via a virtual reality platform may include views presented on a virtual reality headset display (e.g., a head-mounted display device, etc.). The views may be presented stereoscopically-one for each eye-via the virtual reality headset display and the user's brain may combine them to create a three-dimensional experience. The virtual reality headset display may include a head tracking system that tracks movement (e.g., position, orientation, change in position, change in orientation, etc.) of the users as they move their heads and/or move around the environment. The virtual reality headset display may include a sensor system (e.g., image sensor system, distance sensor system, etc.) that track movement of the users' body parts (e.g., user's hands, arms, feet, legs, etc.) and/or objects (e.g., glove, wand, controller, markers, etc.). Views of the online game presented via a non-virtual reality platform may include views presented on a display for one or more of a mobile device (e.g., a smart phone, tablet, laptop, etc.), desktop computer, gaming console, televisions, and/or other non-virtual reality platforms.

The execution of the game instance may enable interaction by the users with the online game and/or each other. Game instance component 102A-C may be configured to perform operations in the game instance in response to commands received over network 40 from client computing platforms 14. Within the instance of the online game, users may interact with elements in the online game and/or with each other through gameplays provided by the online game.

Users may participate in the online game through client game applications implemented on client computing platforms 14 associated with the users. Within the game instance of the online game executed by game instance component 102A-C, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

The user controlled element(s) may move through and interact with the virtual space (e.g., user-virtual space units in the virtual space, non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Controls of virtual elements in the online game may be exercised through commands input by a given user through client computing platforms 14. The given user may interact with other users through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12 (e.g., through game instance component 102A-C).

Execution and/or performance of the user action by game instance component 102A-C may produce changes to the game state, which may reflect progresses and/or results of the user actions. In some examples, state changes caused by the execution of the user actions may be recorded in the electronic storage 30 to facilitate persistency throughout the instance of the online game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via a virtual reality platform, a given user may input a broad range of commands. The input commands via virtual reality platform may include the user performing the action as an input command. Based on the user's actions in the real world, the user may be able to look around, move about, and/or otherwise act within the virtual space in which the online game is played.

The instance of the online game may comprise virtual entities automatically controlled in the instance of the online game. Such virtual entities may or may not be associated with any user. As such, the automatically controlled virtual entities may be generated and/or developed by artificial intelligence configured with server(s) 12 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with server(s) 12. As used herein, such automatically controlled virtual space entities in the instance of the online game are referred to as "non-player entities."

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

In one aspect of the disclosure, virtual reality content in an online game may be provided by determining whether the users of the online game are attempting to join the game instance via the virtual reality platforms or the non-virtual reality platforms. Access to the game instance may be provided to users attempting to join the game instance via one or more of the virtual reality platforms. Access to the game instance may be denied to users attempting to join the game instance via one or more of the non-virtual reality platforms.

Referring to FIG. 1A, machine readable instructions 100A may include one or more computer program components. The computer program components may include one or more of game instance component 102A, platform component 104A, access component 106A, and/or other components.

Game instance component 102A may be configured to execute a game instance of the online game. The game instance may include virtual reality content, as describe above. In some implementations, the game instance of the online game may be executed during a time period. A time period may refer to one or more durations of time in which the game instance is executed and is available for play by the users.

In some implementations, the time period may include a duration within 5 PM to 11 PM for a time zone in which the most number of users are located. For example, a time period may include a duration from 6 PM to 9 PM. As another example, a time period may include durations from 5 PM to 8 PM and from 9:30 PM to 10:30 PM. Durations of time may change between day(s), week(s), month(s), year (s), and/or other times. For example, a time period may include a duration from 7:30 PM to 9:30 PM on weekdays and durations from 9 AM to 11 AM and 4:30 PM to 11:30 PM on weekends. Others durations of time are contemplated.

The time zone for the time period may be selected based on the numbers of users. For example, a time zone may be selected based on the time zone having more number of users registered to play the online game than other time zones. The users may be registered to play the online game via virtual reality platforms and/or non-virtual reality platforms. As another example, a time zone may be selected based on historical information regarding users playing the online game via virtual reality platforms and/or non-virtual reality platforms. A time zone historically having the most number of playing users may be selected for the time period. The historical information regarding users playing the online game may be gathered for different time periods, such as for a part of a day/week/month, a full day/week/month, multiple days/week/month, etc. Other implementations of selecting the time zone are contemplated.

In some implementations, the game instance of the online game may include a set of rewards for users interacting with the online game via the one or more of the virtual reality platforms. A reward may refer to one or more changes in the online game for the users. A reward may change the interactions of the user with the online game at a time, over a period of time, at a location, or over a range of locations. For example, a reward may include one or more of changes in awards received by the users during the online game, changes in attributes of user characters, changes in virtual space units, changes in objects, and/or other changes in the online game.

Awards received by the users during the online game may be changed by increasing the award (e.g., receiving twice as many awards, etc.), changing the type of award (e.g., receiving an object instead of virtual currency, etc.), changing the requirements for receiving the award (e.g., making it easier for the user to receive the award, etc.), and/or making other changes. Attributes of user characters may be changed by increasing one or more attributes (e.g., increasing strength of user characters, etc.), deceasing one or more attributes (e.g., decreasing wait times to perform actions, etc.), adding attributes (e.g., giving abilities not previously available, etc.), and/or making other changes. Objects may be changed by increasing one or more properties of objects (e.g., increase the strength of a sword, etc.), decreasing one or more properties of objects (e.g., decreasing adverse effects of using objects, etc.), changing properties of objects (e.g., changing an object into another object, etc.), and/or making other changes.

In some implementations, game instance component 102A may execute another instance of the online game. The other game instance may not include the virtual reality content. In some implementations, the other game instance may include a substitute non-virtual reality content for the virtual reality content (e.g., in the place of interacting with virtual reality content, the users may interact with substitute non-virtual reality content, etc.). In some implementations, the other game instance may not include a substitute non-virtual reality content for the virtual reality content (e.g., the users may miss out on virtual reality content without a chance to play substitute non-virtual reality content, etc.).

Platform component 104A may be configured determine whether the users of the online game are attempting to join the game instance via the virtual reality platforms or the non-virtual reality platforms. Platform component 104A may obtain client computing platform information and identify client computing platforms 14 used to interact with the virtual space based on the client computing platform information. The client computing platform information may include information that identifies virtual reality capability of client computing platform 14 (e.g., virtual reality vs. non-virtual reality, etc.), a class of client computing platform 14, a particular type of client computing platform 14, and/or other information identifying the client computing platform 14.

Platform component 104A may include or retrieve information (for example, a database, etc.) that matches the client computing platform information to one or more virtual reality platforms or one or more non-virtual reality platforms. For example, a class of client computing platform may include general descriptions of client computing platforms such as information indicating that a client computing platform includes a virtual reality headset display, a motion controller, a game controller, a haptic generator, a speaker, a head-mounted display device, a desktop computing device, a laptop computing device, a tablet device, a mobile device (e.g., smart phone), and/or other general description regarding the client computing platforms used to interact with the virtual space. Platform component 104A may include or retrieve information that matches one or more information regarding the class of client computing platform to one or more virtual reality platforms or one or more non-virtual reality platforms.

As another example, a type of client computing platform may include specific descriptions of client computing platforms such as a particular brand, model, operating system, and/or other description that more specifically identifies the client computing platform 14 used to interact with the virtual space. Platform component 104A may include or retrieve information that matches one or more information regarding the type of client computing platform to one or more virtual reality platforms or one or more non-virtual reality platforms.

For example, FIG. 3 illustrates exemplary connections between server(s) 12 and client computing platforms 14. Server(s) 12 may execute a game instance of an online game and users may be attempting to join the game instance via computing platforms 14. Computing platforms 14 may include first client computing platform 14A (e.g., a virtual reality headset display, etc.), second client computing platform 14B (e.g., a head-mounted display and a game controller, etc.), third client computing platform 14C (e.g., a tablet device, etc.), fourth client computing platform 14D (e.g., a laptop computing device, etc.), fifth client computing platform 14E (e.g., other client computing platform(s)), and/or other client computing platforms.

Based on the client computing platform information, platform component 104A may determine that users of first client computing platform 14A and second client computing platform 14B are attempting to join the game instance via virtual reality platforms. Based on the client computing platform information, platform component 104A may determine that users of third client computing platform 14C and fourth client computing platform 14D are attempting to join the game instance via non-virtual reality platforms. Based on the client computing platform information, platform component 104A may determine whether the user of fifth client computing platform 14E is attempting to join the game instance via virtual reality platform or non-virtual reality platform.

Platform component 104A may obtain the client computing platform information passively or actively. Platform component 104A may passively obtain the client computing platform information based on communications with client computing platforms 14 such as by reading headers and/or other portions of communications from client computing platforms 14 to identify the client computing platforms being used to interact with the virtual space. For example, platform component 104A may read Hypertext Transfer Protocol ("HTTP") headers to determine a browser used to interact with the virtual space and accordingly identify the client computing platform that operates the browser. Agents used to interact with the virtual space other than a browser may be operating on client computing platform 14. Such agents may encode the client computing platform information and provide to server(s) 12 the client computing platform information.

Platform component 104A may actively obtain the client computing platform information such as by querying and/or otherwise causing client computing platforms 14 to provide the client computing platform information. For example, platform component 104A and/or an agent operating on client computing platforms 14 may cause a prompt for users to input the client computing platform information.

Access component 106A may be configured to, responsive to determination that an individual user is attempting to join the game instance via one or more of the virtual reality platforms, provide access to the game instance to such individual user. Access to the game instance may be provided by allowing the users to join the game instance and begin playing the online game.

Access component 106A may be configured to, responsive to determination that an individual user is attempting to join the game instance via one or more of the non-virtual reality platforms, deny access to the game instance to such individual user. Access to the game instance may be denied by preventing the users from joining the game. In some implementations, denying access to the game instance may include providing information about one or more of the virtual reality platforms required to join the game instance.

In some implementations, access component 106A may be configured to, responsive to the determination that the individual user is attempting to join the game instance via the one or more of the non-virtual reality platforms, provide access to the other game instance to such individual user. The other game instance may not include the virtual reality content. In some implementation, providing access to the other game instance may include providing information about the other game instance. In some implementation, providing access to the other game instance may include providing information about one or more of the virtual reality platforms required to join the game instance.

In some implementations, access component 106A may be configured to provide one or more rewards from a set of rewards to the users interacting with the online game via the one or more of the virtual reality platforms. A reward may change the interaction of the users with the online game. For example, a reward may include one or more of changes in awards received by the users during the online game, changes in attributes of user characters, changes in virtual space units, changes in objects, and/or other changes in the online game, as described above.

In some implementations, access component 106A may provide the one or more rewards to the users interacting with the online game via the one or more of the virtual reality platforms in response to the users joining the game instance via the one or more of the virtual reality platforms during a time period. For example, a time period may include a duration from 9 PM to 11 PM in a certain time zone and access component 106 may provide one or more rewards to users that join the online game at any time between 9 PM and 11 PM via one or more of the virtual reality platforms. Information regarding one or more rewards provided to users may be stored so that a user joining the online game multiples times during the time period do not receive multiple rewards.

In some implementations, access component 106A may provide one or more rewards to the users interacting with the online game via the one or more of the virtual reality platforms in response to the users interacting with the game instance via the one or more of the virtual reality platforms for a certain duration within a time period. For example, a time period may include a duration from 9 AM and 11 AM and a certain duration may include thirty minutes. Access component 106A may provide one or more rewards to users that join the online game between 9 AM and 11 AM and interact with the game for thirty minutes. In some implementations, users may be required to interact with the online game for the certain duration consecutively (e.g., a user that joins the online game at 9 AM and 10 AM and interacts with the game for 15 minutes each time may not receive a reward, etc.). In some implementations, users may be required to interact with the online game for the certain duration within the time period (e.g., a user that joins the online game at 10:50 AM and interacts with the game until 11:20 AM may not receive a reward, etc.). Information regarding one or more rewards provided to users may be stored so that a user joining the online game multiples times during the time period and interacting with the online game for the certain duration do not receive multiple rewards.

In one aspect of the disclosure, virtual reality content in an online game may be provided by determining a set of objectives to be achieved by the users. The set of objectives may include a first objective requiring one or more interactions of the users with the virtual reality content, a second objective not requiring the one or more interactions of the users with the virtual reality content, and/or other objectives.

Users playing the online game via one or more of the virtual reality platforms during a time period may be required to achieve the first objective. Users playing the online game via one or more of the non-virtual reality platforms during the time period may be required to achieve the second objective.

Referring to FIG. 1B, machine readable instructions 100B may include one or more computer program components. The computer program components may include one or more of game instance component 102B, objectives component 108B, platform component 104B, VR objectives component 110B, non-VR objectives component 112B, and/or other components.

Game instance component 102B may be configured to execute a game instance of the online game. The game instance may include virtual reality content, as described above.

Objectives component 108B may be configured to determine a set of objectives to be achieved by the users. An objective may refer to a set of interactions required between the online game and the users. The interactions between the online game and the users may require interactions of the users with one or more elements in the online game and/or with each other through gameplays provided by the online game. As non-limiting examples, an objective may include requiring users interactions with the online game to reach a certain point in the online game, obtain a certain level for the user character, obtain a certain object, interact with a certain user, win a battle against a certain user or an enemy, and/or other interactions with the online game.

A set of objectives may include a first objective, a second objective, and/or other objectives. The first objective may require one or more interactions of the users with the virtual reality content. For example, the first objective may require the users to manipulate a virtual puzzle by hand via one or more virtual reality platforms. The second objective may not require the one or more interactions of the users with the virtual reality content. For example, the second object may require the users to manipulate a virtual puzzle by clicking on the surface of a tablet device. Other types of objectives are contemplated.

In some implementations, the objectives may be characterized by different game difficulties. Game difficulty may refer to one or more parameters of the online game that determines interaction results of the users with one or more elements in the online game and/or with each other. Game difficulty may be static or dynamic. Game difficulty for an online game/game instance may remain the same throughout a play of the online game or change during the play of the online game. In some implementations, the first objective may be characterized by a first game difficulty and the second objective may be characterized by a second game difficulty. The first game difficulty may be lower than the second game difficulty.

For example, a low difficulty may include changes in the online game that make it easier for the users to achieve an objective. For example, a low difficulty may include changes in attributes of user characters (e.g., increasing strength of user characters, etc.), changes in virtual space units (e.g., changing the abilities of virtual space units, etc.), changes in objects (e.g., increasing durability of weapons, etc.), changes in non-player entities (e.g., decreasing health of non-player entities, etc.) and/or other changes in the online game that make it easier for the users to achieve the objective.

As another example, a high difficulty may include changes in the online game that make it harder for the users to achieve an objective. For example, a high difficulty may include changes in attributes of user characters (e.g., decreasing health of user characters, etc.), changes in virtual space units (e.g., changing the skills of virtual space units, etc.), changes in objects (e.g., decreasing object effects, etc.), changes in non-player entities (e.g., increasing magic power of non-player entities, etc.) and/or other changes in the online game that make it harder for the users to achieve the objective.

In some implementations, the objectives may be characterized by different types of gameplay. For example, the first objective may be characterized by a first type of gameplay and the second objective may be characterized by a second type of gameplay. A gameplay may refer to a manner in which users interact with the online game. A gameplay may define one or more of views of the online game, options available to users to interact with the online game and/or each other, inputs into the online game available to users, outputs out of the online game available to users, and/or other manner in which users may interact with the online game. For example, types of gameplays may include role-playing, first-person shooter, real-time strategy, turn-based strategy, simulation, music or rhythm playing, social interaction, twitching and/or any other gameplays.

The first type of gameplay may differ from the second type of gameplay. For example, the first objective may be characterize by a first-person battle type of gameplay and the second objective may be characterized by a resource gathering type of gameplay. A battle type of gameplay may include users using virtual reality platforms to fight against enemies from a first-person view (e.g., view of the game instance may be generated from the position of the user's avatars, and the users may use physical motions to change the direction of view, to duck, to jump, to strike, to defend, etc. within the online game) A resource gathering type of gameplay may include users using non-virtual reality platforms to gather resources (e.g., view of the game instance may be generated above the position of the user's avatars (e.g., top-down view, etc.), and the users may use controllers (e.g., game controller, keyboard, mouse, touch screen, etc.) to command gathering of resources, etc.). Other types of gameplays are contemplated.

In some implementations, the types of gameplay for the objectives may be determined based on historical information regarding users' prior plays of the online game and/or other games. Historical information regarding the users' prior plays may characterize the type of gameplays preferred by the users. For example, historical information regarding the users' prior plays may track users' decisions to play certain types of gameplays over other types of gameplays (e.g., a user provided with an option of playing a battle type of gameplay or a resource gathering type of gameplay may choose the battle type of gameplay more often than the resource gathering type of gameplay, etc.). The first type of gameplay of the first objective may include one or more types of gameplay more preferred by the users. The second type of gameplay of the second objective may include one or more types of gameplay less preferred by the users.

In some implementations, the objectives may be characterized by different rewards. For example, the first objective may be associated with a first reward and the second objective may be associated with a second reward. Rewards may be provided to the users upon the users achieving the associated objectives. A reward may change the interaction of the users with the online game. For example, a reward may include one or more of changes in awards received by the users during the online game, changes in attributes of user characters, changes in virtual space units, changes in objects, and/or other changes in the online game, as described above.

The first reward may differ from the second reward. For example, the first reward may include one or more of changes in awards received by the users during the online game, changes in attributes of user characters, changes in virtual space units, changes in objects, and/or other changes in the online game that provide more benefit(s) to the users than the benefit(s) provided by the second reward. For example, the first reward may be twice as large as the second reward.

In some implementations, the rewards associated with the objectives may be determined based on historical information regarding users' prior plays of the online game and/or other games. Historical information regarding the users' prior plays may characterize the type of rewards preferred by the users. For example, historical information regarding the users' prior plays may track users' decisions to seek after certain types of rewards over other types of rewards (e.g., a user provided with an option of playing to receive a user character attributes reward or an object reward may choose the object reward more often than the user character attributes reward, etc.). The first reward associated with the first objective may include one or more types of rewards more preferred by the users. The second reward associated with the second objective may include one or more types of rewards less preferred by the users.

Platform component 104B may be configured to determine whether the users of the online game are playing the online game via the virtual reality platforms or the non-virtual reality platforms during a time period. Platform component 104B may obtain client computing platform information and identify client computing platforms 14 used to interact with the virtual space based on the client computing platform information as described above.

In some implementations, platform component 104B may be configured to determine changes in client computing platforms 14 used by the users to interact with the online game. Platform component 104B may determine when a given user changes the client computing platform 14 used to interact with the virtual space. For example, a user may change from using a laptop device to using a virtual reality headset display to interact with the virtual space. Platform component 104B may detect the change and accordingly associate the new client computing information with the user.

VR objectives component 110B may be configured to, responsive to determination that an individual user is playing the online game via one or more of the virtual reality platforms during the time period, require such individual user to achieve the first objective in the online game via the one or more of the virtual reality platforms. VR objectives component 110B may provide information about the first objective to the users via visual and/or audio information relating to the first objective. Visual information may refer to one or more information that may be observed visually. Visual information may be static or dynamic. For example, visual information relating to the first objective may include one or more of an image (e.g., an image showing the first objective, etc.), a text (e.g., a text describing the first objective, etc.), a video (e.g., a video showing the first objective, etc.) and/or other visual information conveying information regarding the first objective.

Audio information may refer to one or more information that may be observed audibly. Audio information may be static or dynamic. For example, audio information relating to the first objective may include one or more of a sound (e.g., a sound clip associated with the first objective, etc.), a music (e.g., a song associated with the first objective, etc.), a word (e.g., a word associated with the first objective, etc.), a sentence (e.g., a sentence describing the first objective), and/or other audio information conveying information regarding the first objective.

In some implementations, VR objectives component 110B may be configured to, responsive to determination that an individual user changed from playing the online game via the one or more of the non-virtual reality platforms to the one or more of the virtual reality platforms during the time period, cancel the second objective for such individual user and require such individual user to achieve the first objective in the online game via the one or more of the virtual reality platforms. Cancelling the second objective may prevent the users from achieving the second objective. In some implementations, VR objective component 110B may store information relating to the users' progress in achieving the second objective. If the users are later presented with the second objective, the users may continue the progress they had achieved prior to the second objective being cancelled.

In some implementations, VR objectives component 110B may be configured to, responsive to determination that an individual user achieved the first objective, provide the first reward to such individual user. VR objectives component 110B may provide the first reward to the users upon the users achieving of the first objective, upon completion of the game instance in which the user achieved the first objective, at other times during the game instance in which the user achieved the first objective, or during another game instance.

Non-VR objectives component 112B may be configured to, responsive to determination that an individual user is playing the online game via one or more of the non-virtual reality platforms during the time period, require such individual user to achieve the second objective in the online game via the one or more of the non-virtual reality platforms. Non-VR objectives component 112B may provide information about the second objective to the users via visual and/or audio information relating to the second objective.

In some implementations, non-VR objectives component 112B may be configured to, responsive to determination that an individual user changed from playing the online game via the one or more of the virtual reality platforms to the one or more of the non-virtual reality platforms during the time period, cancel the first objective for such individual user and require such individual user to achieve the second objective in the online game via the one or more of the non-virtual reality platforms. Cancelling the first objective may prevent the users from achieving the first objective. In some implementations, non-VR objective component 112B may store information relating to the users' progress in achieving the first objective. If the users are later presented with the first objective, the users may continue the progress they had achieved prior to the first objective being cancelled.

In some implementations, non-VR objectives component 112B may be configured to, responsive to determination that an individual user achieved the second objective, provide the second reward to such individual user. Non-VR objectives component 112B may provide the second reward to the users upon the users achieving of the second objective, upon completion of the game instance in which the user achieved the second objective, at other times during the game instance in which the user achieved the second objective, or during another game instance.

In one aspect of the disclosure, virtual reality content in an online game may be provided by determining, for users interacting with the online game during a time period, one or more objectives to be achieved by the users to advance in the online game. The one or more objectives may require one or more interactions of the users with the virtual reality content. The users may be required to achieve the one or more objectives in the online game via operation of the virtual reality platforms.

Referring to FIG. 1C, machine readable instructions 100C may include one or more computer program components. The computer program components may include one or more of game instance component 102C, objectives component 108C, progress component 114C, and/or other components.

Game instance component 102C may be configured to execute a game instance of the online game during a time period. The game instance may include virtual reality content, as described above.

In some implementations, game instance component 102C may be configured to execute another instance of the online game. The other game instance may not include the virtual reality content. In some implementations, the other game instance may include a substitute non-virtual reality content for the virtual reality content (e.g., in the place of interacting with virtual reality content, the users may interact with substitute non-virtual reality content, etc.). In some implementations, the other game instance may not include a substitute non-virtual reality content for the virtual reality content (e.g., the users may miss out on virtual reality content without a chance to play substitute non-virtual reality content).

Objectives component 108C may be configured to, for users interacting with the online game during the time period, determine one or more objectives to be achieved by the users to advance in the online game. The one or more objectives may require one or more interactions of the users with the virtual reality content. Users playing the online game during the period may be required to achieve the one or more objectives to advance in the online game. For example, an objective may require the users to manipulate a virtual puzzle by hand via one or more virtual reality platforms to advance in the online game. As another example, an objective may require the users to perform certain movements registerable by the virtual reality platforms to advance in the online game. Other objectives requiring interactions with the virtual reality content are contemplated.

Progress component 114C may be configured to require the users to achieve the one or more objectives in the online game via operation of the virtual reality platforms. Progress component 114C may detect interactions of the users with the online game via operation of the virtual reality platforms and determine whether the users have achieved the one or more objectives. For users that have achieved the one or more objectives, progress component 114C may allow the users to advance in the online game. For users that have not achieved the one or more objectives, progress component 114C may not allow the users to advance in the online game.

Advancing in the online game may refer to changes in the online game, such as changes in attributes of user characters (e.g., changes in character level and/or other attributes, etc.), changes in virtual space units (e.g., change in the number, types, or other characteristics of virtual space units, etc.), changes in objects (e.g., changes in the number, types, or other characteristics of objects, etc.), changes in areas within the online game available to the users (e.g., changes in elements in areas or changes in areas are available to the users, etc.), and/or other changes in the online game.

In some implementations, progress component 114C may be configured to determine whether the users of the online game are playing the online game via the virtual reality platforms or the non-virtual reality platforms during the time period. Progress component 114C may obtain client computing platform information and identify client computing platforms 14 used to interact with the virtual space based on the client computing platform information as described above with respect to platform components 104A-B.

In some implementations, progress component 114C may be configured to, responsive to determination that an individual user is playing the online game via one or more of the non-virtual reality platforms during the time period, effectuate presentation of an invitation to such user to change to one or more of the virtual reality platforms. Presentation of an invitation may be effectuated through provision of visual and/or audio information relating to the invitation.

Visual information may refer to one or more information that may be observed visually. Visual information may be static or dynamic. For example, visual information relating to the invitation may include one or more of an image (e.g., an image showing the invitation, etc.), a text (e.g., a text of the invitation, etc.), a video (e.g., a video showing the invitation, etc.) and/or other visual information conveying information regarding the invitation.

Audio information may refer to one or more information that may be observed audibly. Audio information may be static or dynamic. For example, audio information relating the invitation may include one or more of a sound (e.g., a sound clip associated with the invitation, etc.), a music (e.g., a song associated with the invitation, etc.), a word (e.g., a word associated with the invitation, etc.), a sentence (e.g., a sentence describing the invitation), and/or other audio information conveying information regarding the invitation.

In some implementations, progress component 114C may be configured to, responsive to determination that an individual user is playing the online game via one or more of the non-virtual reality platforms during the time period, provide access to the other game instance to such individual user. The other game instance may not include the virtual reality content. In some implementation, providing access to the other game instance may include providing information about the other game instance. In some implementation, providing access to the other game instance may include providing information about one or more of the virtual reality platforms required to join the game instance.

In some implementations, server(s) 12, client computing platforms 14, and/or external resources 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 12, client computing platforms 14, and/or external resources 16 may be operatively linked via some other communication media.

A given client computing platform 14 may include one or more processors configured to execute computer program components. The computer program components may be configured to enable a user associated with the given client computing platform 14 to interface with systems 10A-10C and/or external resources 16, and/or provide other functionality attributed herein to client computing platforms 14.

Server(s) 12 may include electronic storage 30, one or more processors 20, and/or other components. Server(s) 12 may include communication lines, or ports to enable the exchange of information with a network and/or other computing platforms. Illustration of server(s) 12 in FIGS. 1A-1C are not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

Processor 20 may be configured to provide information processing capabilities in server(s) 12. As such, processor 20 may include one or more of a digital processor, a central processing unit, a graphics processing unit, a microcontroller, an analog processor, a digital circuit designed to process information, an analog circuit designed to process information, a state machine, and/or other mechanisms for electronically processing information.

Although processor 20 is shown in FIGS. 1A-1C as a single entity, this is for illustrative purposes only. In some implementations, processor 20 may include a plurality of processing units. These processing units may be physically located within the same device, or processor 20 may represent processing functionality of a plurality of devices operating in coordination. Processor 20 may be configured to execute computer components. Processor 20 may be configured to execute computer components by software; hardware; firmware; some combination of software, hardware, and/or firmware; and/or other mechanisms for configuring processing capabilities on processor 20.

It should be appreciated that although computer components are illustrated in FIGS. 1A-1C as being co-located within a single processing unit, in implementations in which processor 20 includes multiple processing units, one or more of computer components may be located remotely from the other components.

The description of the functionality provided by the different computer components described herein is for illustrative purposes, and is not intended to be limiting, as any of computer components may provide more or less functionality than is described. For example, one or more of computer components may be eliminated, and some or all of its functionality may be provided by other computer components. As another example, processor 20 may be configured to execute one or more additional computer components that may perform some or all of the functionality attributed to one or more of computer components.

Electronic storage 30 may comprise electronic storage media that electronically stores information. The electronic storage media of electronic storage 30 may include one or both of system storage that is provided integrally (i.e., substantially non-removable) with server(s) 12 and/or removable storage that is removably connectable to server(s) 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Although electronic storage 30 is shown in FIGS. 1A-1C as a single entity, this is for illustrative purposes only. In some implementations, electronic storage 30 may comprise a plurality of storage units. These storage units may be physically located within the same device, or electronic storage 30 may represent storage functionality of a plurality of devices operating in coordination.

Figure 2A:
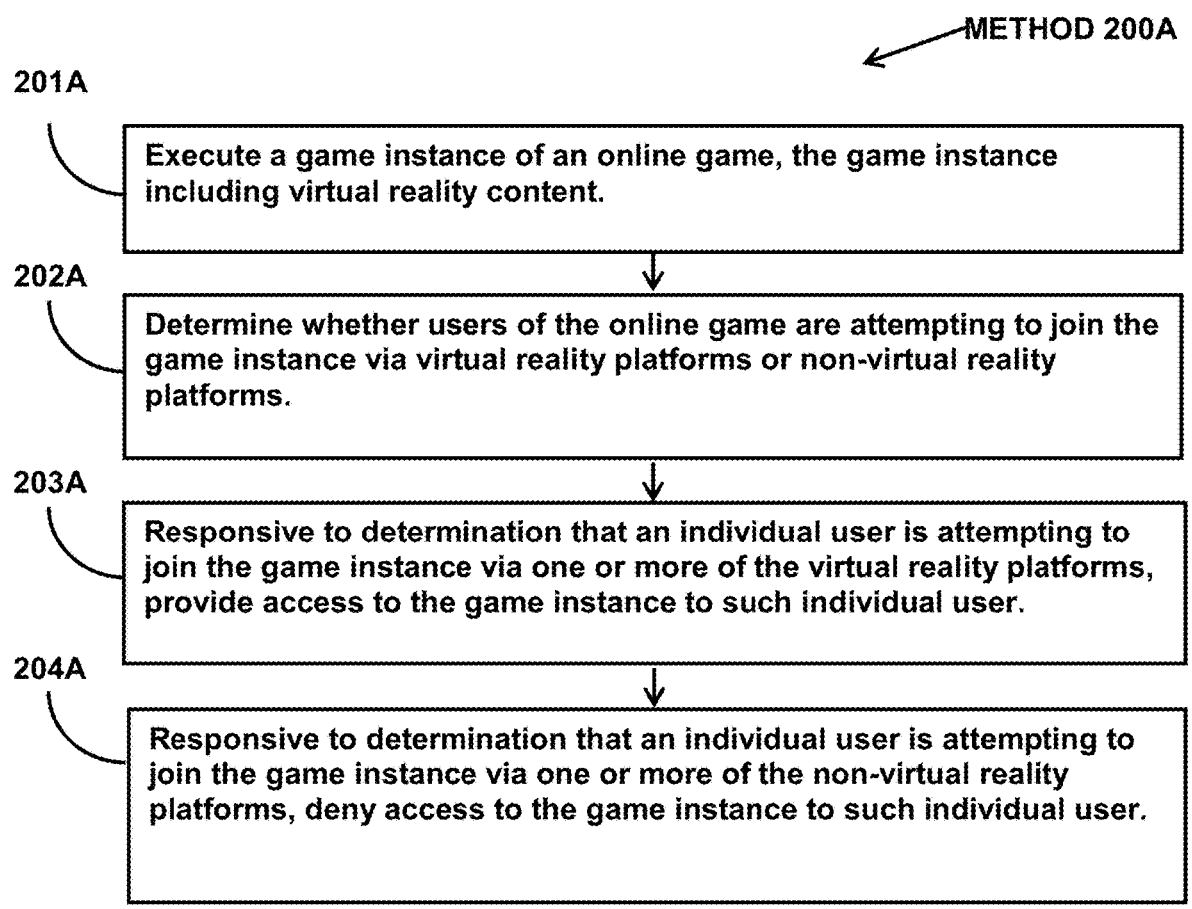
FIGS. 2A-2C illustrate methods for providing virtual reality content in an online game.
Figure 2B:
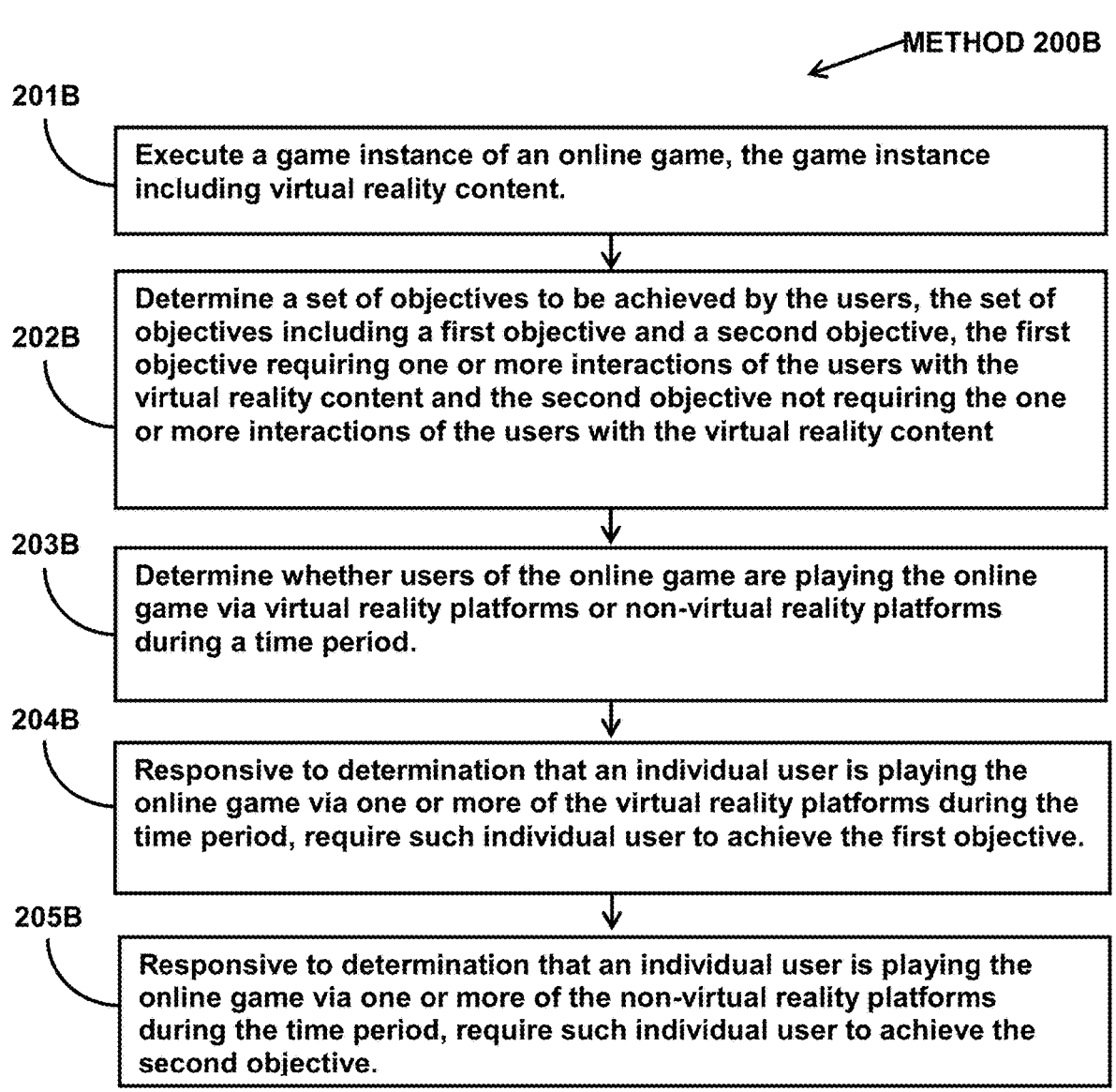
Figure 2C:
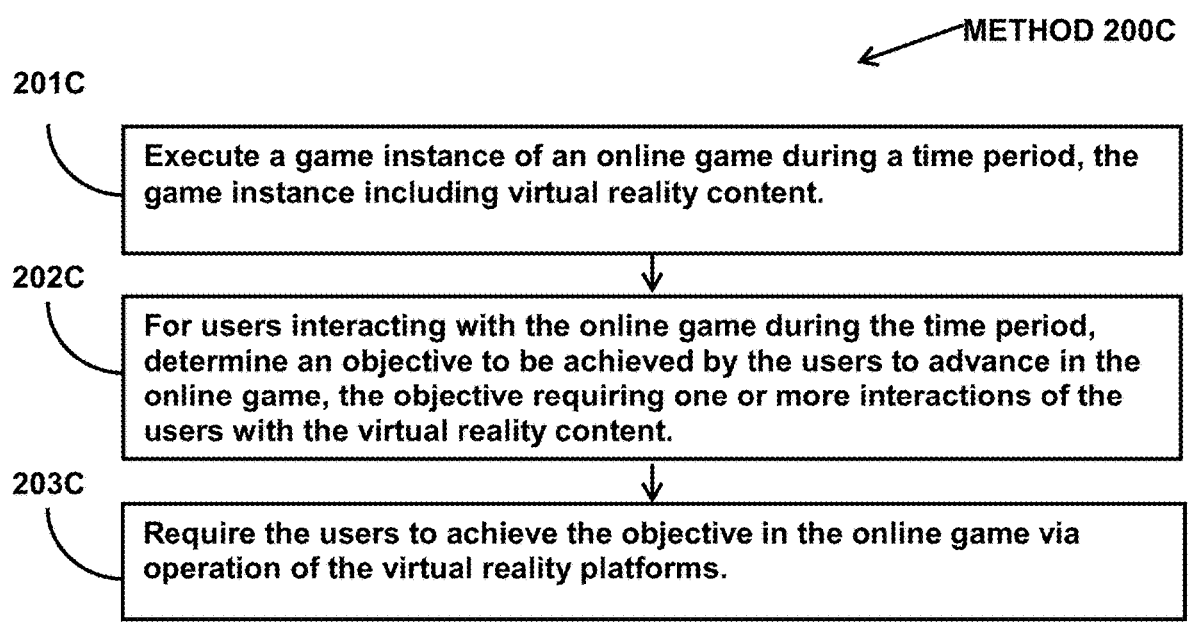

FIGS. 2A-2C illustrate methods 200A-C for providing virtual reality content in an online game. The operations of methods 200A-C presented below are intended to be illustrative. In some implementations, methods 200A-C may be accomplished with one or more additional operations not described, and/or without one or more of the operations discussed. In some implementations, two or more of the operations may occur substantially simultaneously.

In some implementations, methods 200A-C may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of methods 200A-C in response to instructions stored electronically on one or more electronic storage mediums. The one or more processing devices may include one or more devices configured through hardware, firmware, and/or software to be specifically designed for execution of one or more of the operations of methods 200A-C.

Referring to FIG. 2A and method 200A, at operation 201A, a game instance of an online game may be executed. The game instance may include virtual reality content. In some implementations, operation 201A may be performed by a processor component the same as or similar to game instance component 102A (shown in FIG. 1A and described herein).

At operation 202A, whether users of the online game are attempting to join the game instance via virtual reality platforms or non-virtual reality platforms may be determined. In some implementations, operation 202A may be performed by a processor component the same as or similar to platform component 104A (shown in FIG. 1A and described herein).

At operation 203A, responsive to determination that an individual user is attempting to join the game instance via one or more of the virtual reality platforms, access to the game instance may be provided to such individual user. In some implementations, operation 203A may be performed by a processor component the same as or similar to access component 106A (shown in FIG. 1 and described herein).

At operation 204A, responsive to determination that an individual user is attempting to join the game instance via one or more of the non-virtual reality platforms, access to the game instance may be denied to such individual user. In some implementations, operation 204A may be performed by a processor component the same as or similar to access component 106A (shown in FIG. 1A and described herein).

Referring to FIG. 2B and method 200B, at operation 201B, a game instance of an online game may be executed. The game instance may include virtual reality content. In some implementations, operation 201B may be performed by a processor component the same as or similar to game instance component 102B (shown in FIG. 1B and described herein).

At operation 202B, a set of objectives to be achieved by the users may be determined. The set of objectives may include a first objective, a second objective, and/or other objectives. The first objective may require one or more interactions of the users with the virtual reality content and the second objective may not require one or more interactions of the users with the virtual reality content. In some implementations, operation 202B may be performed by a processor component the same as or similar to objectives component 108B (shown in FIG. 1B and described herein).

At operation 203B, whether users of the online game are playing the online game via virtual reality platforms or non-virtual reality platforms during a time period may be determined. In some implementations, operation 203B may be performed by a processor component the same as or similar to platform component 104B (shown in FIG. 1B and described herein).

At operation 204B, responsive to determination that an individual user is playing the online game via one or more of the virtual reality platforms during the time period, such individual user may be required to achieve the first objective. In some implementations, operation 204B may be performed by a processor component the same as or similar to VR objectives component 110B (shown in FIG. 1B and described herein).

At operation 205B, responsive to determination that an individual user is playing the online game via one or more of the non-virtual reality platforms during the time period, such individual user may be required to achieve the second objective. In some implementations, operation 205B may be performed by a processor component the same as or similar to non-VR objectives component 112B (shown in FIG. 1B and described herein).

Referring to FIG. 2C and method 200C, at operation 201C, a game instance of an online game may be executed during a time period. The game instance may include virtual reality content. In some implementations, operation 201C may be performed by a processor component the same as or similar to game instance component 102C (shown in FIG. 1C and described herein).

At operation 202C, for users interacting with the online game during the time period, an objective to be achieved by the users to advance in the online game may be determined. The objective may require one or more interactions of the users with the virtual reality content. In some implementations, operation 202C may be performed by a processor component the same as or similar to objectives component 108C (shown in FIG. 1C and described herein).

At operation 203C, the users may be required to achieve the objective in the online game via operation of the virtual reality platforms. In some implementations, operation 203C may be performed by a processor component the same as or similar to progress component 114C (shown in FIG. 1C and described herein).

Virtual reality content in an online game may be provided by providing access to users attempting to join a game instance via virtual reality platforms and denying access to users attempting to join the game instance via non-virtual reality platforms. Virtual reality content in an online game may be provided by requiring users playing the online game via virtual reality platforms during a time period to achieve a first objective, and requiring users playing the online game via non-reality platforms during the time period to achieve a second objective. The first objective may require interaction with the virtual reality content and the second object may not require interaction with the virtual reality content. Virtual reality content in an online game may be provided by requiring all users to achieve an objective during a time period. The objective may require interaction with the virtual reality content.

In some embodiments, a system for providing virtual reality content in an online game, the system comprising: one or more physical processors configured by machine readable instructions to: execute a game instance of the online game, the game instance including the virtual reality content, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms; determine whether the users of the online game are attempting to join the game instance via the virtual reality platforms or the non-virtual reality platforms; responsive to determination that an individual user is attempting to join the game instance via one or more of the virtual reality platforms, provide access to the game instance to such individual user; and responsive to determination that an individual user is attempting to join the game instance via one or more of the non-virtual reality platforms, deny access to the game instance to such individual user. In some embodiments, the system as described above, wherein the one or more physical processors are further configured by machine readable instruction to: execute another game instance of the online game, the other game instance not including the virtual reality content; and responsive to the determination that the individual user is attempting to join the game instance via the one or more of the non-virtual reality platforms, provide access to the other game instance to such individual user. In some embodiments, the system as described above, wherein the game instance of the online game is executed during a time period. In some embodiments, the system as described above, wherein the time period includes a duration within 5 PM to 11 PM for a time zone in which the most number of users are located. In some embodiments, the system as described above, wherein the game instance of the online game includes a set of rewards for users interacting with the online game via the one or more of the virtual reality platforms, and the one or more physical processors are further configured by machine readable instruction to provide one or more rewards from the set of rewards to the users interacting with the online game via the one or more of the virtual reality platforms. In some embodiments, the system as described above, wherein the one or more rewards are provided to the users interacting with the online game via the one or more of the virtual reality platforms in response to the users joining the game instance via the one or more of the virtual reality platforms during a time period. In some embodiments, the system as described above, wherein the one or more rewards are provided to the users interacting with the online game via the one or more of the virtual reality platforms in response to the users interacting with the game instance via the one or more of the virtual reality platforms for a certain duration within a time period. In some embodiments, the system as described above, wherein the virtual reality platforms include a virtual reality headset display. In some embodiments, the system as described above, wherein the virtual reality platforms include a motion controller. In some embodiments, the virtual reality platforms include a haptic generator.

In some embodiments, a system for providing virtual reality content in an online game, the system comprising:

one or more physical processors configured by machine readable instructions to: execute a game instance of the online game, the game instance including the virtual reality content, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms; determine a set of objectives to be achieved by the users, the set of objectives including a first objective and a second objective, the first objective requiring one or more interactions of the users with the virtual reality content and the second objective not requiring the one or more interactions of the users with the virtual reality content; determine whether the users of the online game are playing the online game via the virtual reality platforms or the non-virtual reality platforms during a time period; responsive to determination that an individual user is playing the online game via one or more of the virtual reality platforms during the time period, require such individual user to achieve the first objective in the online game via the one or more of the virtual reality platforms; and responsive to determination that an individual user is playing the online game via one or more of the non-virtual reality platforms during the time period, require such individual user to achieve the second objective in the online game via the one or more of the non-virtual reality platforms. In some embodiments, the system as described above, wherein the one or more physical processors are further configured by machine readable instruction to: determine changes in the client computing platforms used by the users to interact with the online game during the time period; responsive to determination that an individual user changed from playing the online game via the one or more of the virtual reality platforms to the one or more of the non-virtual reality platforms during the time period, cancel the first objective for such individual user and require such individual user to achieve the second objective in the online game via the one or more of the non-virtual reality platforms; and responsive to determination that an individual user changed from playing the online game via the one or more of the non-virtual reality platforms to the one or more of the virtual reality platforms during the time period, cancel the second objective for such individual user and require such individual user to achieve the first objective in the online game via the one or more of the virtual reality platforms. In some embodiments, the system as described above, wherein the first objective is characterized by a first game difficulty and the second objective is characterized by a second game difficulty, the first game difficulty being lower than the second game difficulty. In some embodiments, the system as described above, wherein the first objective is characterized by a first type of gameplay and the second objective is characterized by a second type of gameplay, the first type of gameplay differing from the second type of gameplay. In some embodiments, the system as described above, wherein the first objective is associated with a first reward and the second objective is associated with a second reward, and the one or more physical professors are further configured to: responsive to determination that an individual user achieved the first objective, provide the first reward to such individual user; and responsive to determination that an individual user achieved the second objective, provide the second reward to such individual user.

In some embodiments, a system for providing virtual reality content in an online game, the system comprising: one or more physical processors configured by machine readable instructions to: execute a game instance of the online game, the game instance including the virtual reality content, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms; for users interacting with the online game during a time period, determine an objective to be achieved by the users to advance in the online game, the objective requiring one or more interactions of the users with the virtual reality content; and require the users to achieve the objective in the online game via operation of the virtual reality platforms. In some embodiments, the system as described above, wherein the one or more physical processors are further configured to: determine whether the users of the online game are playing the online game via the virtual reality platforms or the non-virtual reality platforms during the time period; and responsive to determination that an individual user is playing the online game via one or more of the non-virtual reality platforms during the time period, effectuate presentation of an invitation to such user to change to one or more of the virtual reality platforms. In some embodiments, the system as described above, wherein the one or more physical processors are further configured to: execute another game instance of the online game, the other game instance not including the virtual reality content; determine whether the users of the online game are playing the online game via the virtual reality platforms or the non-virtual reality platforms during the time period; and responsive to determination that an individual user is playing the online game via one or more of the non-virtual reality platforms during the time period, provide access to the other game instance to such individual user.

Regulating Access to Game Content of an Online Game

Figure 4:
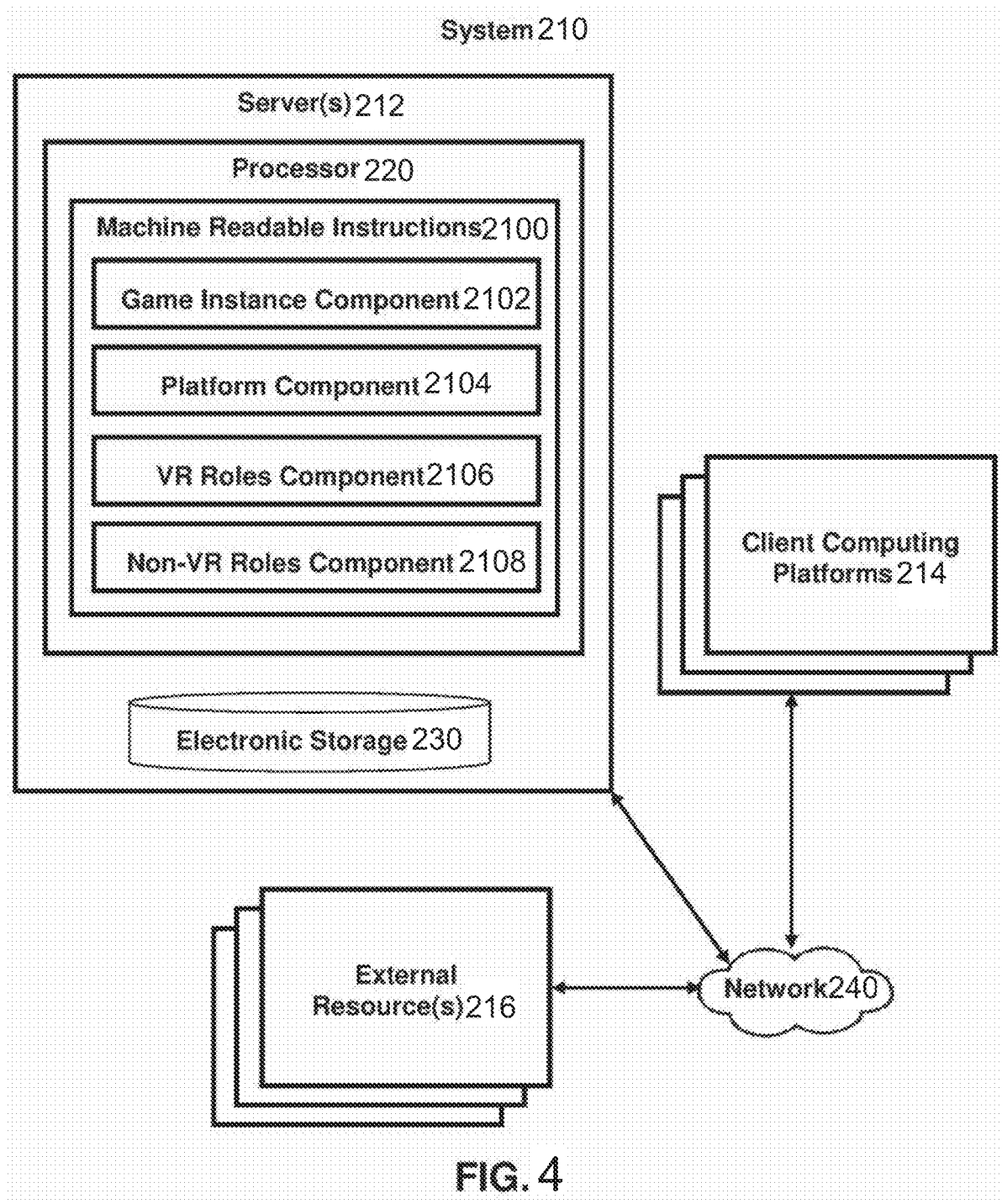
FIG. 4 illustrates a system for regulating access to game content of an online game.

FIG. 4 illustrates system 210 configured to regulate access to game content of an online game. The online game may be provided and/or executed by system 210. An online game may include game content that may be played cooperatively by groups of users. The game content may include a group roles set for the users in individual groups. The group roles set may include a first set of group roles, a second set of group roles, and/or other set(s) of group roles. Users of the online game may interact with the online game and/or each other via the users' client computing platforms. Client computing platforms 214 may include virtual reality platforms and/or non-virtual reality platforms. Access to the game content of the online game may be regulated by executing a game instance of the online game and determining whether the users are attempting to play the game instance via the virtual reality platforms or the non-virtual reality platforms. The first set of group roles may be presented to users attempting to play the game instance via the virtual reality platforms. The second set of group roles may be presented to users attempting to play the game instance via the non-virtual reality platforms.

Figure 6:
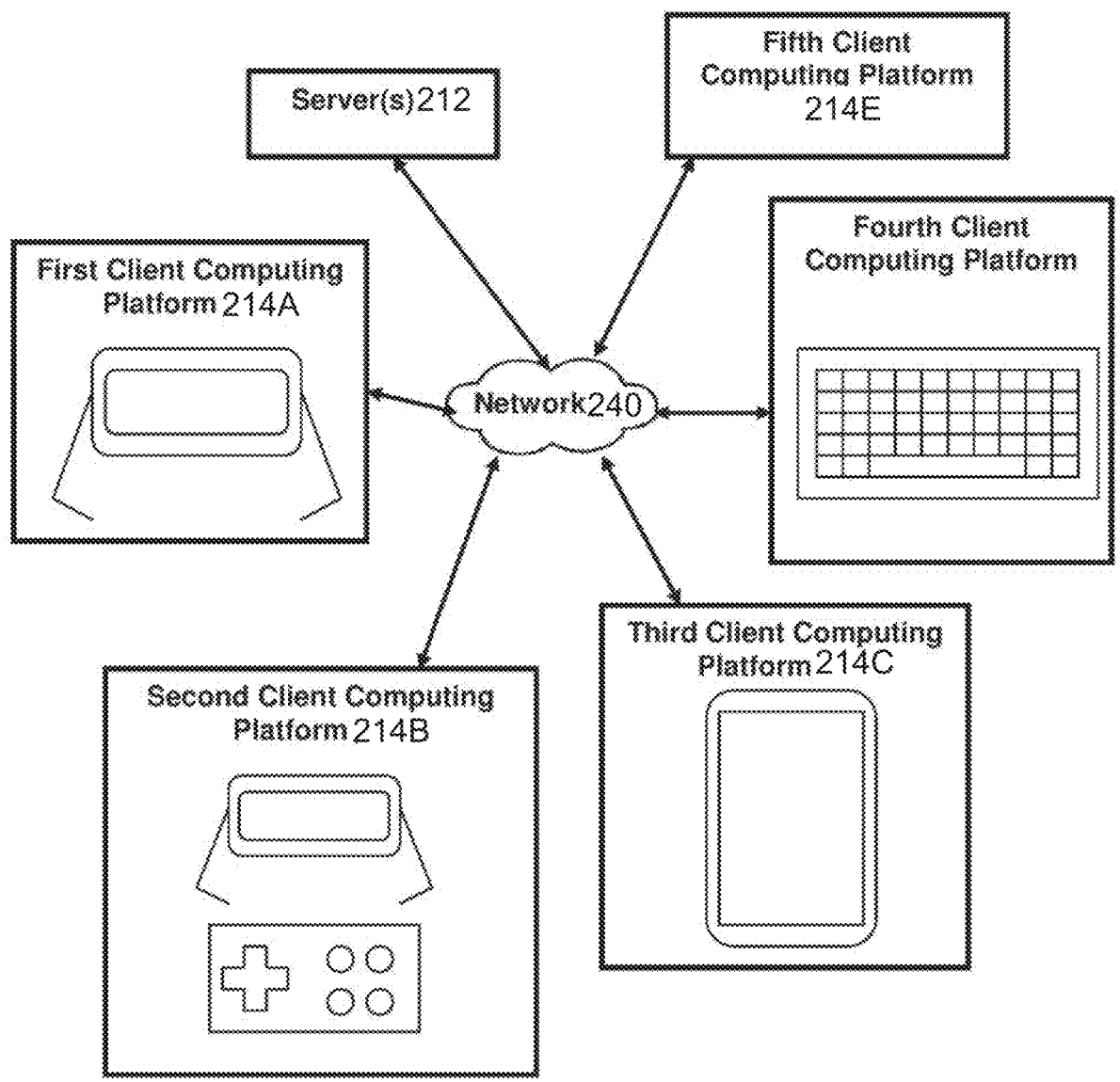
FIG. 6 illustrates exemplary connections between server(s) and client computing platforms.

Providing one or more of the online games may include hosting the online games over a network. In some implementations, as shown in this example, system 210 may include one or more servers 212 configured for hosting online games. Users may access system 210, the online game, and/or a game instance of the online game via client computing platforms 214, such as client computing platforms 214A-E as shown in FIG. 6.

Referring to FIG. 4, system 210 may include one or more of server(s) 12, client computing platforms 214, external resource(s) 216, processor 220, electronic storage 230, network 240, and/or other components. Server(s) 212, client computing platforms 214, external resource(s) 216, and/or other components may be connected via network 240.

Client computing platforms 214 may include virtual reality platforms and/or non-virtual reality platforms. Virtual reality platforms may refer to platforms that allow users of a game to interact with a virtual space as the users would interact with the real world. The virtual reality platforms may provide one or more sensory experience that simulates the users' presence in the virtual space. Sensory experience provided by virtual reality platforms may include one or more of experience based on sight, touch, hearing, smell and/or other sensory experience. As non-limiting examples, the virtual reality platforms may include one or more of a virtual reality headset display, a motion controller, a haptic generator, and/or other virtual reality platforms.

In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

Virtual reality platforms may present views of the online game in a manner that simulates the users' immersion within the online game. The online game may have a higher interactive potential when played via the virtual reality platforms than when played via the non-virtual reality platforms. For example, the virtual reality platforms may be able to support additional and/or increased motion inputs, views, visibility, feedback and/or other interactions a user may have with the online game.

External resource(s) 216 may include sources of information, hosts and/or providers of virtual environments outside of system 210, external entities participating with system 210, and/or other resources.

Server(s) 212 may include electronic storage 230. Electronic storage 230 may include electronic storage media that electronically stores information. Electronic storage 230 may store software algorithms, information determined by processor 220, information received remotely, information received from server(s) 212, information received from client computing platforms 214, and/or other information that enables system 210 and/or server(s) 212 to function properly. For example, electronic storage 230 may store information relating to an online game, information relating to a game instance of an online game, information relating to virtual reality platforms and non-virtual reality platforms, information relating to group roles, information relating to one or more computer components, and/or other information.

Server(s) 212 may be configured to communicate with one or more client computing platforms 214 according to a client/server architecture, and with each other. Server(s) 212 may include processor 220 configured to execute one or more machine readable instructions 2100. Machine readable instructions 2100 may include one or more computer program components. The computer program components may include one or more of game instance component 2102, platform component 2104, VR roles component 2106, non-VR roles component, 2108, and/or other components. In some implementations, client computing platforms 214 may include one or more computer program components that are the same as or similar to the computer program components of physical processor 220 to facilitate in game actions.

Game instance component 2102 may be configured to execute a game instance of the online game. The online game may include the game content that is played cooperatively by groups of users. For example, a game content may be played cooperatively by one or more groups of users against entities controlled by game instance component 2102 (Player vs. Environment content). As another example, a game content may be played cooperatively between group(s) of users against other group(s) of users (Player vs. Player content). As another example, a game content may be played cooperatively between group(s) of users against other group(s) of users and against entities controlled by game instance component 2102 (Hybrid content).

A group of users may refer to one or more users associated together in an online game. A group of users may associate together as a loose collection of users that work together to progress through a game session. A game session may include a beginning, a middle, an end, and/or other portions. A game instance may include one or more game sessions. One or more users of a group may be associated together based on one or more common objectives in the online game/game session. For example, a group of users may include an affiliation (e.g., alliance, guild, team, party, etc.) in an online game and a common objective in the online game may include defeating enemies of the affiliation (e.g., non-player entities or enemies controlled by users not in the alliance/guild/team/party, etc.), reaching a certain point in the online game, and/or other common objectives.

A group of users may be inclusive or exclusive of other groups. For example, users belonging in one group may be prohibited from joining another group (e.g., in an online battle game between groups A and B, users in group A may be prohibited from joining group B and vice versa, etc.). As another example, users belonging in one group may be allowed to join another group (e.g., in an online racing game between factions C and D, faction C may include multiple groups and users in one group of faction C may join another group of faction C, etc.).

A group of users may be temporary or persistent. A temporary group may refer to an affiliation of users that may exist for a single game session or a single game instance (which may include one or more game sessions). For example, users in a game session may be randomly assigned to different teams. When the game session is over, the users' assignments to the teams may be cleared and the users may again be randomly assigned to different teams. As another example, users in a game instance may join different teams. The team assignment for a user may be maintained (unless changed by the user) across multiple game sessions of the game instance. The team assignment for the user may be cleared when the user leaves the game instance.

A persistent group may refer to an affiliation of users that crosses over multiple game instances. For example, a user may be assigned to a team while playing in a cooperative gameplay. After the cooperative gameplay, the user may switch to an individual gameplay. When the user returns to the cooperative gameplay, the user's assignment to the team may be maintained and the user may cooperatively play the online game with the same team. As another example, a user may join a team during a game instance and leave the game instance. When the user joins another game instance, the user's team assignment may be maintained.

Users in a group may play the online game by taking on one or more group roles. A group role may refer to one or more parts and/or functions in the online game that assist other part(s) and/or function(s) in the same group. A group role may be static or dynamic. For example, a group role may include the same part(s) and/or function(s) in the online game regardless of the time(s) of play and/or the state(s) of the online game. As another example, a group role may include different part(s) and/or function(s) in the online game based on the time(s) of play and/or the state(s) of the online game. A group role may allow a user to take one or more actions in the online game to progress in the game and/or cooperate with other users in the group. Of possible actions that may be available in the online game, different sets of options may be made available to different group roles.

For example, an online game may include a group role of a group member, a group role of a group leader, and/or other group roles. A user playing the role of a group leader may be provided with additional options in the online game not available to a user playing the role of a group member. Additional options available to a group leader may be made available during a play portion of the online game (e.g., racing portion of a racing game, etc.) and/or during a non-play portion of the online game (e.g., one or more portions of a racing game used to determine racing tracks, weather conditions, cars available, assignment of specific cars to specific group member, inviting and/or accepting users to a group, etc.). For example, during a play portion of the online game, a group leader may be provided with additional options of assigning task(s) to group members, and/or other options. As another example, during a non-play portion of the online game, a group leader may be provided with additional options of adding/removing users from the group, and/or other options. As another example, a group leader may be provided with additional and/or different interfaces within the online game than a group member. Additional and/or different interfaces may allow a group leader to perform one or more additional options.

A group roles set may refer to one or more group roles available for an individual group. A group roles set for one group may include the same or different group roles as a group roles set for another group. For example, in an online space fighter game between group A and group B, a group roles set for group A and group B may both include a group role of a pilot and a group role of a navigator. As another example, in an online fantasy game between group C and group D, group C may include group role of a knight and a group role of a priest, and group D may include group role of a troll and a group role of a dragon. Other types of group roles are contemplated.

A game content may include one or more group roles set for the users in individual groups. Group roles in individual group roles sets may be played cooperatively with each other and/or may complement each other. Interaction with the game instance by one group role in a group roles set may assist another group role in the group roles set. For example, for an individual group, one group role in a group role set may include a group role of a fighter and another group role in the group role set may include a group role of a healer. A fighter may assist a healer by providing combat support in fight against enemies. A healer may assist a fighter by providing healing support. Other types of cooperation between group roles are contemplated.

A group roles set may include different sets of group roles. For example, a group roles set may include a first set of group roles, a second set of group roles, and/or other set(s) of group roles. The first set of group roles may differ from the second set of group roles. The first set of group roles and the second set of group roles may include different capabilities of interacting with the online game. For example, the first set of group roles may include higher capabilities of interacting with the online game than the second set of group roles.

Higher capabilities of interacting with the online game may provide greater potential for game experience based on one or more of sight, touch, hearing, smell, and/or other sensory experience. Higher capabilities of interacting with the online game may include additional and/or increased motion inputs, views, visibility, feedback and/or other interactions a user may have with the online game. For example, the first set of group roles may include additional and/or increased motion inputs that allow the users to provide input through one or more motions and/or gestures (e.g., waving a hand/motion controller in a particular manner to provide input associated with a combat movement, moving a head to change the direction of view, etc.). As another example, the first set of group roles may include additional and/or increased feedback (e.g., a hit is registered with one or more vibrations and/or temperature, etc.). Other types of interactive capabilities are contemplated.

In some implementations, the first set of group roles may be characterized by a first type of gameplay and the second set of group roles may be characterized by a second type of gameplay. A gameplay may refer to a manner in which users interact with the online game. A gameplay may define one or more of views of the online game, options available to users to interact with the online game and/or each other, inputs into the online game available to users, outputs out of the online game available to users, and/or other manner in which users may interact with the online game. For example, types of gameplays may include role-playing, first-person shooter, third-person action, real-time strategy, turn-based strategy, simulation, music or rhythm playing, social interaction, twitching and/or any other gameplays.

The first type of gameplay may differ from the second type of gameplay. For example, the first set of group roles may be characterize by a first-person battle type of gameplay and the second set of group roles may be characterized by a resource gathering type of gameplay. A battle type of gameplay may include users using virtual reality platforms to fight against enemies from a first-person view (e.g., view of the game instance may be generated from the position of the users' avatars, and the users may use physical motions to change the direction of view, to duck, to jump, to strike, to defend, etc. within the online game) A resource gathering type of gameplay may include users using non-virtual reality platforms to gather resources (e.g., view of the game instance may be generated above the position of the user's avatars (e.g., top-down view, etc.), and the users may use controllers (e.g., game controller, keyboard, mouse, touch screen, etc.) to command gathering of resources, etc.). Other types of gameplays are contemplated.

The game instance of the online game may comprise a simulated virtual space, e.g., a virtual space that is accessible by users via clients (e.g., client computing platforms 214) that present the views of the virtual space to a user. The virtual space may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

It should be understood the above description of the manner in which state of the virtual space associated with the online game as determined by game instance component 2102 is not intended to be limiting. Game instance component 2102 may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Game instance component 2102 may be configured to use the game instance to generate game state information that is transmitted to client computing platforms 214 over network 240. The execution of the instance of the online game by game instance component 2102 may include determining a game state associated with the online game. The game state information may facilitate presentation of views of the online game to the users via client computing platforms 214. The game state information may include information defining the virtual space in which the online game is played.

Game instance component 2102 may be configured to transmit the game state information over network 240 to the client computing platforms 214, causing client computing platforms 214 to present views of the online game. The game state information may be communicated (e.g., via streaming visual data, via object/position data, and/or other state information) from server(s) 212 to client computing platforms 214 for presentation to users.

The game state information determined and transmitted to a given client computing platform 214 may correspond to a view for a user character being controlled by a user via the given client computing platform 2104. The state determined and transmitted to a given client computing platform 2104 may correspond to a location in a virtual space associated with the online game. The view described by the game state information for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

Views of the online game presented via a virtual reality platform may include views presented on a virtual reality headset display (e.g., a head-mounted display device, etc.).

The views may be presented stereoscopically-one for each eye-via the virtual reality headset display and the user's brain may combine them to create a three-dimensional experience. The virtual reality headset display may include a head tracking system that tracks movement (e.g., position, orientation, change in position, change in orientation, etc.) of the users as they move their heads and/or move around the environment. The virtual reality headset display may include a sensor system (e.g., image sensor system, distance sensor system, etc.) that track movement of the users' body parts (e.g., user's hands, arms, feet, legs, etc.) and/or objects (e.g., glove, wand, controller, markers, etc.). Views of the online game presented via a non-virtual reality platform may include views presented on a display for one or more of a mobile device (e.g., a smart phone, tablet, laptop, etc.), desktop computer, gaming console, televisions, and/or other non-virtual reality platforms.

The execution of the game instance may enable interaction by the users with the online game and/or each other. Game instance component 2102 may be configured to perform operations in the game instance in response to commands received over network 240 from client computing platforms 214. Within the instance of the online game, users may interact with elements in the online game and/or with each other through gameplays provided by the online game.

Users may participate in the online game through client game applications implemented on client computing platforms 214 associated with the users. Within the game instance of the online game executed by game instance component 2102, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

The user controlled element(s) may move through and interact with the virtual space (e.g., user-virtual space units in the virtual space, non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Controls of virtual elements in the online game may be exercised through commands input by a given user through client computing platforms 214. The given user may interact with other users through communications exchanged within the virtual space. Such communications may include one or more of textual chat, instant messages, private messages, voice communications, and/or other communications. Communications may be received and entered by the users via their respective client computing platforms 214. Communications may be routed to and from the appropriate users through server(s) 212 (e.g., through game instance component 2102).

Execution and/or performance of the user action by game instance component 2102 may produce changes to the game state, which may reflect progresses and/or results of the user actions. In some examples, state changes caused by the execution of the user actions may be recorded in the electronic storage 230 to facilitate persistency throughout the instance of the online game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via a virtual reality platform, a given user may input a broad range of commands. The input commands via virtual reality platform may include the user performing the action as an input command. Based on the user's actions in the real world, the user may be able to look around, move about, and or otherwise act within the virtual space in which the online game is played.

The instance of the online game may comprise virtual entities automatically controlled in the instance of the online game. Such virtual entities may or may not be associated with any user. As such, the automatically controlled virtual entities may be generated and/or developed by artificial intelligence configured with server(s) 212 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with server(s) 212. As used herein, such automatically controlled virtual space entities in the instance of the online game are referred to as "non-player entities."

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

Platform component 2104 may be configured to determine whether the users of the online game are attempting to play the game instance via the virtual reality platforms or the non-virtual reality platforms. Platform component 2104 may obtain client computing platform information and identify client computing platforms 214 used to interact with the virtual space based on the client computing platform information. The client computing platform information may include information that identifies virtual reality capability of client computing platforms 214 (e.g., virtual reality vs. non-virtual reality, etc.), a class of client computing platforms 214, a particular type of client computing platform 214, and/or other information identifying client computing platforms 214.

Platform component 2104 may include or retrieve information (for example, a database, etc.) that matches the client computing platform information to one or more virtual reality platforms or one or more non-virtual reality platforms. For example, a class of client computing platform may include general descriptions of client computing platforms such as information indicating that a client computing platform includes a virtual reality headset display, a motion controller, a game controller, a haptic generator, a speaker, a head-mounted display device, a desktop computing device, a laptop computing device, a tablet device, a mobile device (e.g., smart phone), and/or other general description regarding the client computing platforms used to interact with the virtual space. Platform component 2104 may include or retrieve information that matches one or more information regarding the class of client computing platform to one or more virtual reality platforms or one or more non-virtual reality platforms.

As another example, a type of client computing platform may include specific descriptions of client computing platforms such as a particular brand, model, operating system, and/or other description that more specifically identifies the client computing platform 14 used to interact with the virtual space. Platform component 2104 may include or retrieve information that matches one or more information regarding the type of client computing platform to one or more virtual reality platforms or one or more non-virtual reality platforms.

For example, FIG. 6 illustrates exemplary connections between server(s) 212 and client computing platforms 214. Server(s) 212 may execute a game instance of an online game and users may be attempting to play the game instance via computing platforms 214. Computing platforms 214 may include first client computing platform 214A (e.g., a virtual reality headset display, etc.), second client computing platform 214B (e.g., a head-mounted display and a game controller, etc.), third client computing platform 214C (e.g., a tablet device, etc.), fourth client computing platform 214D (e.g., a laptop computing device, etc.), fifth client computing platform 214E (e.g., other client computing platform(s)), and/or other client computing platforms.

Based on the client computing platform information, platform component 2104 may determine that users of first client computing platform 214A and second client computing platform 214B are attempting to play the game instance via virtual reality platforms. Based on the client computing platform information, platform component 2104 may determine that users of third client computing platform 214C and fourth client computing platform 214D are attempting to play the game instance via non-virtual reality platforms. Based on the client computing platform information, platform component 2104 may determine whether the user of fifth client computing platform 214E is attempting to play the game instance via virtual reality platform or non-virtual reality platform.

Platform component 2104 may obtain the client computing platform information passively or actively. Platform component 2104 may passively obtain the client computing platform information based on communications with client computing platforms 214 such as by reading headers and/or other portions of communications from client computing platforms 214 to identify the client computing platforms being used to interact with the virtual space. For example, platform component 2104 may read Hypertext Transfer Protocol ("HTTP") headers to determine a browser used to interact with the virtual space and accordingly identify the client computing platform that operates the browser. Agents used to interact with the virtual space other than a browser may be operating on client computing platform 214. Such agents may encode the client computing platform information and provide to server(s) 212 the client computing platform information.

Platform component 2104 may actively obtain the client computing platform information such as by querying and/or otherwise causing client computing platforms 214 to provide the client computing platform information. For example, platform component 2104 and/or an agent operating on client computing platforms 214 may cause a prompt for users to input the client computing platform information.

In some implementations, platform component 2104 may be configured to determine changes in client computing platforms 214 used by the users to interact with the online game. Platform component 2104 may determine when a given user changes the client computing platform 214 used to interact with the virtual space. For example, a user may change from using a laptop device to using a virtual reality headset display to interact with the virtual space. Platform component 2104 may detect the change and accordingly associate the new client computing information with the user.

VR roles component 2106 may, responsive to determination that an individual user is attempting to play the game instance via one or more of the virtual reality platforms, effectuate presentation of the first set of group roles to such individual user. Presentation of the first group of roles may be effectuated through provision of visual and/or audio information relating to the first set of group roles via the users' client computing platforms 214.

Visual information may refer to one or more information that may be observed visually. Visual information may be static or dynamic. For example, visual information relating to a set of group roles may include one or more of an image (e.g., an image showing the set of group roles, etc.), a text (e.g., a text listing the set of group roles, etc.), a video (e.g., a video showing the set of group roles, etc.) and/or other visual information conveying information regarding the set of group roles.

Audio information may refer to one or more information that may be observed audibly. Audio information may be static or dynamic. For example, audio information relating to a set of group roles may include one or more of a sound (e.g., a sound clip associated with the set of group roles, etc.), a music (e.g., a song associated with the first set of group roles, etc.), a word (e.g., a word associated with the set of group roles, etc.), a sentence (e.g., a sentence describing the set of group roles), and/or other audio information conveying information regarding the set of group roles.

In some implementations, VR roles component 2106 may, responsive to determination that an individual user changed from playing the online game via the one or more of the non-virtual reality platforms to the one or more of the virtual reality platforms, effectuate presentation of the first set of group roles to such individual user.

In some implementations, effectuating presentation of the first set of group of roles may include receiving selection of a group role from the first set of group roles by the users attempting to play the game instance via one or more of the virtual reality platforms. The selected group roles may be implemented for the users attempting to play the game instance via one or more of the virtual reality platforms.

Users may select a group role from the first set of group roles via client computing platforms 214. For example, a user of first client computing platform 214A may select a group role by making a gesture or other movements observed by the virtual reality headset display. As another example, a user of second computing platform 214B may select a group role shown in the head-mounted display via operation of the game controller or by speaking a word/command associated with the group role. Other implementations of selecting the group role are contemplated.

In some implementations, effectuating presentation of the first set of group of roles may include selecting a group role from the first set of group roles for the users attempting to play the game instance via one or more of the virtual reality platforms. The selected group roles may be implemented for the users attempting to play the game instance via one or more of the virtual reality platforms.

VR roles component 2106 may select a group role from the first set of group roles for a user. The selection may be based on input received from the user (e.g., input indicating the user's preference for play, etc.), information about the user (e.g., the user's amount of experience, level, currency, prior role(s), etc.), input received from another user (e.g., input from a team leader indicating the user's role, etc.) and/or other information relating to selection of the group role.

In some implementations, VR roles component 2106 may exclude from the first set of group roles roles fulfilled by other users in the group. For example, the first set of group roles may include two roles for fighters and other roles. Before a user joins the online game, two other users in the same group may have already selected the two roles for fighters. The user may be presented with the first set of group roles excluding the two roles for fighters.

Non-VR roles component 2108 may, responsive to determination that an individual user is attempting to play the game instance via one or more of the non-virtual reality platforms, effectuate presentation of the second set of group roles to such individual user. Presentation of the second group of roles may be effectuated through provision of visual and/or audio information relating to the second set of group roles via the users' client computing platforms 214.

In some implementations, non-VR roles component 2108 may, responsive to determination that an individual user changed from playing the online game via the one or more of the virtual reality platforms to the one or more of the non-virtual reality platforms, effectuate presentation of the second set of group roles to such individual user.

In some implementations, effectuating presentation of the second set of group of roles may include receiving selection of a group role from the second set of group roles by the users attempting to play the game instance via one or more of the non-virtual reality platforms.

Users may select a group role from the second set of group roles via client computing platforms 214. For example, a user of third client computing platform 214C may select a group role by touching different portions of the tablet device. As another example, a user of fourth computing platform 214D may select a group role shown in a laptop computing device via operation of the laptop computing device (e.g., operation of a keyboard and/or mouse, etc.) to input associated with the group role. Other implementations of selecting the group role are contemplated.

In some implementations, effectuating presentation of the second set of group of roles may include selecting a group role from the second set of group roles for the users attempting to play the game instance via one or more of the non-virtual reality platforms. The selected group roles may be implemented for the users attempting to play the game instance via one or more of the non-virtual reality platforms.

In some implementations, the first set of group roles may be based on the users attempting to the play the game instance via one or more of the virtual reality platforms and other client computing platform information (e.g., class, type, etc.) for the client computing platforms 214. For example, the first set of group roles may be adjusted based on the class and/or type of the virtual reality platform. In some implementations, the second set of group roles may be based on the users attempting to the play the game instance via one or more of the non-virtual reality platforms and other client computing platform information (e.g., class, type, etc.) for the client computing platforms 214. For example, the second set of group roles may be adjusted based on the class and/or type of the non-virtual reality platform.

For example, FIGS. 7-8 illustrates exemplary data structures 2400, 2500 storing platform information for client computing platforms and group role information. The data representation of data structures 2400, 2500 illustrated herein are for illustrative purposes only. The data structures may take different forms and may store some or all of the illustrated data values (as well as others not illustrated). Data structures 2400, 2500 may be stored in electronic storage (e.g., electronic storage 230 illustrated in FIG. 4). Data structures 2400, 2500 and/or other data structures may be programmed into platform component 2104, updated by platform component 2104, obtained by platform component 2104 from electronic storage 230, obtained by platform component 2104 from remote location (e.g., a server, a network, etc.), and/or obtained by platform component 2104 in other ways.

As illustrated, data structure 2400 may store client computing platform information for various client computing platforms that may be used to interact with the online game. For example, data structure 2400 may store various client computing platforms and their corresponding characteristics, which may indicate capabilities of the client computing platforms. For example, data structure 2400 may store an identifier (which may be auto-incremented, not an actual identifier such as a MAC address), client computing platform information, and/or other information. Data structure 2400 may match a certain identifier with certain client computing platform information.

For example, a virtual reality platform identified as "VR A" may correspond to client computing platform information for first client computing platform 214A (e.g., a virtual reality headset display, etc.). A virtual reality platform identified as "VR B" may correspond to second client computing platform 214B (e.g., a head-mounted display and a game controller, etc.). A non-virtual reality platform identified as "Non-VR A" may correspond to third client computing platform 214C (e.g., a tablet device, etc.). And a non-virtual reality platform identified as "Non-VR B" may correspond to fourth client computing platform 214D (e.g., a laptop computing device, etc.).

The virtual reality platform "VR A" may correspond to identifier 1. The virtual reality platform "VR B" may correspond to identifier 2. The non-virtual reality platform "Non-VR A" may correspond to identifier 3. And the non-virtual reality platform "Non-VR B" may correspond to identifier 4. In some implementations, one or more platforms may correspond to multiple identifiers. In some implementations, one or more identifiers may correspond to multiple platforms.

As illustrated, data structure 2500 may store group role information for various client computing platforms that may be used to interact with the online game. Data structure 2500 may include identifiers that correspond to one or more sets of group roles. For example, data structure 2500 may include identifiers that correspond to one or more group roles for the first set of group roles and/or second set of group roles. "Group Role A" may correspond to identifiers 1 and 2. "Group Role B" may correspond to identifier 1. "Group Role C" may correspond to identifier 3. "Group Role D" may correspond to identifier 4.

Based on data structures 2400 and 2500, VR roles component 2106 may effectuate presentation of the first set of group roles to users playing the online game via one or more of the virtual reality platforms. For example, VR roles component 2106 may effectuate presentation of "Group Role A" to users of first client computing platform 214A and second client computing platform 214B. VR roles component 2106 may also effectuate presentation of "Group Role B" to the user of first client computing platform 214A. Other uses of data structures to effectuate presentation of the first set of group roles to users playing the online game via one or more of the virtual reality platforms are contemplated.

Based on data structures 2400 and 2500, non-VR roles component 2108 may effectuate presentation of the second set of group roles to users playing the online game via one or more of the non-virtual reality platforms. Non-VR roles component 2108 may effectuate presentation of "Group Role C" to users of third client computing platform 214C and fourth client computing platform 214D. Non-VR roles component 2108 may also effectuate presentation of "Group Role D" to the user of fourth client computing platform 214D. Other uses of data structures to effectuate presentation of the second set of group roles to users playing the online game via one or more of the non-virtual reality platforms are contemplated.

In some implementations, server(s) 212, client computing platforms 214, and/or external resource(s) 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 212, client computing platforms 214, and/or external resource(s) 216 may be operatively linked via some other communication media.

A given client computing platform 214 may include one or more processors configured to execute computer program components. The computer program components may be configured to enable a user associated with the given client computing platform 214 to interface with system 210 and/or external resource(s) 216, and/or provide other functionality attributed herein to client computing platforms 214.

Server(s) 212 may include electronic storage 230, one or more processors 220, and/or other components. Server(s) 212 may include communication lines, or ports to enable the exchange of information with a network and/or other computing platforms. Illustration of server(s) 212 in FIG. 4 is not intended to be limiting. Server(s) 212 may include a plurality of hardware, software, and/or firmware components operating together to provide the functionality attributed herein to server(s) 212. For example, server(s) 212 may be implemented by a cloud of computing platforms operating together as server(s) 212.

Processor 220 may be configured to provide information processing capabilities in server(s) 212. As such, processor 220 may include one or more of a digital processor, a central processing unit, a graphics processing unit, a microcontroller, an analog processor, a digital circuit designed to process information, an analog circuit designed to process information, a state machine, and/or other mechanisms for electronically processing information.

Although processor 220 is shown in FIG. 4 as a single entity, this is for illustrative purposes only. In some implementations, processor 220 may include a plurality of processing units. These processing units may be physically located within the same device, or processor 220 may represent processing functionality of a plurality of devices operating in coordination. Processor 220 may be configured to execute computer components 2102, 2104, 2106, and/or 2108. Processor 220 may be configured to execute computer components 2102, 2104, 2106, and/or 2108 by software; hardware; firmware; some combination of software, hardware, and/or firmware; and/or other mechanisms for configuring processing capabilities on processor 220.

It should be appreciated that although computer components 2102, 2104, 2106, and 2108 are illustrated in FIG. 4 as being co-located within a single processing unit, in implementations in which processor 220 includes multiple processing units, one or more of computer components 2102, 2104, 2106, and/or 2108 may be located remotely from the other components.

The description of the functionality provided by the different computer components 2102, 2104, 2106, and 2108 described herein is for illustrative purposes, and is not intended to be limiting, as any of computer components 2102, 2104, 2106, and 2108 may provide more or less functionality than is described. For example, one or more of computer components 2102, 2104, 2106, and/or 2108 may be eliminated, and some or all of its functionality may be provided by other computer components 2102, 2104, 2106, and/or 2108. As another example, processor 220 may be configured to execute one or more additional computer components that may perform some or all of the functionality attributed to one or more of computer components 2102, 2104, 2106, and/or 2108.

Electronic storage 230 may comprise electronic storage media that electronically stores information. The electronic storage media of electronic storage 230 may include one or both of system storage that is provided integrally (i.e., substantially non-removable) with server(s) 212 and/or removable storage that is removably connectable to server(s) 212 via, for example, a port (e.g., a USB port, a firewire port, etc.) or a drive (e.g., a disk drive, etc.). Electronic storage 230 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 230 may include one or more virtual storage resources (e.g., cloud storage, a virtual private network, and/or other virtual storage resources). Although electronic storage 230 is shown in FIG. 4 as a single entity, this is for illustrative purposes only. In some implementations, electronic storage 230 may comprise a plurality of storage units. These storage units may be physically located within the same device, or electronic storage 230 may represent storage functionality of a plurality of devices operating in coordination.

Figure 5:
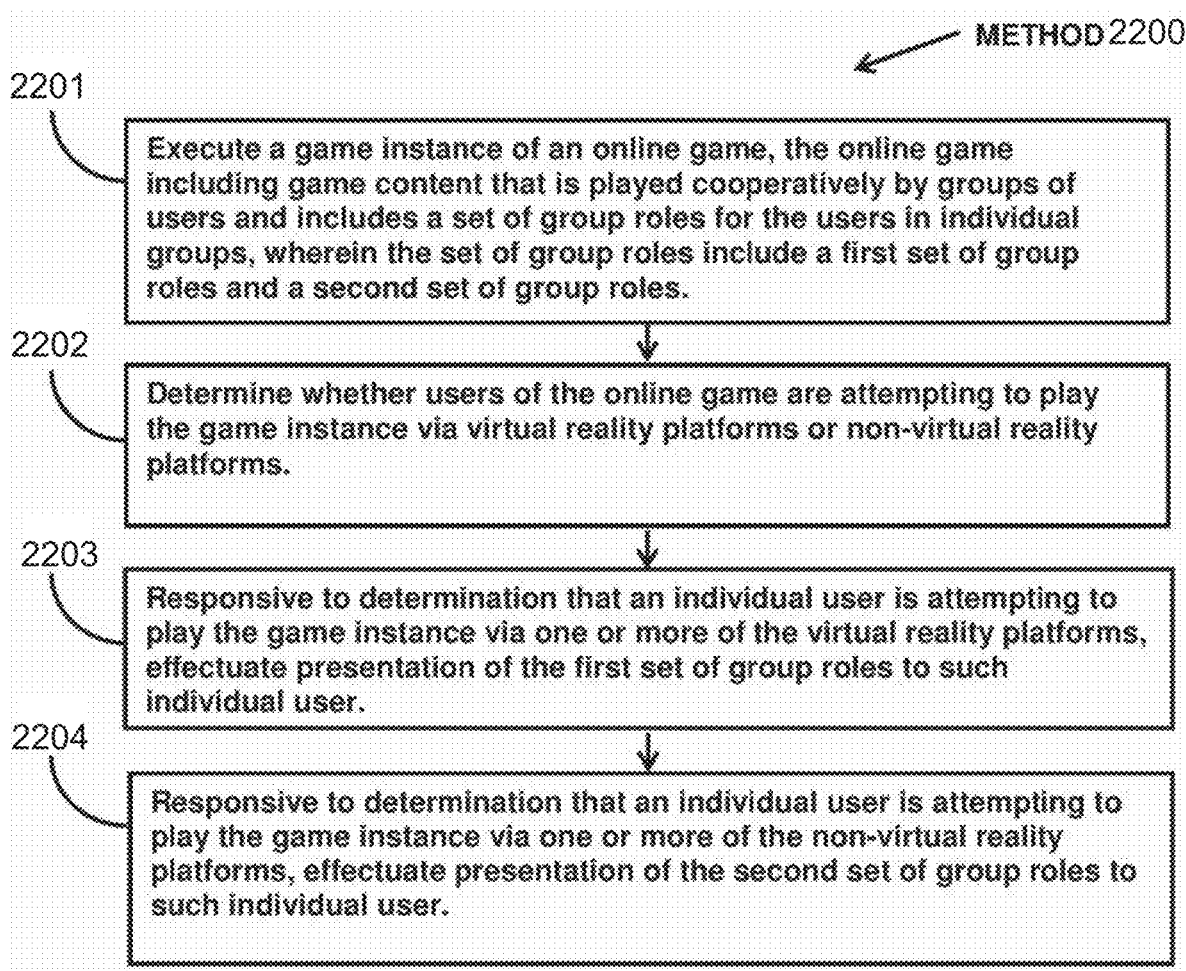
FIG. 5 illustrates a method for regulating access to game content of an online game.

FIG. 5 illustrates method 2200 for regulating access to game content of an online game. The operations of method 2200 presented below are intended to be illustrative. In some implementations, method 2200 may be accomplished with one or more additional operations not described, and/or without one or more of the operations discussed. In some implementations, two or more of the operations may occur substantially simultaneously.

In some implementations, method 2200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 2200 in response to instructions stored electronically on one or more electronic storage mediums. The one or more processing devices may include one or more devices configured through hardware, firmware, and/or software to be specifically designed for execution of one or more of the operations of method 2200.

Referring to FIG. 5 and method 2200, at operation 2201, a game instance of an online game may be executed. The online game may include game content that is played cooperatively by groups of users. The game content may includes a set of group roles for the users in individual groups, wherein the set of group roles include a first set of group roles and a second set of group roles. The first set of group roles may differ from the second set of group roles. In some implementations, operation 2201 may be performed by a processor component the same as or similar to game instance component 2102 (shown in FIG. 4 and described herein).

At operation 2202, whether users of the online game are attempting to play the game instance via virtual reality platforms or non-virtual reality platforms may be determined. In some implementations, operation 2202 may be performed by a processor component the same as or similar to platform component 2104 (shown in FIG. 4 and described herein).

At operation 2203, responsive to determination that an individual user is attempting to play the game instance via one or more of the virtual reality platforms, presentation of the first set of group roles may be effectuated to such individual user. In some implementations, operation 2203 may be performed by a processor component the same as or similar to VR roles component 2106 (shown in FIG. 4 and described herein).

At operation 2204, responsive to determination that an individual user is attempting to play the game instance via one or more of the non-virtual reality platforms, presentation of the second set of group roles may be effectuated to such individual user. In some implementations, operation 2204 may be performed by a processor component the same as or similar to non-VR roles component 2108 (shown in FIG. 4 and described herein).

Online games may include game content that may be played cooperatively by groups of users. The game content may include a group roles set for the users in individual groups. Users of an online game may interact with the online game via client computing platforms. The client computing platforms may include virtual reality platforms and non-virtual reality platforms. Access to the game content of the online game may be regulated by determining whether the users are attempting to play a game instance of the online game via the virtual reality platforms or the non-virtual reality platforms. A first set of group roles may be presented to users attempting to play the game instance via the virtual reality platforms. A second set of group roles may be presented to users attempting to play the game instance via the non-virtual reality platforms.

In some embodiments, a system that regulates access to game content of an online game, the system comprising: one or more physical processors configured by machine readable instructions to: execute a game instance of the online game and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the online game including the game content that is played cooperatively by groups of users and includes a group roles set for the users in individual groups, wherein the group roles set include a first set of group roles and a second set of group roles, the first set of group roles differing from the second set of group roles; determine whether the users of the online game are attempting to play the game instance via the virtual reality platforms or the non-virtual reality platforms; responsive to determination that an individual user is attempting to play the game instance via one or more of the virtual reality platforms, effectuate presentation of the first set of group roles to such individual user; and responsive to determination that an individual user is attempting to play the game instance via one or more of the non-virtual reality platforms, effectuate presentation of the second set of group roles to such individual user. In some embodiments, the system as described above, wherein the one or more physical computer processors configured by machine readable instructions to: determine changes in the client computing platforms used by the users to interact with the online game; responsive to determination that an individual user changed from playing the online game via the one or more of the virtual reality platforms to the one or more of the non-virtual reality platforms, effectuate presentation of the second set of group roles to such individual user; and responsive to determination that an individual user changed from playing the online game via the one or more of the non-virtual reality platforms to the one or more of the virtual reality platforms, effectuate presentation of the first set of group roles to such individual user. In some embodiments, the system as described above, wherein the first set of group roles is characterized by a first type of gameplay and the second set of group roles is characterized by a second type of gameplay, the first type of gameplay differing from the second type of gameplay. In some embodiments, the system as described above, wherein effectuating presentation of the first set of group roles includes: receiving selection of a group role from the first set of group roles by the users attempting to play the game instance via one or more of the virtual reality platforms; and implementing the selected group roles for the users attempting to play the game instance via one or more of the virtual reality platforms. In some embodiments, the system as described above, wherein effectuating presentation of the first set of group roles includes: selecting a group role from the first set of group roles for the users attempting to play the game instance via one or more of the virtual reality platforms; and implementing the selected group roles for the users attempting to play the game instance via one or more of the virtual reality platforms. In some embodiments, the system as described above, wherein effectuating presentation of the second set of group roles includes: receiving selection of a group role from the second set of group roles by the users attempting to play the game instance via one or more of the non-virtual reality platforms; and implementing the selected group roles for the users attempting to play the game instance via one or more of the non-virtual reality platforms. In some embodiments, the system as described above, wherein effectuating presentation of the second set of group roles includes: selecting a group role from the second set of group roles for the users attempting to play the game instance via one or more of the non-virtual reality platforms; and implementing the selected group roles for the users attempting to play the game instance via one or more of the non-virtual reality platforms. In some embodiments, the system as described above, wherein the virtual reality platforms include a virtual reality headset display. In some embodiments, the system as described above, wherein virtual reality platforms include a motion controller. In some embodiments, the system as described above, wherein the virtual reality platforms include a haptic generator.

In some embodiments, a method that regulates access to game content of an online game, the method comprising: executing a game instance of the online game and using the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the online game including the game content that is played cooperatively by groups of users and includes a group roles set for the users in individual groups, wherein the group roles set include a first set of group roles and a second set of group roles, the first set of group roles differing from the second set of group roles; determining whether the users of the online game are attempting to play the game instance via the virtual reality platforms or the non-virtual reality platforms; responsive to determination that an individual user is attempting to play the game instance via one or more of the virtual reality platforms, effectuating presentation of the first set of group roles to such individual user; and responsive to determination that an individual user is attempting to play the game instance via one or more of the non-virtual reality platforms, effectuating presentation of the second set of group roles to such individual user. In some embodiments, the method as described above, wherein the one or more physical processors are further configured by machine readable instruction to: determining changes in the client computing platforms used by the users to interact with the online game; responsive to determination that an individual user changed from playing the online game via the one or more of the virtual reality platforms to the one or more of the non-virtual reality platforms, effectuating presentation of the second set of group roles to such individual user; and responsive to determination that an individual user changed from playing the online game via the one or more of the non-virtual reality platforms to the one or more of the virtual reality platforms, effectuating presentation of the first set of group roles to such individual user. In some embodiments, the method as described above, wherein the first set of group roles is characterized by a first type of gameplay and the second set of group roles is characterized by a second type of gameplay, the first type of gameplay differing from the second type of gameplay. In some embodiments, the method as described above, wherein effectuating presentation of the first set of group roles includes: receiving selection of a group role from the first set of group roles by the users attempting to play the game instance via one or more of the virtual reality platforms; and implementing the selected group roles for the users attempting to play the game instance via one or more of the virtual reality platforms. In some embodiments, the method as described above, wherein effectuating presentation of the first set of group roles includes: selecting a group role from the first set of group roles for the users attempting to play the game instance via one or more of the virtual reality platforms; and implementing the selected group roles for the users attempting to play the game instance via one or more of the virtual reality platforms. In some embodiments, the method as described above, wherein effectuating presentation of the second set of group roles includes: receiving selection of a group role from the second set of group roles by the users attempting to play the game instance via one or more of the non-virtual reality platforms; and implementing the selected group roles for the users attempting to play the game instance via one or more of the non-virtual reality platforms. In some embodiments, the method as described above, wherein effectuating presentation of the second set of group roles includes: selecting a group role from the second set of group roles for the users attempting to play the game instance via one or more of the non-virtual reality platforms; and implementing the selected group roles for the users attempting to play the game instance via one or more of the non-virtual reality platforms. In some embodiments, the method as described above, wherein the virtual reality platforms include a virtual reality headset display. In some embodiments, the method as described above, wherein the virtual reality platforms include a motion controller. In some embodiments, the method as described above, wherein the virtual reality platforms include a haptic generator.

Figure 9:
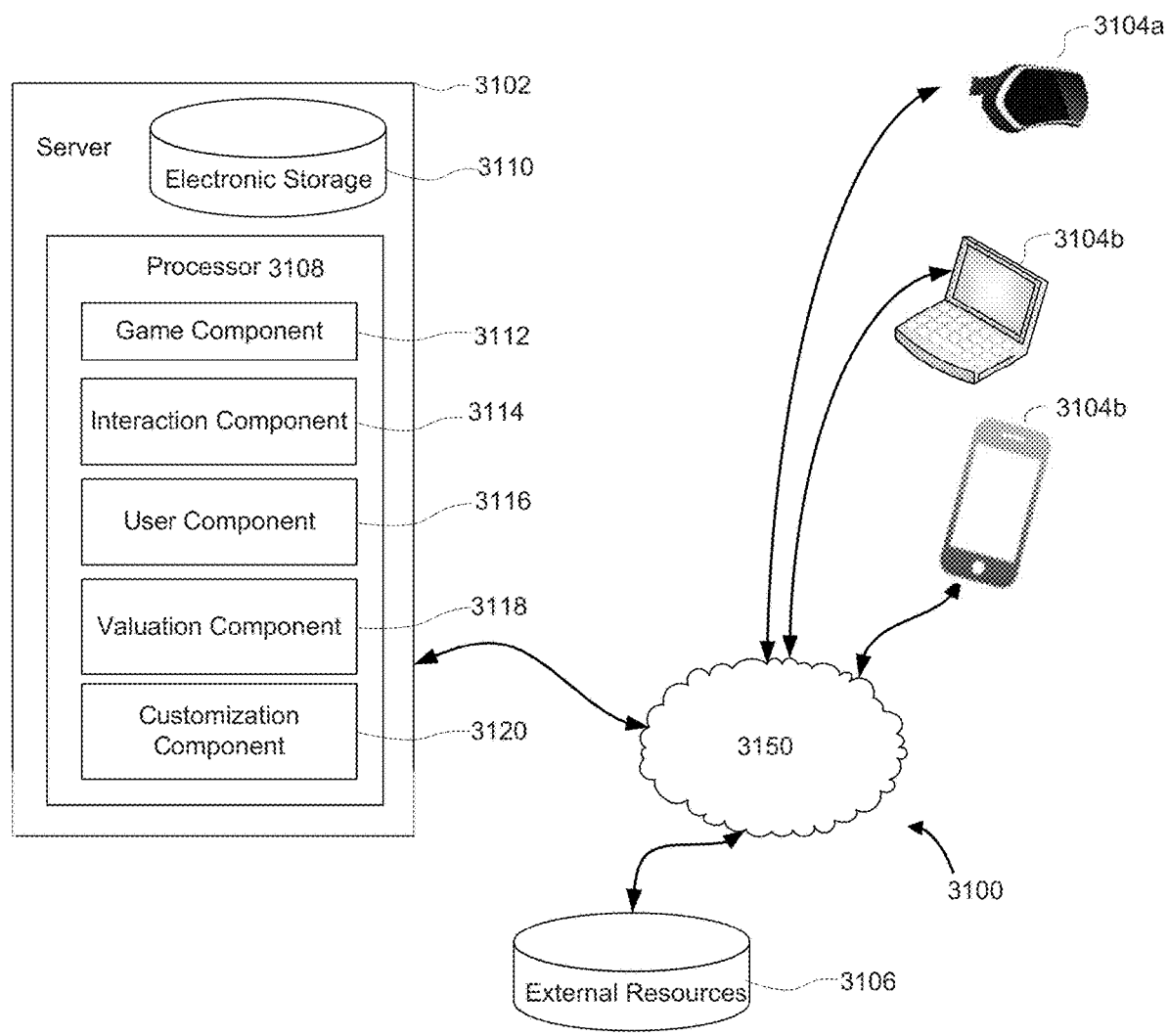
FIG. 9 illustrates a system for determining and implementing platform specific online game customizations, in accordance with one or more implementations.

Determining and Implementing Platform Specific Online Game Customizations:

FIG. 9 illustrates a system 3100 that determines and implements platform specific online game customizations. The online game may be played via multiple client computing platforms. The client computing platforms may include virtual reality platforms and non-virtual reality platforms. The virtual reality platforms may present views of the online game in a manner that simulates immersion (e.g., the user's perception of being physically present within a non-physical world) within the online game. The online game may have a higher interactive potential when played via the virtual reality platforms than when played via the non-virtual reality platforms. For example, the virtual reality platforms may be able to support additional and/or increased motion inputs, views, visibility, and/or other interactions a user may have with the online game. As such, users may be more invested in the online game and willing to spend money in the online game when played via virtual reality platforms. However, the virtual reality platforms may also be more restrictive because a user may not always have access to a virtual reality platform or may be too distracted when playing the game via virtual reality to make purchases.

The online game may be provided and/or executed by system 3100. Providing the online game may include hosting the online game over a network 3150. In some implementations, system 3100 may include one or more servers 3102 configured for hosting online games. Server 3102 may be configured to communicate with one or more client computing platforms 3104 according to a client/server architecture, and with each other. The users may access system 3100, the online game, and/or the game space associated with the online game via client computing platforms 3104, such as client computing platforms 3104*a-b* as shown. Client computing platforms 3104 may include virtual reality platform(s) 3104*a* and non-virtual reality platform(s) 3104*b*. Server 3102 may comprise a processor 3108 configured to execute machine readable instructions to implement system components. The computer program components may include one or more of a game component 3112, an interaction component 3114, a user component 3116, a valuation component 3118, a customization component 3120, and/or other components.

The game component 3112 may be configured to execute a game instance of an online game played via multiple platforms. The online game may be played by users via virtual reality platforms and non-virtual reality platforms. The virtual reality platforms may include a first platform associated with a first user. The non-virtual reality platforms may include a second platform associated with the first user. The virtual reality platforms may provide an immersive gaming experience by simulating the user's presence within the online game (e.g., within a virtual space in which the online game is played). The game component 3112 may be configured to use the game instance to generate game state information that is transmitted to client computing platforms 3104 over a network 3150. The game state information may facilitate presentation of views of the online game to the users via the client computing platforms.

Game component 3112 may transmit the game state information over network 3150 to the client computing platforms 3104, causing client computing platforms 3104 to present views of the online game. Views of the online game presented via virtual reality platform 3104*a* may include views presented via a head-mounted display device. The views may be presented stereoscopically-one for each eye-via the head mounted display device and the user's brain combines them creating a three-dimensional experience. The head mounted display device may include a head and/or eye tracking system that tracks movement of the user as they move their head, eyes, and/or themselves around in physical space to select views and/or move about the online game (e.g., the virtual space in which the online game is played). Views of the online game presented via a non-virtual reality platform may include views presented on a display for one or more of a mobile device (e.g., a smart phone, tablet, laptop), desktop computer, gaming console, televisions, and/or other non-virtual reality platforms.

In some implementations, the game content for the online game provided to the users via the virtual reality platforms may be different than the game content provided to the users via the non-virtual reality platforms. For example, different, but related game content, may be provided to the users via the non-virtual reality platforms compared to the virtual reality platforms.

Execution of the game instance may enable interaction by the users with the online game and/or each other. Game component 3112 may be configured to perform operations in the game instance in response to commands received over network 3150 from client computing platforms 3104. Users may participate in the online game through client game applications implemented on the client computing platforms 3104 associated with the users.

Within the instance of the online game, users may interact with elements in the online game and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the online game by game component 3112 may include determining a game state associated with the online game. The game state information may include information defining a virtual space in which the online game is played. The state may be communicated (e.g., via streaming visual data, via object/position data, and/or other state information) from server(s) 3102 to client computing platforms 3104 for presentation to users. The state determined and transmitted to a given client computing platform 3104 may correspond to a view for a user character being controlled by a user via the given client computing platform 3104. The state determined and transmitted to a given client computing platform 3104 may correspond to a location in a virtual space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user. In some implementations, when the user is playing the online game via the virtual reality platforms, the view may be selected by the user based on their head and/or eye movement.

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

The online game may be played within a simulated virtual space, e.g., a virtual space that is accessible by users via clients (e.g., client computing platforms 3104) that present the views of the virtual space to a user. The virtual space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise virtual entities automatically controlled in the online game. Such virtual entities may not be associated with any user. As such, the automatically controlled virtual entities may be generated and/or developed by artificial intelligence configured with the server(s) 3102 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with the server 3102. As used herein, such automatically controlled virtual space entities in the instance of the online game are referred to as "non-player entities".

It should be understood the above description of the manner in which state of the virtual space associated with the online game as determined by game component 3112 is not intended to be limiting. The game component 3112 may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Within the instance of the online game executed by game component 3112, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

In any case, the user-controlled elements may move through and interact with the virtual space (e.g., non-player entities, elements controlled by other users and/or topography in the virtual space) associated with the online game. The elements controlled by a given user may be created and/or customized by the given user. The given user may have an "inventory" of virtual goods and/or currency usable within the virtual space.

Controls of virtual elements in the online game may be exercised through commands input by a given user through and/or by client computing platforms 3104. The given user may interact with other users through communications exchanged within the virtual space. Such communications may include one or more of textual chat, instant messages, private messages, voice communications, and/or other communications. Communications may be received and entered by the users via their respective client computing platforms 3104. Communications may be routed to and from the appropriate users through server(s) 3102 (e.g., through the game component 3112).

A given user may input commands with specific parameters to undertake specific deeds, actions, functions, spheres of actions and/or any other types of interactions within the virtual space. For example, controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via virtual reality 3104a platform, a given user may input a broader range of commands compared to those available on non-virtual reality platform 3104b. The input commands via the virtual reality platform 3104a may include the user performing the action as an input command. The user may also be able to look around and/or move about the virtual space in which the online game is played.

The game component 3112 may be configured to execute and/or perform user actions to facilitate participation of the users in the online game and/or with each other in response to receiving game commands input by the users. Execution and/or performance of the user action by the game component 3112 may produce changes to the game state, which may reflect progresses and/or results of the user actions. In some examples, state changes caused by the execution of the user actions may be recorded in the electronic storage 3110 to facilitate persistency throughout the instance of the online game. In some examples, execution of the user actions may not produce persistent changes to the game state (e.g., a user character jumping forward and backward successively may not produce any perceivable game state changes to other users).

Interaction component 3114 may be configured to monitor interactions of the users with the online game. Interaction component 3114 may monitor interactions of the users through the virtual reality platforms and/or the non-virtual reality platforms. For example, interaction of the first user with the online game through the first platform, the second platform, and/or any other platform may be monitored. Monitoring the interactions of the users may include monitoring, for a given user, one or more of: times at which the given user is logged in to the online game via a given platform; areas of the online game the given user views or interacts with or in via a given platform; other users the given user interacts with via a given platform; the nature and/or content of interactions of the given user with other users via a given platform; activities participated in within the online game when played via a given platform; level, powers, or skill attained in the online game; inventory items obtained in the online game via a given platform; settings associated with a given platform; spending of the users in the online game when playing via a given platform; and/or other interactions of the given user with the online game, a given platform (e.g., individual ones of the virtual reality platforms and/or the non-virtual reality platforms) and/or other users. Monitoring the interactions may include tracking and/or obtaining interaction information for storage in one or more user profiles associated with the users.

User component 3116 may be configured to manage user profiles. The user profiles may include user information related to participating in the online game through the virtual reality platforms and/or the non-virtual reality platforms. The user information may be based on the interactions monitored by interaction component 3114. The user profiles may include a first user profile that includes user information for the first user. The user information for the first user may describe interactions of the first user with the online game through the first platform, the second platform, and/or any other platform. User information may be stored in user accounts and/or profiles. User accounts may be an account on a game central server, linked to one or more of the virtual reality platforms and/or the non-virtual reality platforms, or within a peer-to-peer network that contains a user profile.

The user profiles may include, for example, personal information identifying users (e.g., a username or handle, a number, an identifier, and/or other identifying information) within the online game, payment information (e.g., information associated with a method of payment and/or an account, and/or whether a payment method has been established for a given platform), security login information (e.g., a login code or password), online game account information, subscription information, character account information (e.g., user characters associated with the user, a status and/or characteristics of the user characters, a level of the user characters, etc.), platform information (e.g., virtual reality platform(s) and/or non-virtual reality platforms associated with a user), virtual currency account information (e.g., related to currency held in credit for a user), relationship information (e.g., information related to relationships between users in the online game), inventory information, online game usage information, demographic information associated with users, interaction history among users in the online game, information stated by users, purchase information of users, browsing history of users, a virtual reality client computing platform identification associated with a user, a non-virtual reality client computing platform identification associated with a user, and/or other information related to users.

The user component 3118 may be configured to store inventories of virtual items including resources that are available to users in the online game. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

User component 3118 may maintain an inventory for the user's character in which virtual awards may be collected. Players may collect, trade, buy, fight over items, and/or perform other actions to add to their inventory. Users in the online game may acquire virtual currency. In such games, the virtual currency might be represented by virtual coins, virtual cash, or by a number or value stored by the server for that user's benefit. Such virtual currency represents units of value for use in the online game system. Virtual currency may be purchased in one or more actual cash or credit transactions by a user, where the real world currency is transferred using a credit/debit/charge card transaction conveyed over a financial network. A user may earn virtual currency by taking action in the game. For example, a user may be rewarded with one or more units of virtual currency after completing a task, quest, challenge, or mission within the game.

Virtual currency may be used to purchase one or more in-game assets or other benefits. For example, a player may be able to exchange virtual currency and/or real-currency for a desired level, access, right, or item in an online game. Multiple types of virtual currency may be available for purchase from the game system operator. For example, an online game may have virtual gold coins and virtual cash. The different types of virtual currency may have different exchange rates with respect to real-world currency and each other. In some embodiments, certain types of virtual currency can be acquired by engaging in various in-game actions while other types of virtual currency can only be acquired by exchanging real-world currency.

The user information may include payment information for individual ones of the users and/or the platforms. The payment information for a given user may indicate whether the user has established a payment method for individual ones of the virtual reality platforms and/or the non-virtual reality platforms. The payment information may include account information for facilitating payments in the online game via individual ones of the virtual reality platforms and/or the non-virtual reality platforms. For example, the payment information for the first user may indicate whether the first user has established a method of payment (e.g., an account enabling a user to make purchases) in the first platform and/or the second platform.

The user information in the user account associated with the given user for the online game may include historic transaction information indicating previous spending by the user in the online game via a given platform. In some exemplary implementations, such historic transaction information may reflect various statistics and details about the individual spending by the user via individual ones of the virtual reality platform(s) and/or the non-virtual reality platform(s). Examples of such statistics may include purchases made within the online game when played via a given platform, when purchases were made in the online game when played via a given platform, an amount of virtual and/or real currency spent, a number of times a user spends virtual and/or real currency in exchange for virtual items (e.g., a number of transactions), a frequency of such spending by the user with in a time period of interest (e.g., past 24 hours, past week, past month, etc.), a spend velocity (e.g., rate of spending), and/or any other statistics. For example, historic transaction information for the first user may include that the first user spent a first amount of virtual currency in the online game via a first platform (e.g., the virtual reality platform) and a second amount of virtual currency in the online game via the second platform (e.g., non-virtual reality platform).

The valuation component 3118 may be configured to determine user value metrics for the users on the virtual reality platforms and/or the non-virtual reality platforms. The user value metrics may indicate an economic value associated with a given user. The user value metrics may be associated with individual platforms such that a user value metric for a user for a given platform indicates the value associated with that user when playing the online game via the given platform. The economic value may include a valuation, potential economic value, and/or prediction of a value a given user may represent to a game provider. The value metrics may include a first user value metric, second user value metric, and/or any other value metrics. Valuation component 3118 may determine the user value metrics based on the user information stored in the user profiles. Valuation component 3118 may be configured to determine one or more of a first user value metric for the first user on the first platform (e.g., the virtual reality platform), a second user value metric for the first user on the second platform (e.g., the non-virtual reality platform), and/or other value metrics for the first user on other platforms. The first user value metric and the second user value metric, for the first user, may be determined based on the user information stored in the first user profile.

In some implementations, the user value metrics may include spend parameters. The spend parameters may indicate spending in the online game by individual ones of the users on the virtual reality platforms and/or the non-virtual reality platforms. For example, a first spend parameter indicating spending in the online game by the first user on the first platform (e.g., the virtual reality platform), may be determined. A second spend parameter indicating spending in the online game by the first user on the second platform (e.g., the non-virtual reality platform) may be determined. In some implementations, the spend parameters for a given user may be determined based on the payment information and/or the historic transaction information stored and/or included in the user profile for the given user. The spending by a given user on a given platform may indicate past user spending and/or any other type of spending by the given users on the platforms. The past user spending may comprise one or more of: virtual currency and real world currency and/or any other type of currency. Valuation component 3118 may be configured such that the spend parameters determined include one or more of: an amount of currency spent during a period of time, a total amount of currency spent, a spend velocity, an average amount of currency spent, a spend frequency, monetization through ads via the different platforms, and/or other spend parameters that impact value to the game provider.

In some implementations, the user value metric may quantify one or more of a progress within the online game via a given platform, a power level within the online game via a given platform, a skill level within the online game via a given platform, a level of virtual technology advancement within the online game via a given platform, success within the online game via a given platform as a whole or within certain types of gameplay (e.g., player-versus-player gameplay, player-versus-environment gameplay, harvesting gameplay, and/or other gameplay types), and/or other aspects. A user value metric can be classified as a status metric or a predictive metric. A status metric characterizes behavioral information of a set of on-line entities where the behavioral information is related to at least one activity of the on-line entities within the online game. Example status metrics include, without limitation, a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric as well as other metrics. These metrics are subsequently briefly described.

A predictive metric can, for example, evaluate the change in a status metric over time. Example predictive metrics include, without limitation: a churn metric, compatibility metric, a scheduling metric, a content consumption metric, an environmental balance metric, a survival metric, and an economic metric. Churn metrics predict the probability of a user leaving the online game, based on the user's past interaction patterns. Compatibility metrics indicate whether or not a user's play style will match a proposed player association or whether the user's play style matches that of the user association to which he/she is a member. Scheduling metrics predict the probability of a player being available for a future joint activity, so that such activities can be planned in advance. Content consumption metrics predict when users will have exhausted the online game virtual environment's resources, in order to plan timely expansions to the online game. Environmental balance metrics predict the effects of a design change on the online game, such as removing a given "profession" or certain items from the online game. Economic metrics predict inflation, trade volume, and other variables in order to maintain the balance of trade in the online game. The survival metric indicates the health of a user association.

The predictive metrics can include those that develop a time-series of single or combinations of status metrics (weighted or un-weighted) that represent trends; metrics that represent heuristically determined conditions relevant to the predicted health of the online game; metrics based on a vector of attributes representing characteristics of the on-line entity such that the vectors can be used to classify on-line entities and to determine the characteristics of successful on-line entities; and to determine whether on-line entities have characteristics that are progressing toward or away from the characteristics of successful online entities.

The predictive metrics can timely measure the social aspects of user interactions in the online game, and measure and/or monitor the health of the online user community in the online game. By using the predictive metrics, the MMOG provider can alter the online game when played via a given platform to encourage desired social interactions and to discourage less desired social interactions.

Customization component 3120 may be configured to determine one or more platform specific game customizations for the online game. The platform specific customizations may be determined for the online game when played via the virtual reality platforms and/or the non-virtual reality platforms. Platform specific customizations may include customizations and/or differences in the online game when the game is played via a given platform associated with a user compared to when the game is played via another platform associated with the user. For example, the platform specific customizations may include a customization for the online game when played via the virtual reality platform, but not when played via the non-virtual reality platform; or, when played via the non-virtual reality platform, but not when played via the virtual reality platform. In some implementations, the online game may be customized when played via both the virtual reality platform and the non-virtual reality platform, wherein the customizations may be different. The platform specific customizations may be based on the user value metrics determined for the users. Customization component 3120 and/or valuation component 3118 may be configured to compare a first user value metric for an individual user when playing the game via a virtual reality platform and a second user value metric for the individual user when playing the game via a non-virtual reality platform. The comparison may be used to determine one or more platform specific customizations for the individual user via one or both of the platforms. For example, a first game customization may be determined for the first platform and/or the second platform based on a comparison of the first user value metric and the second user value metric.

The platform specific customizations may include an alteration and/or customization of one or more aspects of the online game related to: the virtual space in which the online game is played, the user-controlled entities within the online game, the non-user controlled entities within the online game, the virtual items and/or resources in the online game, the actions available to the user, and other areas of the online game. For example, the one or more aspects of the online game that may be customized may include one or more of: a reward, a strength and/or power of one or more user characters, a spawn rate or recovery rate of one or more user characters, a power of attacks, a resistance to attacks, speed or responsiveness of controlled units, a quality or effectiveness of virtual items, a quantity of available virtual items, availability of user actions, wait periods associated with one or more actions, and/or other customizations.

The platform specific online game customizations may increase and/or decrease the difficulty of the online game when played via a given platform. For example, the first game customization may increase and/or decrease the difficulty of the online game when played by the first user via the first platform or the second platform, in comparison to when the online game is played by the first user via the non-customized platform (e.g., either the first platform or the second platform, whichever is not customized). Increasing and/or decreasing difficulty of the online game when played via a given platform may be relative to when the online game is played via another platform. Adjusting the difficulty may include adjusting the convenience, play speed, effort and/or stamina required, likelihood of obtaining a desired outcome, and/or other ways the difficulty of the online game may be adjusted.

By way of non-limiting example, responsive to a user spending a larger amount of currency in the online game via the non-virtual reality platform than via the virtual reality platform, a game customization may include increasing the wait times associated with one or more actions in the online game when played via the virtual reality platform but not adjusting the wait times in the non-virtual reality platform. As such, based on the user value metric (e.g., a spend parameter) the platform specific online game customization may make playing the online game via the virtual reality platform more difficult.

By way of another non-limiting example, responsive to the user information for a given user indicating the given user has established a payment method in the virtual reality platform but not has not established a payment method in the non-virtual reality platform, a platform specific online game customization determined may include decreasing the resistance to attacks in the online game when played when played via the virtual reality platform. As such, based on the user value metric (e.g., payment information) the platform specific online game customization may make playing the online game via the virtual reality platform more difficult such that a user may be more likely to pay to increase their resistance to attacks.

Customization component 3120 may be configured to implement one or more platform specific online game customizations determined. For example, customization component 3120 may implement the first game customization that customizes one or more aspects of the online game for the first user when played via the first platform (e.g., the virtual reality platform) and/or the second platform (e.g., the non-virtual reality platform). Customization component 3120 may be configured to communicate with game component 3112 in order to execute the instance of the game including the game customizations determined.

In some implementations, a user may and/or may not be made aware of the platform specific customizations. Customization component 3120 may be configured to effectuate presentation of a customization notification. The customization notification may include information indicating one or more of the customizations determined. Information indicating the first game customization may be presented via the first platform such that the first user is made aware that the first game customization impacts gameplay of the online game when played via the first platform or the second platform, but not when played via the non-customized platform. In some implementations, the user may not be made aware of one or more of the platform specific online game customizations. For example, the first user may not be made aware of the first game customization and/or that the first game customization impacts gameplay of the online game when played via the first platform or the second platform, but not when played via a non-customized platform.

Figure 10A:
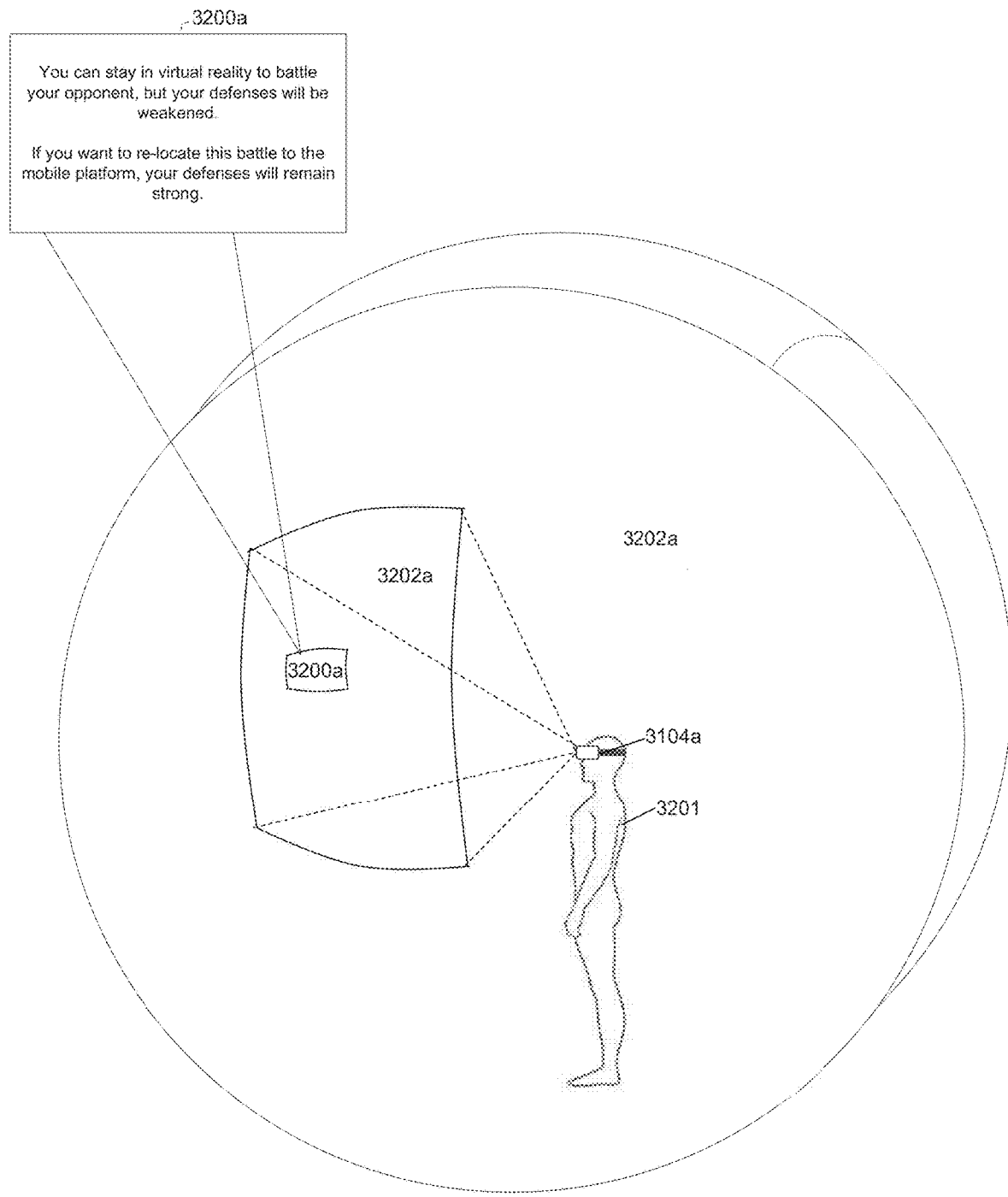
FIG. 10*a* depicts a customization notification including information indicating a platform specific customization in the online game when played via a virtual reality platform, in accordance with some implementations.

FIG. 10a depicts a customization notification 3200a including information indicating a platform specific customization in the online game when played via a virtual reality platform 3104a, in accordance with some implementations. Customization notification 3200a may be presented within views 3202a of the online game presented to user 3201 via virtual reality platform 3104a. Presentation of customization notification 3200a may cause user 3202a to be made aware of the platform specific customization. Customization notification 3200a may indicate that the platform specific customization impacts gameplay of the online game when played via virtual reality platform 3104a, but not when played via a non-virtual reality platform (e.g., the same as or similar to non-virtual reality platform 3104b).

Figure 10B:
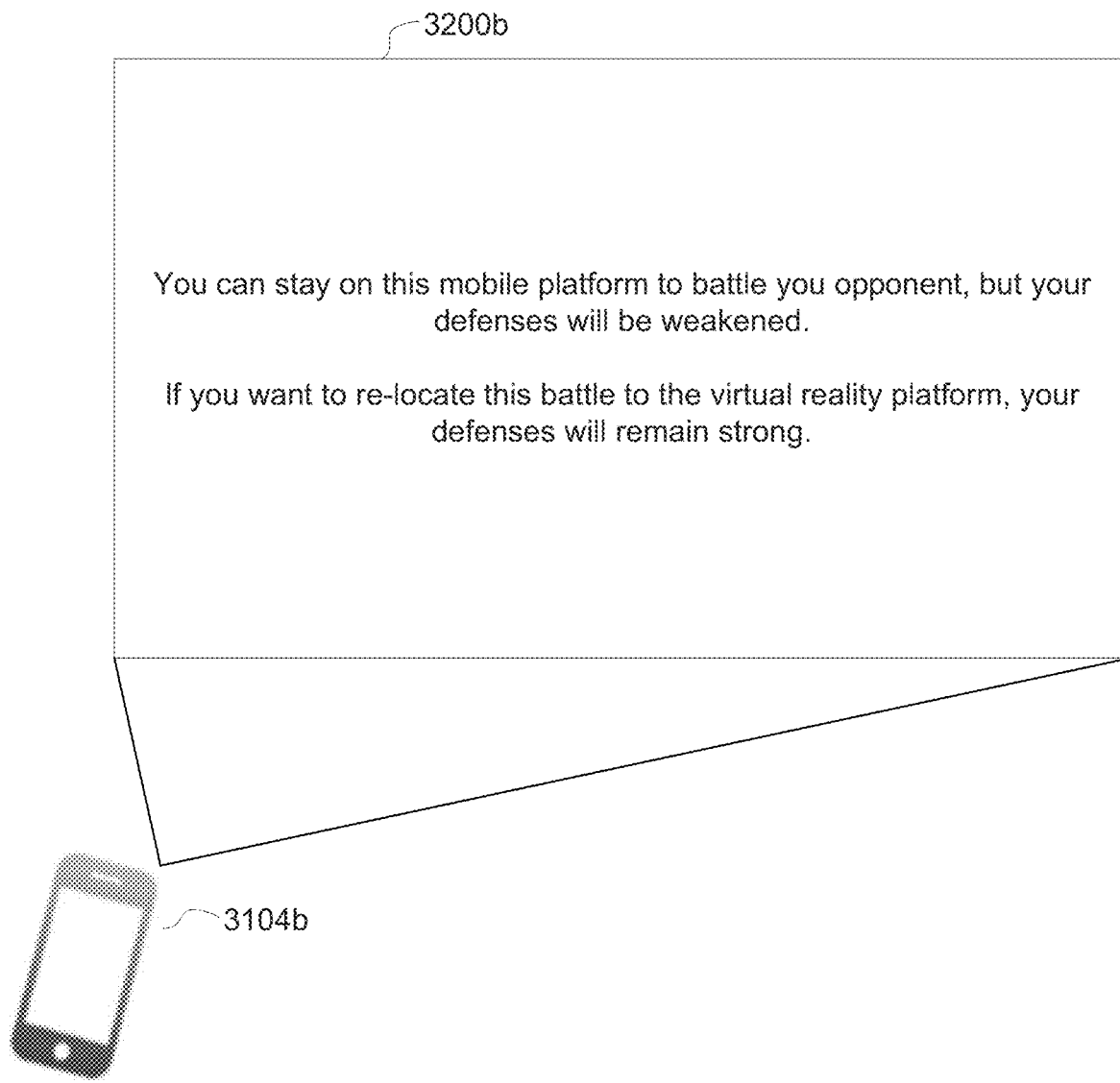
FIG. 10*b* depicts a customization notification including information indicating a platform specific customization in the online game when played via non-virtual reality platform, in accordance with some implementations.

FIG. 10b depicts a customization notification 3200b including information indicating a platform specific customization in the online game when played via non-virtual reality platform 3104b, in accordance with some implementations. Customization notification 3200b may be presented within views 3202b of the online game presented to the user (e.g., the same as or similar to user 3201) via non-virtual reality platform 3104b. Presentation of customization notification 3200b may cause user 3202b to be made aware of the platform specific customization. Customization notification 3200b may indicate that the platform specific customization impacts gameplay of the online game when played via non-virtual reality platform 3104b, but not when played via a virtual reality platform (e.g., the same as or similar to virtual reality platform 3104a).

Returning to FIG. 9, the client computing platform(s) 3104 may include one or more processors, memory, display devices, head-mounted display devices, sensors, and/or any other components. The processor(s) may be configured to execute machine-readable instructions to launch and/or implement one or more client game applications associated with the online games. In some implementations, the machine-readable instructions may cause the processors of one of more client computing platforms to perform functionality the same as or similar to the functionality performed by one or more components of system 3100.

The client computing platform(s) 3104 may be configured to: present a graphical representation of the virtual space (e.g., a virtual reality representation and/or a non-virtual reality representation) corresponding to a given online game; provide controls and/or sense input commands enabling the given user to maneuver virtual items, initiate actions, and/or purchase virtual item(s) usable in the online game(s) within the virtual space associated with the online game; determine information for implementing game interfaces for the online game(s) hosted by system 3100; obtain state information regarding a given online game hosted by the system 3100; determine view information (e.g., a view point, field of view, eye/head movement, and/or location) of the user at a given time; determine a level of rendering of a scene in the online game based on the state information and view information; determining one or more action menus for presentation to the user in the game interface; facilitate interaction by the given user in the online game(s) and/or interaction with other users; communicate with sever(s) 3102 (e.g., receive and/or transmitting information to/from servers 3102); and/or provide any other functionality. In some implementations, client computing platform 3104 may be a virtual reality platform and/or a non-virtual reality platform. Client computing platform 3104 may be configured to communicate with, transmit information to, and/or receive information from one or more of servers 3102, and/or other components of system 3100.

The server(s) 3102, client computing platform(s) 3104, and/or external resources 3106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 3102, client computing platforms 3104, and/or external resources 3106 may be operatively linked via some other communication media.

A given client computing platform 3104 may include one or more processors configured to execute computer program components. The computer program components may be configured to enable an expert or user associated with the given client computing platform 3104 to interface with system 3100 and/or external resources 3106, and/or provide other functionality attributed herein to client computing platforms 3104. By way of non-limiting example, the given client computing platform 3104 may include one or more of a virtual reality system, a head-mounted virtual reality display, desktop computer, a laptop computer, a handheld computer, a tablet computing platform, a NetBook, a Smartphone, a gaming console, and/or other computing platforms.

The external resources 3106 may include sources of information, hosts and/or providers of virtual environments outside of system 3100, external entities participating with system 3100, and/or other resources. In some implementations, some or all of the functionality attributed herein to external resources 3106 may be provided by resources included in system 3100.

The server(s) 3102 may include electronic storage 3110, one or more processors 3108, and/or other components. The server(s) 3102 may include communication lines, or ports to enable the exchange of information with a network and/or other computing platforms. Illustration of server(s) 3102 in FIG. 9 is not intended to be limiting. The server(s) 3102 may include a plurality of hardware, software, and/or firmware components operating together to provide the functionality attributed herein to server(s) 3102. For example, server(s) 3102 may be implemented by a cloud of computing platforms operating together as server(s) 3102.

Electronic storage 3110 may comprise electronic storage media that electronically stores information. The electronic storage media of electronic storage 3110 may include one or both of system storage that is provided integrally (i.e., substantially non-removable) with server(s) 3102 and/or removable storage that is removably connectable to server(s) 3102 via, for example, a port (e.g., a USB port, a FireWire port, etc.) or a drive (e.g., a disk drive, etc.). Electronic storage 3110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Electronic storage 3110 may include one or more virtual storage resources (e.g., cloud storage, a virtual private network, and/or other virtual storage resources). Electronic storage 3110 may store software algorithms, information determined by processor 108, information received from server(s) 3102, information received from client computing platforms 3104, and/or other information that enables server(s) 3102 to function as described herein.

Processor(s) 3108 is configured to provide information processing capabilities in server(s) 3102. As such, processor 3108 may include one or more of a digital processor, an analog processor, a digital circuit designed to process information, an analog circuit designed to process information, a state machine, and/or other mechanisms for electronically processing information. Although processor 3108 is shown in FIG. 9 as a single entity, this is for illustrative purposes only. In some implementations, processor 3108 may include a plurality of processing units. These processing units may be physically located within the same device, or processor 3108 may represent processing functionality of a plurality of devices operating in coordination. The processor 3108 may be configured to execute components 3112, 3114, 3116, 3118, 3120. Processor 3108 may be configured to execute components 3112, 3114, 3116, 3118, 3120 by software; hardware; firmware; some combination of software, hardware, and/or firmware; and/or other mechanisms for configuring processing capabilities on processor 3108.

It should be appreciated that although components 3112, 3114, 3116, 3118, 3120 are illustrated herein as being co-located within a single processing unit, in some other implementations, one or more of components 3112, 3114, 3116, 3118, 3120 may be located remotely from the other components. The description of the functionality provided by the different components 3112, 3114, 3116, 3118, 3120 described below is for illustrative purposes, and is not intended to be limiting, as any of components 3112, 3114, 3116, 3118, 3120 may provide more or less functionality than is described. For example, one or more of components 3112, 3114, 3116, 3118, 3120 may be eliminated, and some or all of its functionality may be provided by other ones of components 3112, 3114, 3116, 3118, 3120. As another example, processor 3108 may be configured to execute one or more additional components that may perform some or all of the functionality attributed below to one of components 3112, 3114, 3116, 3118, 3120.

Figure 11:
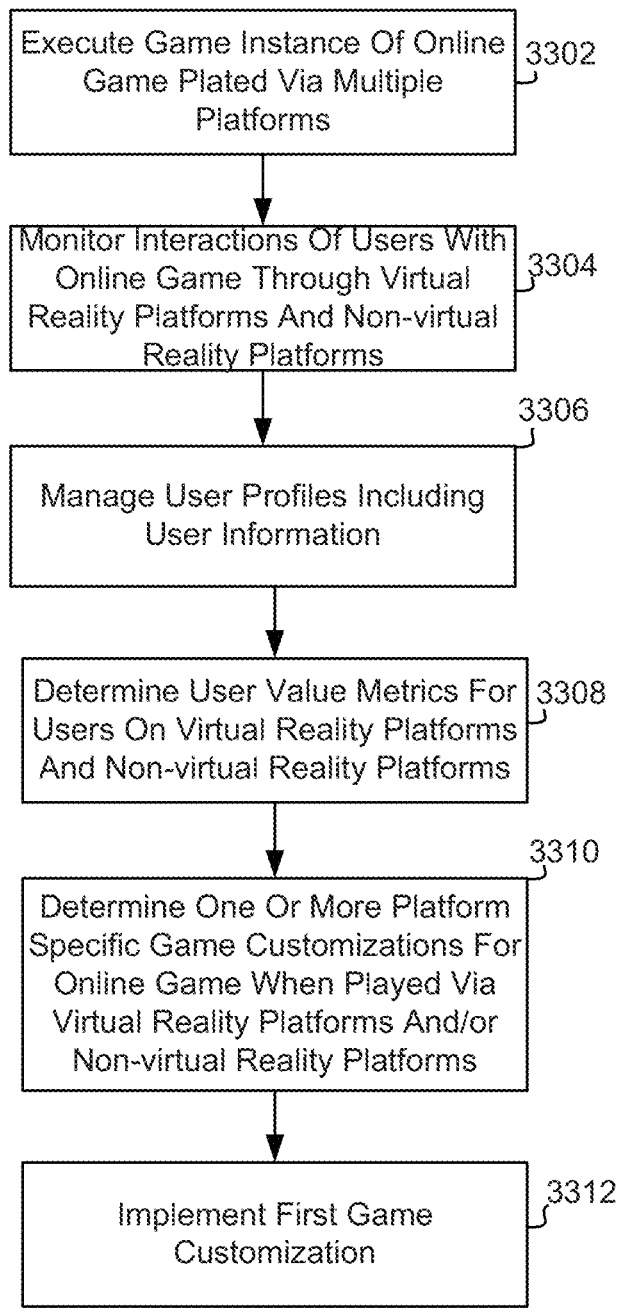
FIG. 11 illustrates a method for determining and implementing platform specific online game customizations, in accordance with one or more implementations

FIG. 11 illustrates a method for determining and implementing platform specific online game customizations, in accordance with one or more implementations. The operations of method 3300 presented below are intended to be illustrative. In some embodiments, method 3300 may be accomplished with one or more additional operations not described, and/or without one or more of the operations discussed. Additionally, the order in which the operations of method 3300 illustrated in FIG. 11 and described below is not intended to be limiting.

In some embodiments, method 3300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 3300 in response to instructions stored electronically on an electronic storage medium. The one or more processing devices may include one or more devices configured through hardware, firmware, and/or software to be specifically designed for execution of one or more of the operations of method 3300.

At an operation 3302, a game instance of the online game played via multiple platforms may be executed. The game instance may be used to generate game state information that is transmitted to client computing platforms over a network. The game state information may facilitate presentation of views of the online game to the users via the client computing platforms. Execution of the game instance further enables interaction by the users with the online game and/or each other by performing operations in the game instance in response to commands received over the network from the client computing platforms. The client computing platforms may include virtual reality platforms and non-virtual reality platforms. The virtual reality platforms may include a first platform associated with a first user. The non-virtual reality platforms may include a second platform associated with the first user. In some implementations, operation 3302 may be performed by a game component the same as or similar to game component 3112 (shown in FIG. 9 and described herein).

At an operation 3304, interactions of the users with the online game through the virtual reality platforms and/or the non-virtual reality platforms may be monitored. As such, interaction of the first user with the online game through the first platform and/or the second platform may be monitored. In some implementations, operation 3304 may be performed by an interaction component the same as or similar to interaction component 3114 (shown in FIG. 9 and described herein).

At operation 3306, user profiles including user information may be managed. The user information may relate to participating in the online game through the virtual reality platforms and/or the non-virtual reality platforms. The user information may be based on the monitored interactions. The user profiles may include a first user profile that includes user information for the first user. The user information for the first user may describe interaction of the first user with the online game through the first platform and/or the second platform. In some implementations, operation 3306 may be performed by a user component the same as or similar to user component 3116 (shown in FIG. 9 and described herein).

At operation 3308, user value metrics for the users may be determined. User value metrics for the users on the virtual reality platforms and/or the non-virtual reality platforms may be determined. A first user value metric for the first user on the first platform, and/or a second user value metric for the first user on the second platform may be determined. The first user value metric and/or the second user value metric may be determined based on the user information stored in the first user profile. In some implementations, operation 3308 may be performed by a valuation component the same as or similar to valuation component 3118 (shown in FIG. 9 and described herein).

At operation 3310, one or more platform specific online game customizations for the online game when played via the virtual reality platforms and/or the non-virtual reality platforms may be determined. The platform specific customizations may be determined based on the user value metrics determined for the users. A first game customization may be determined for the first platform and/or the second platform. The first game customization may be determined based on a comparison of the first user value metric and the second user value metric. In some implementations, operation 3310 may be performed by a customization component the same as or similar to customization component 3120 (shown in FIG. 9 and described herein).

At operation 3312, the first game customization may be implemented. The first game customization may customize one or more aspects of the online game for the first user when played via the first platform and/or the second platform. In some implementations, operation 3312 may be performed by a customization component the same as or similar to customization component 3120 (shown in FIG. 9 and described herein).

A system and method for determining and implementing platform specific online game customizations. The multiple platforms may include virtual reality platforms and non-virtual reality platforms. The system may monitor interactions of the users with the online game through the multiple platforms. User profiles including user information related to participating in the online game through the virtual reality platforms and the non-virtual reality platforms may be managed by the system. The system may determine user value metrics for a given user on a virtual reality platform and a non-virtual reality platform. A platform specific online game customization for the online game when played via a virtual reality platform and/or a non-virtual reality platform may be determined based on the user value metrics. The game customization that customizes one or more aspects of the online game for the given user when played via a given platform may be implemented.

In some embodiments, a system that determines and implements platform specific online game customizations, the system comprising: one or more physical computer processors configured by machine readable instructions to: execute a game instance of the online game played via multiple platforms, and use the game instance to generate game state information that is transmitted to client computing platforms over a network, the game state information facilitating presentation of views of the online game to the users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform associated with a first user and the non-virtual reality platforms including a second platform associated with the first user; monitor interactions of the users with the online game through the virtual reality platforms and the non-virtual reality platforms such that interaction of the first user with the online game through the first platform and the second platform is monitored; manage user profiles including user information related to participating in the online game through the virtual reality platforms and the non-virtual reality platforms such that the user information is based on the monitored interactions, the user profiles including a first user profile that includes user information for the first user that describes interaction of the first user with the online game through the first platform and the second platform; determine user value metrics for the users on the virtual reality platforms and the non-virtual reality platforms, wherein a first user value metric for the first user on the first platform and a second user value metric for the first user on the second platform are determined based on the user information stored in the first user profile; determine one or more platform specific online game customizations for the online game when played via the virtual reality platforms and/or the non-virtual reality platforms based on the user value metrics determined for the users, wherein a first game customization is determined for the first platform or the second platform based on a comparison of the first user value metric and the second user value metric; and implement the first game customization that customizes one or more aspects of the online game for the first user when played via the first platform or the second platform. In some embodiments, the system as described above, wherein the one or more physical computer processors configured by machine readable instructions to: transmit the game state information over the network causing the first platform to present the views of the online game to the first user via a headset display device associated with the first platform. In some embodiments, the system as described above, wherein the user value metrics include spend parameters that indicate spending in the online game by individual ones of the users on the virtual reality platforms and the non-virtual reality platforms, such that a first spend parameter indicating spending in the online game by the first user on the first platform and a second spend parameter indicating spending in the online game by the first user on the second platform, are determined. In some embodiments, the system as described above, wherein spend parameters obtained include one or more of an amount of currency spent during a period of time, a total amount of currency spent, a spend velocity, an average amount of currency spent, and/or a spend frequency. In some embodiments, the system as described above, wherein the user information includes payment information such that the user value metrics indicate whether the users have established a method of payment in one or more of the virtual reality platforms and/or the non-virtual reality platforms. In some embodiments, the system as described above, wherein the first game customization increases or decreases the difficulty of the online game when played by the first user via the first platform or the second platform in comparison to when the online game is played by the first user via a non-customized platform. In some embodiments, the system as described above, wherein the one or more processors are further configured by machine-readable instructions to: effectuate presentation of a customization notification, the customization notification including information indicating the first game customization via the first platform such that the first user is made aware that the first game customization impacts gameplay of the online game when played via the first platform or the second platform, but not when played via a non-customized platform. In some embodiments, the system as described above, wherein the first user is not made aware of the first game customization and/or that the first game customization impacts gameplay of the online game when played via the first platform or the second platform, but not when played via a non-customized platform. In some embodiments, the system as described above, wherein the one or more aspects of the online game that are customized include one or more of a reward, a strength and/or power of one or more user characters, a spawn rate or recovery rate of one or more user characters, power of attacks, resistance to attacks, speed or responsiveness of controlled units, a quality or effectiveness of virtual items, a quantity of available virtual items, wait periods associated with one or more actions, and/or availability of user actions.

In some embodiments, a computer-implemented method that determines and implements platform specific online game customizations, the method being implemented by a computer system including one or more physical processors configured by machine-readable instructions, the method comprising: executing a game instance of the online game played via multiple platforms, and use the game instance to generate game state information that is transmitted to client computing platforms over a network, the game state information facilitating presentation of views of the online game to the users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform associated with a first user and the non-virtual reality platforms including a second platform associated with the first user; monitoring interactions of the users with the online game through the virtual reality platforms and the non-virtual reality platforms such that interaction of the first user with the online game through the first platform and the second platform is monitored; managing user profiles including user information related to participating in the online game through the virtual reality platforms and the non-virtual reality platforms such that the user information is based on the monitored interactions, the user profiles including a first user profile that includes user information for the first user that describes interaction of the first user with the online game through the first platform and the second platform; determining user value metrics for the users on the virtual reality platforms and the non-virtual reality platforms, wherein a first user value metric for the first user on the first platform and a second user value metric for the first user on the second platform are determined based on the user information stored in the first user profile; determining one or more platform specific online game customizations for the online game when played via the virtual reality platforms and/or the nonvirtual reality platforms based on the user value metrics determined for the users, wherein a first game customization is determined for the first platform or the second platform based on a comparison of the first user value metric and the second user value metric; and implementing the first game customization that customizes one or more aspects of the online game for the first user when played via the first platform or the second platform. In some embodiments, the method as described above, further comprising: transmitting the game state information over the network causing the first platform to present the views of the online game to the first user via a headset display device associated with the first platform. In some embodiments, the method as described above, wherein the user value metrics include spend parameters that indicate spending in the online game by individual ones of the users on the virtual reality platforms and the non-virtual reality platforms, such that a first spend parameter indicating spending in the online game by the first user on the first platform and a second spend parameter indicating spending in the online game by the first user on the second platform, are determined. In some embodiments, the method as described above, wherein the spend parameters obtained include one or more of an amount of currency spent during a period of time, a total amount of currency spent, a spend velocity, an average amount of currency spent, and/or a spend frequency. In some embodiments, the method as described above, wherein the user information includes payment information such that the user value metrics indicate whether the users have established a method of payment in one or more of the virtual reality platforms and/or the non-virtual reality platforms. In some embodiments, the method as described above, wherein the first game customization increases or decreases the difficulty of the online game when played by the first user via the first platform or the second platform in comparison to when the online game is played by the first user via a non-customized platform. In some embodiments, the method as described above, further comprising: effectuating presentation of a customization notification, the customization notification including information indicating the first game customization via the first platform such that the first user is made aware that the first game customization impacts gameplay of the online game when played via the first platform or the second platform, but not when played via a non-customized platform. In some embodiments, the method as described above, wherein the first user is not made aware of the first game customization and/or that the first game customization impacts gameplay of the online game when played via the first platform or the second platform, but not when played via a non-customized platform. In some embodiments, the method as described above, wherein the first user is not made aware of the first game customization and/or that the first game customization impacts gameplay of the online game when played via the first platform or the second platform, but not when played via a non-customized platform.

Figure 12:
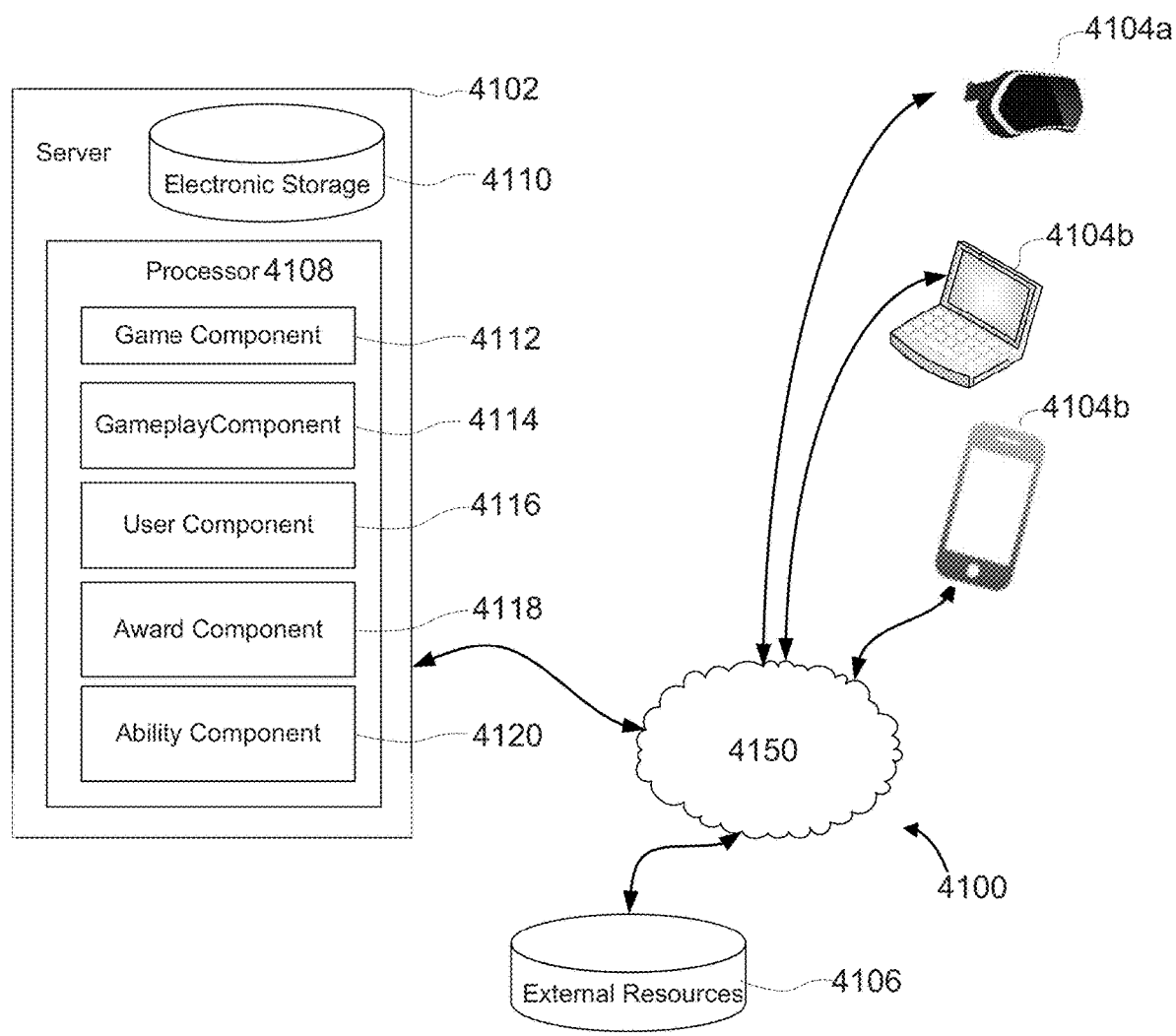
FIG. 12 illustrates a system that makes progress of a user character obtained in an online game via a non-virtual reality interface available in a virtual reality interface, in accordance with one or more implementations.

Making Progress of a User Character Obtained in an Online Game via a Non-Virtual Reality Interface Available in a Virtual Reality Interface:

FIG. 12 illustrates a system 4100 that makes progress of a user character obtained in an online game via a non-virtual reality interface available in a virtual reality interface. The online game may be played via multiple client computing platforms. The client computing platforms may include virtual reality platforms and non-virtual reality platforms. The virtual reality platforms may provide a virtual reality interface to the users. The non-virtual reality platforms may provide a non-virtual reality interface to the users. The virtual reality platforms may present views of the online game in a manner that simulates immersion (e.g., the user's perception of being physically present within a non-physical world) within the online game. The online game may have a higher interactive potential when played via the virtual reality platforms than when played via the non-virtual reality platforms. For example, the virtual reality platforms may be able to support additional and/or increased motion inputs, views, visibility, and/or other interactions a user may have with the online game. However, the virtual reality platforms may also be restrictive because a user may not always have access to a virtual reality platform or may not be able to immerse themselves in the online game as required by virtual reality. Thus, a balance between playing the online game via the virtual reality platforms and the non-virtual reality platforms may enable game providers to introduce new interface experiences to the user without decreasing monetization opportunities and/or losing the flexible and constant access to the online game provided by non-virtual reality.

The online game may be provided and/or executed by system 4100. Providing the online game may include hosting the online game over a network 4150. In some implementations, system 4100 may include one or more servers 4102 configured for hosting online games. Server 4102 may be configured to communicate with one or more client computing platforms 4104 according to a client/server architecture, and with each other. The users may access system 4100, the online game, and/or the game space associated with the online game via client computing platforms 4104, such as client computing platforms 4104a-b as shown. Client computing platforms 4104 may include virtual reality platform(s) 104a and non-virtual reality platform(s) 4104b. Server 4102 may comprise a processor 4108 configured to execute machine readable instructions to implement system components. The computer program components may include one or more of a game component 4112, a gameplay component 4114, a user component 4116, an award component 4118, an ability component 4120, and/or other components.

Game component 4112 may be configured to execute a game instance of an online game played via multiple platforms. The multiple platforms may include virtual reality platforms and non-virtual reality platforms. For example, the virtual reality platforms may include a first platform associated with a first user. The non-virtual reality platforms may include a second platform associated with the first user. Game component 4112 may be configured to use the game instance to generate game state information that is transmitted to client computing platforms over a network. The game state information may facilitate presentation of views of the online game to the users via the client computing platforms.

Game component 4112 may transmit the game state information over the network to the client computing platforms. Transmitting the game state information may cause the client computing platforms to present views of the online game. Views of the online game presented via a virtual reality platform may include views presented on a head-mounted display device and/or other immersive views (e.g., causing the user to have the perception of being physically present in a virtual world). Views of the online game presented via a non-virtual reality platform may include views presented on a touch screen, television, computer monitor, and/or other non-immersive views (e.g., not fully immersive such that the user does not have the perception of being physically present in a virtual world). The virtual reality platforms, including the first platform, may provide a virtual reality interface to the first user. The non-virtual reality platforms, including the second platform, may provide a non-virtual reality interface to the first user.

The non-virtual reality platforms may have limited functionality compared to the virtual reality platforms. For example, the second platform may have limited functionality compared to the first platform. Limited functionality may relate to the actions available to be performed by one or more users via the platform and/or the way actions are performed by the users via the platform. In some implementations, the device(s) providing the non-virtual reality platform may be less capable then the device(s) providing the virtual reality platform. By way of non-limiting example, an attack action via a non-virtual reality platform may be limited to a general, straight on attack actions having a twitch type of gameplay. An attack action via a virtual reality platform may be more controllable by the user such that form of the input (e.g., via the user performing the action), location of the strike, depth and/or positioning of the attack, and/or other input parameters may be available due to the immersive capabilities of the virtual reality platform. In some implementations, limited functionality may be limited available actions. To illustrate, actions available to be performed by the first user in the online game via the second platform may be limited compared to the actions available to be performed via the first platform.

Game component 4112 may transmit the game state information over network 4150 to the client computing platforms 4104, causing client computing platforms 4104 to present views of the online game. Views of the online game presented via virtual reality platform 4104a may include views presented via a head-mounted display device. The views may be presented stereoscopically-one for each eye-via the head mounted display device. The user's brain may combine the views creating a three-dimensional experience. The head mounted display device may include a head and/or eye tracking system that tracks movement of the user as they move their head, eyes, and/or themselves around in physical space to select views and/or move about the online game (e.g., the virtual space in which the online game is played).

Views of the online game presented via a non-virtual reality platform may include views presented on a display for one or more of a mobile device (e.g., a smart phone, tablet, laptop), desktop computer, gaming console, televisions, and/or other non-virtual reality platforms.

In some implementations, the game content for the online game provided to the users via the virtual reality platforms may be different than the game content provided to the users via the non-virtual reality platforms. For example, different, but related game content, may be provided to the users via the non-virtual reality platforms compared to the virtual reality platforms.

Execution of the game instance may enable interaction by the users with the online game and/or each other. Game component 4112 may be configured to perform operations in the game instance in response to commands received over network 4150 from client computing platforms 4104. Users may participate in the online game through client game applications implemented on the client computing platforms 4104 associated with the users.

Within the instance of the online game, users may interact with elements in the online game and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the online game by game component 4112 may include determining a game state associated with the online game. The game state information may include information defining a virtual space in which the online game is played. The state may be communicated (e.g., via streaming visual data, via object/position data, and/or other state information) from server(s) 4102 to client computing platforms 4104 for presentation to users. The state determined and transmitted to a given client computing platform 4104 may correspond to a view for a user character being controlled by a user via the given client computing platform 4104. The state determined and transmitted to a given client computing platform 4104 may correspond to a location in a virtual space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user. In some implementations, when the user is playing the online game via the virtual reality platforms, the view may be selected by the user based on their head and/or eye movement.

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

The online game may be played within a simulated virtual space, e.g., a virtual space that is accessible by users via clients (e.g., client computing platforms 4104) that present the views of the virtual space to a user. The virtual space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise virtual entities automatically controlled in the online game. Such virtual entities may not be associated with any user. As such, the automatically controlled virtual entities may be generated and/or developed by artificial intelligence configured with the server(s) 4102 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with the server 4102. As used herein, such automatically controlled virtual space entities in the instance of the online game are referred to as "non-player entities".

It should be understood the above description of the manner in which state of the virtual space associated with the online game as determined by game component 4112 is not intended to be limiting. The game component 4112 may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Within the instance of the online game executed by game component 4112, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

In any case, the user-controlled elements may move through and interact with the virtual space (e.g., non-player entities, elements controlled by other users and/or topography in the virtual space) associated with the online game. The elements controlled by a given user may be created and/or customized by the given user. The given user may have an "inventory" of virtual goods and/or currency usable within the virtual space.

Controls of virtual elements in the online game may be exercised through commands input by a given user through and/or by client computing platforms 4104. The given user may interact with other users through communications exchanged within the virtual space. Such communications may include one or more of textual chat, instant messages, private messages, voice communications, and/or other communications. Communications may be received and entered by the users via their respective client computing platforms 4104. Communications may be routed to and from the appropriate users through server(s) 4102 (e.g., through the game component 4112).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via virtual reality 4104a platform, a given user may input a broader range of commands compared to those available on non-virtual reality platform 4104b. The input commands via the virtual reality platform 4104a may include the user performing the action as an input command. The user may also be able to look around and/or move about the virtual space in which the online game is played via the virtual reality platform.

The game component 4112 may be configured to execute and/or perform user actions to facilitate participation of the users in the online game and/or with each other in response to receiving game commands input by the users. Execution and/or performance of the user action by the game component 4112 may produce changes to the game state, which may reflect progresses and/or results of the user actions. In some examples, state changes caused by the execution of the user actions may be recorded in the electronic storage 4110 to facilitate persistency throughout the instance of the online game. In some examples, execution of the user actions may not produce persistent changes to the game state (e.g., a user character jumping forward and backward successively may not produce any perceivable game state changes to other users).

Gameplay component 4114 may be configured to monitor gameplay progress made by the users via the non-virtual reality platforms. For example, gameplay progress made by the first user through actions requested via the second platform (e.g., the non-virtual reality platform) may be monitored by gameplay component 4114. Gameplay progress made by the users via the non-virtual reality platforms may include one or more actions that progress and/or cause progression of a user along a skill tree of the online game. For example, the gameplay progress may include one or more of defeating a boss, winning a battle, resisting an attack, building and/or rebuilding a virtual entity, healing a virtual character and/or a non-user character, unlocking game content, developing a skill, leveling-up, completing one or more experience segments of the online game, and/or other progress within the online game. The virtual entities built and/or rebuilt via user actions requested via the non-virtual reality platforms may include non-user characters (e.g., virtual armies, etc.), virtual structures, and/or other virtual entities that may be built, depleted, and/or damaged within the online game. Virtual characters may sustain injury and/or damage within the online game wherein the actions requested via the non-virtual reality platform may heal and/or repair one or more of the virtual characters.

The users actions requested via the non-virtual reality platform may progress the user towards unlocking game content (e.g., a level, world, virtual item, virtual entity, etc.) within the online game. In some implementations, the user may develop one or more skills of the virtual character via actions requested through the non-virtual reality platform. In some implementations, the gameplay progress made through actions requested via the non-virtual reality platforms may include completion of one or more experience segments. The experience segments may include portions of the online game that may be completed and/or played by the users. For example, experience segments may include one or more of a game tile, game level, event, challenge, quest, nodes, mini-game, and/or other experience segment within the online game.

In some implementations, one or more of the actions requested via the non-virtual reality platform may not be able to be requested by a user via the virtual reality platform. For example, one or more of the actions requested via the second platform may not be able to be requested by the first user via the first platform. In some implementations, wherein users may perform one or more actions via the virtual reality platform and the non-virtual reality platform, performing actions via the non-virtual reality platform may be more advantageous to the user. For example, performing the actions available to be performed by the first user via the second platform may provide more gameplay progress and/or similar gameplay progress but faster than performing the same or similar actions via the first platform.

In some implementations, system 4100 may include user component 4116. User component 4116 may be configured to manage one or more user accounts associated with individual users of the online game. User component 4116 may be configured to store gameplay progress made by the users user through actions requested via the non-virtual reality platforms.

The user accounts managed by user component 4116 may include user information regarding the individual users of the online game. The user information may be stored in a network storage location such as the electronic storage 4110, and/or any other storage locations. User component 4116 may be configured to manage user accounts comprising user information regarding the users. The user information managed by user component 4116 and/or included in the user accounts may include gameplay information indicating gameplay progress made by the users via the non-virtual reality platforms. The gameplay information may be determined by gameplay component 4114 by monitoring gameplay progress by the users via the non-virtual reality platforms. The user profiles may include a first user profile for the first user.

The user profiles may include, for example, personal information identifying users (e.g., a username or handle, a number, an identifier, and/or other identifying information) within the online game, payment information (e.g., information associated with a method of payment and/or an account, and/or whether a payment method has been established for a given platform), security login information (e.g., a login code or password), online game account information, subscription information, character account information (e.g., gameplay progress information, virtual characters associated with the user, a status and/or characteristics of the virtual characters, a level of the virtual characters, etc.), platform information (e.g., virtual reality platform(s) and/or non-virtual reality platforms associated with a user), virtual resources and/or currency account information (e.g., related to virtual resources and/or virtual currency obtained and/or held in credit for a user), relationship information (e.g., information related to relationships between users in the online game), inventory information, online game usage information, demographic information associated with users, and/or other information related to users.

The user component 4116 may be configured to store inventories of virtual items including virtual resources that are available to users in the online game. Various matters may be collected in an inventory. These matters may include, but are not limited to, virtual items, virtual resources, character attributes, character skills, and/or other virtual matters. The virtual resources may be earned by the users for the gameplay progress made through actions requested via the non-virtual reality platforms. A virtual resource may be a resource that can be exchanged to enhance one or more abilities for a virtual character. The virtual resources may include one or more of virtual currency, virtual items, energy, non-player characters, building materials, natural virtual resources, and/or other virtual resources. Virtual currency may be consideration for use within the online game. Virtual currency may be represented by virtual coins, virtual gems, virtual crystals, virtual cash, or by a number or value stored by the server for that user's benefit. Such virtual currency represents units of value for use in the online game system. Virtual currency may be purchased in one or more actual cash or credit transactions by a user, where the real world currency is transferred using a credit/debit/charge card transaction conveyed over a financial network. A user may earn virtual currency for gameplay progress. For example, a user may be rewarded with one or more units of virtual currency after making progress via actions requested via the non-virtual reality platform, completing a task, quest, challenge, and/or mission within the game.

Virtual currency may be used to purchase one or more in-game assets or other benefits. For example, a player may be able to exchange virtual currency for an enhancement of an ability for a virtual character, a desired level, access, right, or item in an online game. Multiple types of virtual currency may be available for purchase from the game system operator. In some embodiments, certain types of virtual currency can be acquired by engaging in various in-game actions while other types of virtual currency can only be acquired by exchanging real-world currency. A virtual item may be an item associated with a given ability and/or an item that can be used in a virtual world to assist a player's character. Examples of virtual items include, but are not limited to, weapons, spell components, defense components, armor, and/or other virtual items. Players may collect, trade, buy, fight over items, and/or perform other actions to add to their inventory. Energy may include stamina and/or energy of a virtual character within the online game. Non-player characters may include, by way of non-limiting example, one or more of armies/soldiers, wizards, monsters, bosses, and/or other non-player characters (NPCs). Building materials may include one or more virtual items for building, upgrading and/or enhancing one or more virtual entities and/or structures. Examples of natural virtual resources include wood, stone, herbs, water, ores, animals, and/or other natural resources and/or materials.

The user information in the user account associated with the given user for the online game may include historic transaction information indicating previous spending by the user in the online game via a given platform. In some exemplary implementations, such historic transaction information may reflect various statistics and details about the individual spending by the user via individual ones of the virtual reality platform(s) and/or the non-virtual reality platform(s). Examples of such statistics may include purchases made within the online game when played via a given platform, when purchases were made in the online game when played via a given platform, an amount of virtual and/or real currency spent, a number of times a user spends virtual and/or real currency in exchange for virtual items (e.g., a number of transactions), a frequency of such spending by the user with in a time period of interest (e.g., past 24 hours, past week, past month, etc.), a spend velocity (e.g., rate of spending), and/or any other statistics.

Award component 4118 may be configured to award an amount of a virtual resource to users for gameplay progress made by actions requested through non-virtual reality platforms. For example, award component 4118 may be configured to award an amount of virtual resources to the first user for the gameplay progress made by the first user through actions requested via the second platform. The virtual resource may be redeemable for enhanced abilities for one or more virtual characters controlled by the user in the online game. The abilities for a virtual character associated with the user may include an ability to access a game level, an ability to access game content, an ability to access and/or use virtual items, a stamina associated with the virtual character, an identity of the virtual character associated with one or more skills, a healing rate associated with the virtual character, a respawn rate for the virtual character, a skill of the virtual character, a power of the virtual character, an ability to perform one or more actions, a resistance of the virtual character, and/or other abilities.

By way of non-limiting example, award component 4118 may be configured to award a crystal to a user for completing one or more game tiles within the online game via the non-virtual reality platform. The crystal may be redeemable for a new identity for the virtual character, wherein the new identity is associated with one or more skills. By way of another non-limiting example, award component 4118 may be configured to award a sword to user for building an army base within the online game via the non-virtual reality platform. The sword may be redeemable for the ability of the virtual character to use the sword (e.g., increasing a effectiveness of an attack by the virtual character) within the online game.

By way of another non-limiting example, award component 4118 may be configured to award an amount of gems to a user for resisting an attack by actions requested via the non-virtual reality platform. At least a portion of the amount of gems awarded may be redeemable for increasing the stamina and/or resistance for the virtual character.

A power of the virtual character may relate to the effectiveness and/or power associated with one or more actions performed by the virtual character within the online game. Virtual character skills may be game attributes inherent in or acquired by a virtual character during game play such as, but not limited to: the ability to cast (certain) spells, foretell the future, read minds, use (certain) weapons, cook, hunt, find herbs, assemble herbs into potions, mine, assemble objects into other objects, fly, enchant other player characters, and/or other character skills. A resistance of the virtual character may include the virtual character's resistance to an attack.

Ability component 4120 may be configured to receive requests from the non-virtual reality platforms associated with the users to exchange a portion of the virtual resource for an enhancement of an ability for a virtual character. The requests may be received by ability component 4120, over network 4150. For example, a request from the second platform to exchange at least a portion of the amount of the virtual resource for an enhancement of a first ability for a first virtual character controlled by the first user in the online game may be received.

Ability component 4120 may be configured to enhance the first ability for the first virtual character in response to receipt of the request. Enhancing an ability may include improving the ability, adjusting the ability, increasing the ability, enabling the ability, and/or otherwise enhancing the ability. In some implementations, enhancement of the first ability for the first virtual character is reflected in the online game via the first platform. The enhancement of the first ability may be in response to receipt of the request from the second platform. As such, for example, the first user may be able to perform actions within the virtual reality interface in accordance with the enhancement.

By way of non-limiting example, a first user may perform attack actions within the online game via the non-virtual reality platform such that the user's performance of attack options defeats a boss associated with a given level in the online game. Continuing the example, the user may be awarded a medal for defeating the boss wherein the medal may be exchanged for a virtual character's ability to access a new level such that when playing the online game via the virtual reality platform, the virtual character is able to access the new level.

Figure 13:
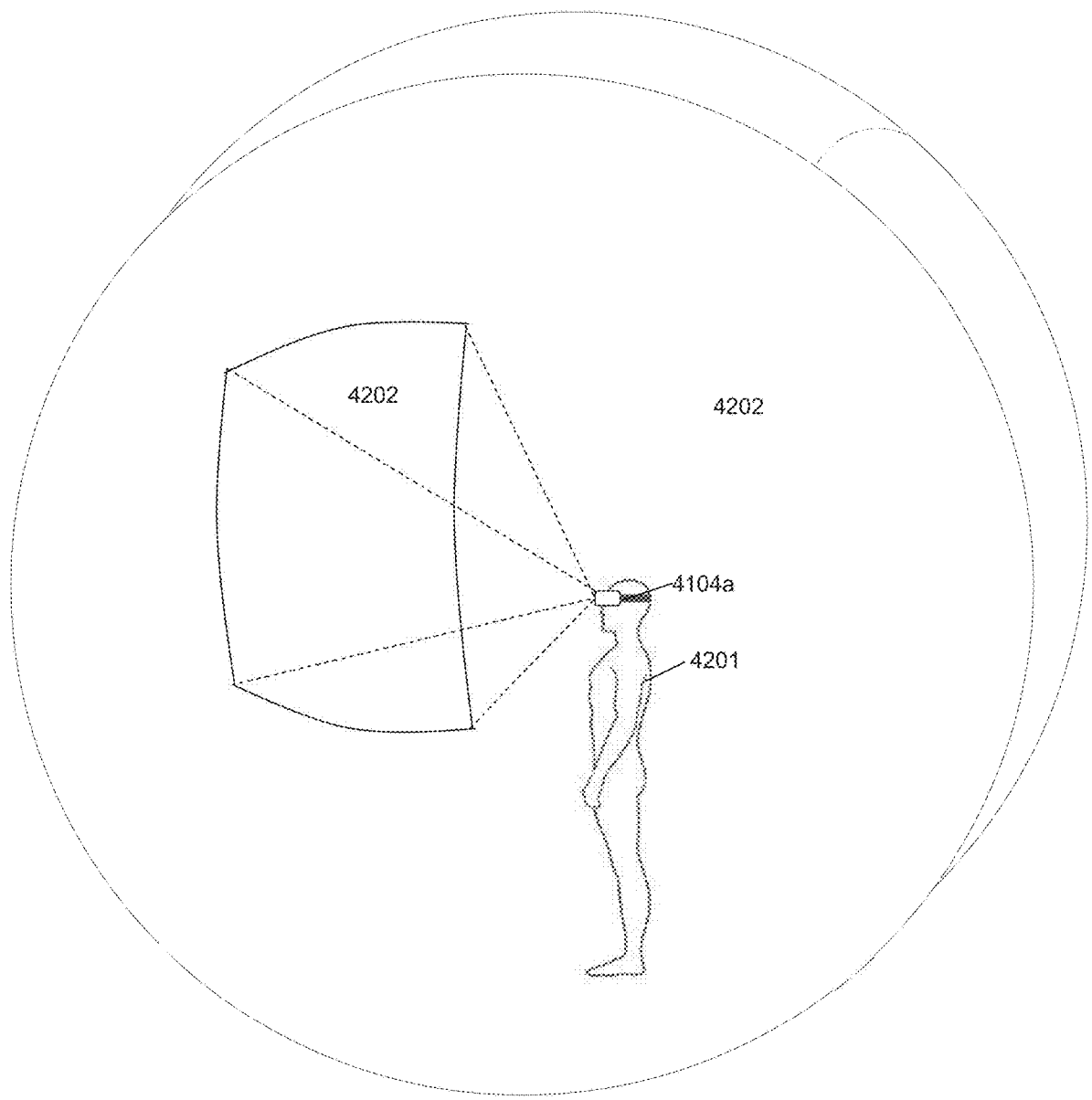
FIG. 13 depicts a virtual reality interface provided by virtual reality platform, in accordance with one or more implementations.

FIG. 13 depicts a virtual reality interface 4202 provided by virtual reality platform 4104*a*. The views of the online game provided via virtual reality interface 4202 may include immersive views that cause user 4201 to have the perception of being physically present in a virtual world in which the online game is played. Enhancement of an ability for a virtual character, earned via gameplay progress made in a non-virtual reality interface, may be reflected in virtual reality interface 4202. User 4201 may be able to perform actions within virtual reality interface 4202 in accordance with the enhancement.

Returning to FIG. 12, the client computing platform(s) 4104 may include one or more processors, memory, display devices, head-mounted display devices, sensors, and/or any other components. The processor(s) may be configured to execute machine-readable instructions to launch and/or implement one or more client game applications associated with the online games. In some implementations, the machine-readable instructions may cause the processors of one of more client computing platforms to perform functionality the same as or similar to the functionality performed by one or more components of system 4100.

The client computing platform(s) 4104 may be configured to: present a graphical representation of the virtual space (e.g., a virtual reality representation and/or a non-virtual reality representation) corresponding to a given online game; provide controls and/or sense input commands enabling the given user to maneuver virtual items, initiate actions, and/or purchase virtual item(s) usable in the online game(s) within the virtual space associated with the online game; determine information for implementing game interfaces for the online game(s) hosted by system 4100; obtain state information regarding a given online game hosted by the system 4100; determine view information (e.g., a view point, field of view, eye/head movement, and/or location) of the user at a given time; determine a level of rendering of a scene in the online game based on the state information and view information; determining one or more action menus for presentation to the user in the game interface; facilitate interaction by the given user in the online game(s) and/or interaction with other users; communicate with sever(s) 4102 (e.g., receive and/or transmitting information to/from servers 4102); and/or provide any other functionality. In some implementations, client computing platform 4104 may be a virtual reality platform and/or a non-virtual reality platform. Client computing platform 4104 may be configured to communicate with, transmit information to, and/or receive information from one or more of servers 4102, and/or other components of system 4100.

The server(s) 4102, client computing platform(s) 4104, and/or external resources 4106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 4102, client computing platforms 4104, and/or external resources 4106 may be operatively linked via some other communication media.

A given client computing platform 4104 may include one or more processors configured to execute computer program components. The computer program components may be configured to enable an expert or user associated with the given client computing platform 4104 to interface with system 4100 and/or external resources 4106, and/or provide other functionality attributed herein to client computing platforms 4104. By way of non-limiting example, the given client computing platform 4104 may include one or more of a virtual reality system, a head-mounted virtual reality display, desktop computer, a laptop computer, a handheld computer, a tablet computing platform, a NetBook, a Smartphone, a gaming console, and/or other computing platforms.

The external resources 4106 may include sources of information, hosts and/or providers of virtual environments outside of system 4100, external entities participating with system 4100, and/or other resources. In some implementations, some or all of the functionality attributed herein to external resources 4106 may be provided by resources included in system 4100.

The server(s) 4102 may include electronic storage 4110, one or more processors 108, and/or other components. The server(s) 4102 may include communication lines, or ports to enable the exchange of information with a network and/or other computing platforms. Illustration of server(s) 4102 in FIG. 12 is not intended to be limiting. The server(s) 4102 may include a plurality of hardware, software, and/or firmware components operating together to provide the functionality attributed herein to server(s) 4102. For example, server(s) 4102 may be implemented by a cloud of computing platforms operating together as server(s) 4102.

Electronic storage 4110 may comprise electronic storage media that electronically stores information. The electronic storage media of electronic storage 4110 may include one or both of system storage that is provided integrally (i.e., substantially non-removable) with server(s) 4102 and/or removable storage that is removably connectable to server(s) 4102 via, for example, a port (e.g., a USB port, a FireWire port, etc.) or a drive (e.g., a disk drive, etc.). Electronic storage 4110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Electronic storage 4110 may include one or more virtual storage resources (e.g., cloud storage, a virtual private network, and/or other virtual storage resources). Electronic storage 4110 may store software algorithms, information determined by processor 108, information received from server(s) 4102, information received from client computing platforms 4104, and/or other information that enables server(s) 4102 to function as described herein.

Processor(s) 4108 is configured to provide information processing capabilities in server(s) 4102. As such, processor 4108 may include one or more of a digital processor, an analog processor, a digital circuit designed to process information, an analog circuit designed to process information, a state machine, and/or other mechanisms for electronically processing information. Although processor 4108 is shown in FIG. 12 as a single entity, this is for illustrative purposes only. In some implementations, processor 4108 may include a plurality of processing units. These processing units may be physically located within the same device, or processor 108 may represent processing functionality of a plurality of devices operating in coordination. The processor 4108 may be configured to execute components 4112, 4114, 4116, 4118, 4120. Processor 4108 may be configured to execute components 4112, 4114, 4116, 4118, 4120 by software; hardware; firmware; some combination of software, hardware, and/or firmware; and/or other mechanisms for configuring processing capabilities on processor 4108.

It should be appreciated that although components 4112, 4114, 4116, 4118, 4120 are illustrated herein as being co-located within a single processing unit, in some other implementations, one or more of components 4112, 4114, 4116, 4118, 4120 may be located remotely from the other components. The description of the functionality provided by the different components 4112, 4114, 4116, 4118, 4120 described below is for illustrative purposes, and is not intended to be limiting, as any of components 4112, 4114, 4116, 4118, 4120 may provide more or less functionality than is described. For example, one or more of components 4112, 4114, 4116, 4118, 4120 may be eliminated, and some or all of its functionality may be provided by other ones of components 4112, 4114, 4116, 4118, 4120. As another example, processor 4108 may be configured to execute one or more additional components that may perform some or all of the functionality attributed below to one of components 4112, 4114, 4116, 4118, 4120.

Figure 14:
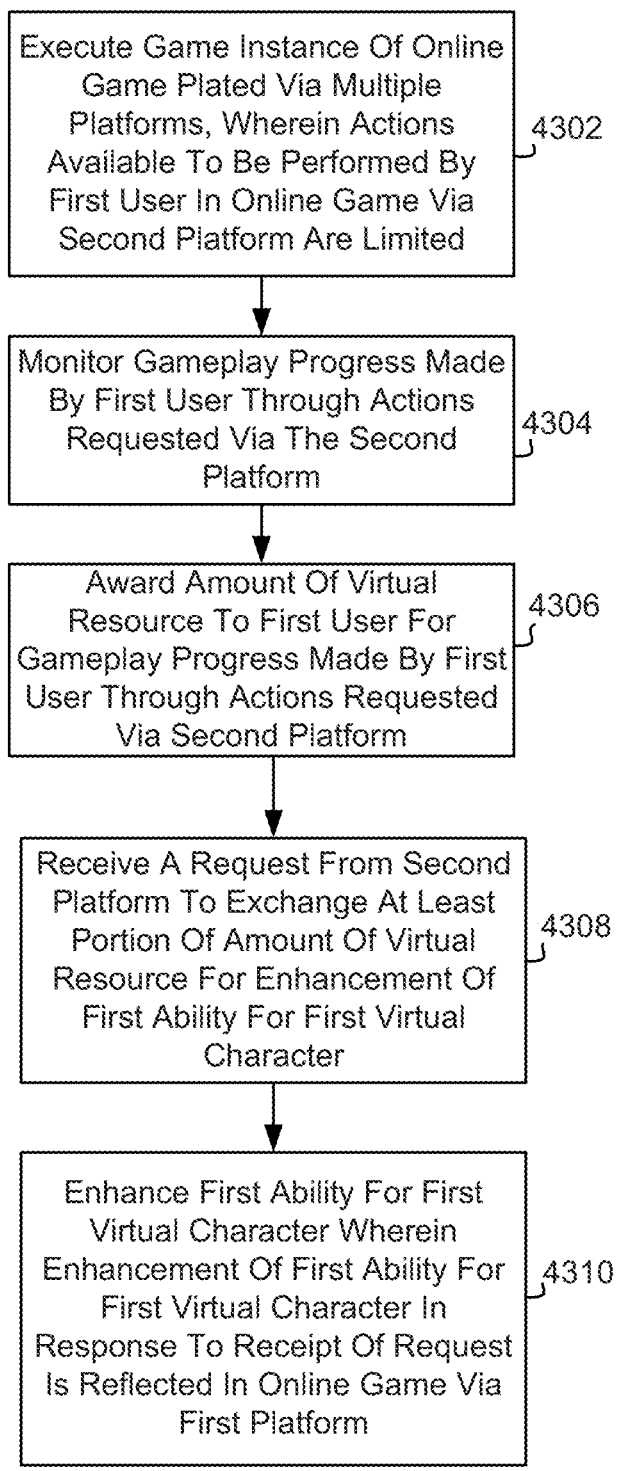
FIG. 14 illustrates a method that makes progress of a user character obtained in an online game via a non-virtual reality interface available in a virtual reality interface, in accordance with one or more implementations.

FIG. 14 illustrates a method that makes progress of a user character obtained in an online game via a non-virtual reality interface available in a virtual reality interface, in accordance with one or more implementations. The operations of method 4300 presented below are intended to be illustrative. In some embodiments, method 4300 may be accomplished with one or more additional operations not described, and/or without one or more of the operations discussed. Additionally, the order in which the operations of method 4300 illustrated in FIG. 14 and described below is not intended to be limiting.

In some embodiments, method 4300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 4300 in response to instructions stored electronically on an electronic storage medium. The one or more processing devices may include one or more devices configured through hardware, firmware, and/or software to be specifically designed for execution of one or more of the operations of method 4300.

At an operation 4302, a game instance of the online game played via multiple platforms may be executed. The game instance may be used to generate game state information that is transmitted to client computing platforms over a network. The game state information may facilitate presentation of views of the online game to the users via the client computing platforms. Execution of the game instance further enables interaction by the users with the online game and/or each other by performing operations in the game instance in response to commands received over the network from the client computing platforms. The client computing platforms may include virtual reality platforms and non-virtual reality platforms. The virtual reality platforms may include a first platform that provides a virtual reality interface to a first user. The non-virtual reality platforms may include a second platform that provides a non-virtual reality interface to the user. The second platform may have a limited functionality compared to the first platform. Actions available to be performed by the first user in the online game via the second platform may be limited compared to the actions available to be performed via the first platform. In some implementations, operation 4302 may be performed by a game component the same as or similar to game component 4112 (shown in FIG. 12 and described herein).

At an operation 4304, gameplay progress may be monitored. Gameplay progress made by the first user through actions requested via the second platform may be monitored. In some implementations, operation 4304 may be performed by a gameplay component the same as or similar to gameplay component 4114 (shown in FIG. 12 and described herein).

At operation 4306, an amount of a virtual resource may be awarded to the first user. The amount of virtual resource may be awarded to the first user for the gameplay progress made by the first user through actions requested via the second platform. The virtual resource may be redeemable for enhanced abilities for one or more virtual characters controlled by the first user in the online game. In some implementations, operation 4306 may be performed by a reward component the same as or similar to award component 4118 (shown in FIG. 12 and described herein).

At operation 4308, a request may be received from the second platform to exchange at least a portion of the amount of the virtual resource for an enhancement of a first ability. The enhancement of the first ability may be for a first virtual character controlled by the first user in the online game. In some implementations, operation 4308 may be performed by an ability component the same as or similar to ability component 4120 (shown in FIG. 12 and described herein).

At operation 4310, the first ability for the first virtual character may be enhanced. The first ability for the first virtual character may be enhanced in response to receipt of the request. Enhancement of the first ability for the first virtual character in response to receipt of the request may be reflected in the online game via the first platform. As such, the first user may be able to perform actions within the virtual reality interface in accordance with the enhancement. In some implementations, operation 4310 may be performed by an ability component the same as or similar to ability component 4120 (shown in FIG. 12 and described herein).

A system and method for making progress of a user character obtained in an online game via a non-virtual reality interface available in a virtual reality interface. The online game may be played via multiple platforms including virtual reality platforms and non-virtual reality platforms. The actions available to be performed by users via the non-virtual reality platforms may be limited compared to the actions available to be performed via the virtual reality platforms. Gameplay progress made by a user through actions requested via a non-virtual reality platform may be monitored. An amount of a virtual resource may be awarded based on the progress, and/or exchanged for an enhancement of an ability for a virtual character controlled by the user in the online game. The ability may be enhanced such that the enhancement is reflected in the online game via the virtual reality platform.

In some embodiments, a system that makes progress of a user character obtained in an online game via a non-virtual reality interface available in a virtual reality interface, the system comprising: one or more physical computer processors configured by machine readable instructions to: execute a game instance of the online game played via multiple platforms, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform that provides a virtual reality interface to a first user, and the non-virtual reality platforms including a second platform that provides a non-virtual reality interface to the user, wherein the second platform has limited functionality compared to the first platform; wherein actions available to be performed by the first user in the online game via the second platform are limited compared to the actions available to be performed via the first platform; monitor gameplay progress made by the first user through actions requested via the second platform; award an amount of a virtual resource to the first user for the gameplay progress made by the first user through actions requested via the second platform, the virtual resource being redeemable for enhanced abilities for one or more virtual characters controlled by the first user in the online game; receive a request from the second platform to exchange at least a portion of the amount of the virtual resource for an enhancement of a first ability for a first virtual character controlled by the first user in the online game; enhance the first ability for the first virtual character in response to receipt of the request; and wherein enhancement of the first ability for the first virtual character in response to receipt of the request is reflected in the online game via the first platform, such that the first user is able to perform actions within the virtual reality interface in accordance with the enhancement. In some embodiments, the system as described above, wherein the first ability includes one or more of an ability to access a game level, an ability to access game content, an ability to access and/or use virtual items, stamina, healing rate, respawn rate, skill, power, an ability to perform one or more actions, and/or resistance of or for the first virtual character. In some embodiments, the system as described above, wherein the virtual resource includes one or more of virtual currency, virtual items, points, energy, non-player characters, building materials, and/or natural virtual resources. In some embodiments, the system as described above, wherein the gameplay progress made by the user through actions requested via the second platform includes one or more of defeating a boss, achieving a level, winning a battle, resisting an attack, building and/or rebuilding a virtual entity, healing a user character and/or a non-user character, unlocking game content, developing a skill, and/or completing one or more experience segments of the online game. In some embodiments, the system as described above, wherein the second platform includes a mobile device including one or more of a smart phone, tablet, and/or laptop computer. In some embodiments, the system as described above, wherein the first platform includes a virtual reality head mounted display device. In some embodiments, the system as described above, the one or more physical computer processors configured by machine readable instructions to: transmit the game state information over the network causing the first platform to present the views of the online game to the first user via a head mounted display device associated with the first platform. In some embodiments, the system as described above, wherein the virtual reality interface has a higher interactive potential than the non-virtual reality interface, the interactive potential indicating a level of interactions, inputs, and/or views available to the users in the virtual reality interface provided via the first platform and the non-virtual reality interface provided via the second platform. In some embodiments, the system as described above, wherein one or more of the actions requested via the second platform cannot be requested by the first user via the first platform. In some embodiments, the system as described above, wherein performing the actions available to be performed by the first user via the second platform provides more gameplay progress and/or similar gameplay progress faster to the first user than performing same or similar actions via the first platform.

Figure 15:
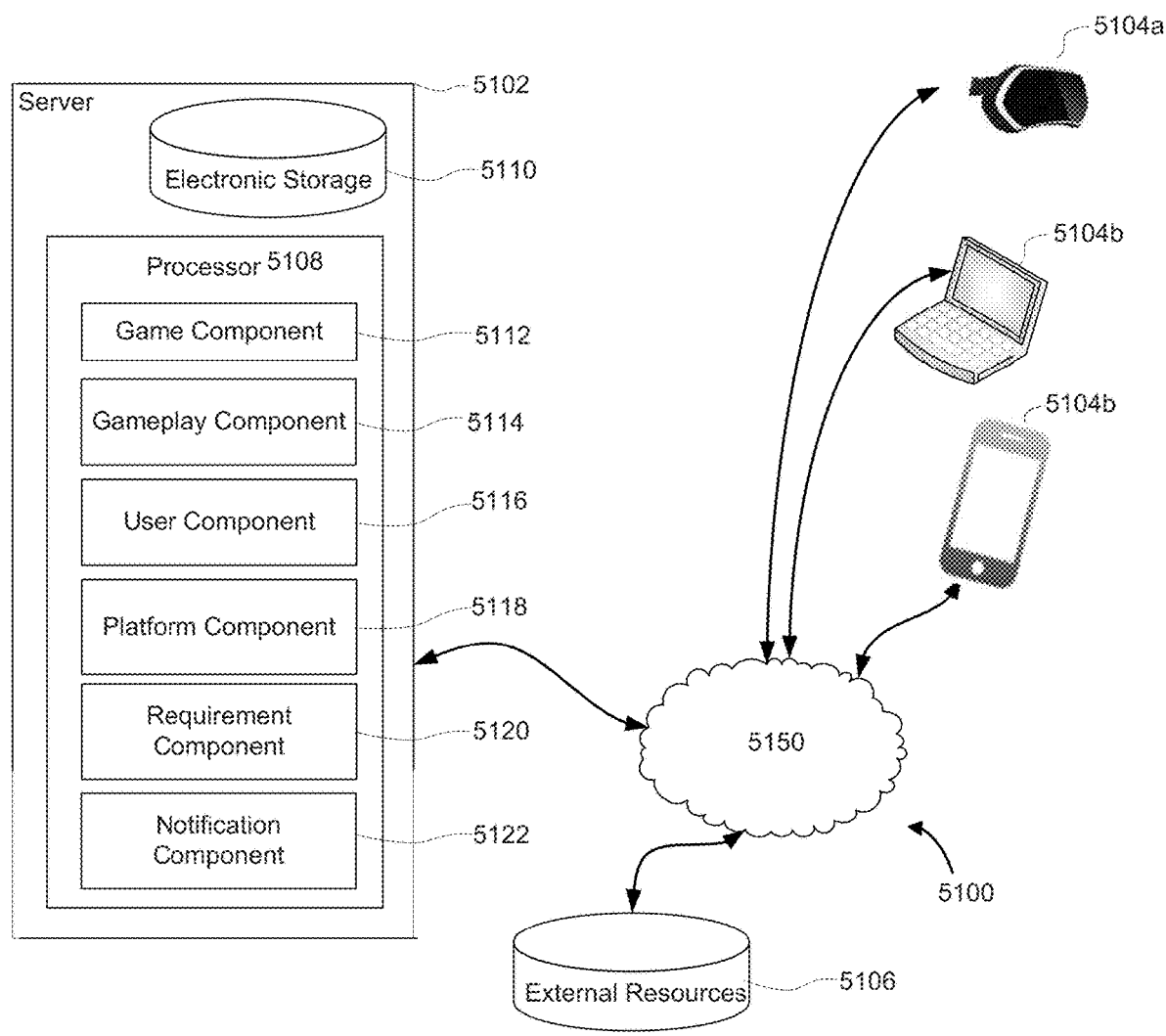
FIG. 15 illustrates a system for making game content from a single online game accessible to users via multiple platforms, in accordance with one or more implementations.

In some embodiments, a game server implemented method that makes progress of a user character obtained in an online game via a non-virtual reality interface available in a virtual reality interface, the method being implemented by a computer system including one or more physical processors configured by machine-readable instructions, the method comprising: executing a game instance of the online game played via multiple platforms, and use the game instance to generate game state information that is transmitted to client computing platforms over a network, the game state information facilitating presentation of views of the online game to users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform that provides a virtual reality interface to a first user, and the non-virtual reality platforms including a second platform that provides a non-virtual reality interface to the user, wherein the second platform has limited functionality compared to the first platform; wherein actions available to be performed by the first user in the online game via the second platform are limited compared to the actions available to be performed via the first platform; monitoring gameplay progress made by the first user through actions requested via the second platform; awarding an amount of a virtual resource to the first user for the gameplay progress made by the first user through actions requested via the second platform, the virtual resource being redeemable for enhanced abilities for one or more virtual characters controlled by the first user in the online game; receiving a request from the second platform to exchange at least a portion of the amount of the virtual resource for an enhancement of a first ability for a first virtual character controlled by the first user in the online game; enhancing the first ability for the first virtual character in response to receipt of the request; and wherein enhancement of the first ability for the first virtual character in response to receipt of the request is reflected in the online game via the first platform, such that the first user is able to perform actions within the virtual reality interface in accordance with the enhancement. In some embodiments, the method as described above, wherein the first ability includes one or more of an ability to access a game level, an ability to access game content, an ability to access and/or use virtual items, stamina, healing rate, respawn rate, skill, power, an ability to perform one or more actions, and/or resistance of or for the first virtual character. In some embodiments, the method as described above, wherein the virtual resource includes one or more of virtual currency, virtual items, points, energy, non-player characters, building materials, and/or natural virtual resources. In some embodiments, the method as described above, wherein the gameplay progress made by the user through actions requested via the second platform includes one or more of defeating a boss, achieving a level, winning a battle, resisting an attack, building and/or rebuilding a virtual entity, healing a user character and/or a non-user character, unlocking game content, developing a skill, and/or completing one or more experience segments of the online game. In some embodiments, the method as described above, wherein the second platform includes a mobile device including one or more of a smart phone, tablet, and/or laptop computer. In some embodiments, the method as described above, wherein the first platform includes a virtual reality head mounted display device. In some embodiments, the method as described above, further comprising: transmitting the game state information over the network causing the first platform to present the views of the online game to the first user via a head mounted display device associated with the first platform. In some embodiments, the method as described above, wherein the virtual reality interface has a higher interactive potential than the non-virtual reality interface, the interactive potential indicating a level of interactions, inputs, and/or views available to the users in the virtual reality interface provided via the first platform and the non-virtual reality interface provided via the second platform. In some embodiments, the method as described above, wherein one or more of the actions requested via the second platform cannot be requested by the first user via the first platform. In some embodiments, the method as described above, wherein performing the actions available to be performed by the first user via the second platform provides more gameplay progress and/or similar gameplay progress faster to the first user than performing same or similar actions via the first platform. Making Game Content from a Single Online Game Accessible to Users via Multiple Platforms:

FIG. 15 illustrates a system 5100 that makes game content from a single online game accessible to users via multiple platforms. The multiple platforms may include client computing platforms via which users play the online game. The client computing platforms may include virtual reality platforms and non-virtual reality platforms. The virtual reality platforms may present views of the online game in a manner that simulates immersion (e.g., the user's perception of being physically present within a non-physical world) within the online game. The online game may have a higher interactive potential when played via the virtual reality platforms than when played via the non-virtual reality platforms. For example, the virtual reality platforms may be able to support additional and/or increased motion inputs, views, visibility, and/or other interactions a user may have with the online game. However, the virtual reality platforms may also be more restrictive because a user may not always have access to a virtual reality platform or may not be able to immerse themselves in the online game as required by virtual reality. Thus, a balance between playing the online game via the virtual reality platforms and the non-virtual reality platforms may improve the users' experience with the game and introduce new monetization opportunities, without losing the flexible and constant access to the online game provided by non-virtual reality platforms.

The online game may be provided and/or executed by system 5100. Providing the online game may include hosting the online game over a network. In some implementations, system 5100 may include one or more servers 5102 configured for hosting online games. Server 5102 may be configured to communicate with one or more client computing platforms 5104 according to a client/server architecture, and with each other. The users may access system 5100, the online game, and/or the game space associated with the online game via client computing platforms 5104, such as client computing platforms 5104a-b as shown. Client computing platforms 5104 may include virtual reality platform(s) 5104a and non-virtual reality platform(s) 5104b. Server 5102 may comprise a processor 5108 configured to execute machine readable instructions to implement system components. The computer program components may include one or more of a game component 5112, a gameplay component 5114, a user component 5116, a platform component 5118, a requirement component 5120, a notification component 5122, and/or other components.

The game component 5112 may be configured to execute a game instance of an online game played via multiple platforms. The online game may be played by users via virtual reality platforms and non-virtual reality platforms.

The virtual reality platforms may provide an immersive gaming experience by simulating the user's presence within the virtual space in which the online game is played. The game component 5112 may be configured to use the game instance to generate game state information that is transmitted to client computing platforms 5104 over a network 5150. The game state information may facilitate presentation of views of the online game to the users via the client computing platforms. The game component 5112 may transmit the game state information over network 5150 to the client computing platforms 5104, causing client computing platforms 5104 to present views of the online game. Views of the online game presented via virtual reality platform 5104a may include views presented on a head-mounted display device. The views may be presented stereoscopically-one for each eye-via the head mounted display device and the user's brain combines them creating a three-dimensional experience. The head mounted display device may include a head and/or eye tracking system that tracks movement of the user as they move their head, eyes, and/or themselves around the virtual space in which the online game is played. Views of the online game presented via a non-virtual reality platform may include views presented on a display for one or more of a mobile device (e.g., a smart phone, tablet, laptop), desktop computer, gaming console, televisions, and/or other non-virtual reality platforms.

In some implementations, the game content for the online game provided to the users via the virtual reality platforms may be different than the game content provided to the users via the non-virtual reality platforms. For example, different, but related game content, may be provided to the users via the non-virtual reality platforms compared to the virtual reality platforms. To illustrate, where first game content is provided to the first user via the first platform (e.g., a virtual reality platform) and second game content is provided to the first user via the second platform (e.g., a non-virtual reality platform), the second game content may be different than the first game content. The second game content may be related to the first game content. Differences in the game content provided via a given platform may include one or more of: dimension differences (e.g., three-dimensional vs two-dimensional), location differences within the virtual space, character differences, and/or other differences. Relatedness of the game content may indicate that one or more of the subject matter, characters, virtual environment, in the online game via played via a virtual reality platform and played via the non-virtual reality platform are related. By way of non-limiting example, in the online game played via the virtual reality platform, the user may be an astronaut in space and/or on a planet. In the online game played via the non-virtual reality platform, the user may be an astronaut that has returned to the space station or base.

Execution of the game instance may enable interaction by the users with the online game and/or each other. Game component 5112 may be configured to perform operations in the game instance in response to commands received over network 5150 from client computing platforms 5104. Users may participate in the online game through client game applications implemented on the client computing platforms 5104 associated with the users.

Within the instance of the online game, users may interact with elements in the online game and/or with each other through gameplays provided by the online game. The gameplays may include role-playing, first-person shooter, real-time strategy, turn-based strategy, simulation, music and/or rhythm playing, social interaction, twitching and/or any other gameplays. The execution of the instance of the online game by game component 5112 may include determining a game state associated with the online game. The game state information may include information defining a virtual space in which the online game is played. The state may be communicated (e.g., via streaming visual data, via object/position data, and/or other state information) from server(s) 5102 to client computing platforms 5104 for presentation to users. The state determined and transmitted to a given client computing platform 5104 may correspond to a view for a user character being controlled by a user via the given client computing platform 5104. The state determined and transmitted to a given client computing platform 5104 may correspond to a location in a virtual space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

The instance of the online game may comprise a simulated virtual space, e.g., a virtual space that is accessible by users via clients (e.g., client computing platforms 5104) that present the views of the virtual space to a user. The virtual space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise virtual entities automatically controlled in the instance of the online game. Such virtual entities may not be associated with any user. As such, the automatically controlled virtual entities may be generated and/or developed by artificial intelligence configured with the server(s) 5102 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with the server 5102. As used herein, such automatically controlled virtual space entities in the instance of the online game are referred to as "non-player entities".

It should be understood the above description of the manner in which state of the virtual space associated with the online game as determined by game component 5112 is not intended to be limiting. The game component 5112 may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Within the instance of the online game executed by game component 5112, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

In any case, the user-controlled elements may move through and interact with the virtual space (e.g., non-player entities, elements controlled by other users and/or topography in the virtual space) associated with the online game. The elements controlled by a given user may be created and/or customized by the given user. The given user may have an "inventory" of virtual goods and/or currency usable within the virtual space.

Controls of virtual elements in the online game may be exercised through commands input by a given user through client computing platforms 5104. The given user may interact with other users through communications exchanged within the virtual space. Such communications may include one or more of textual chat, instant messages, private messages, voice communications, and/or other communications. Communications may be received and entered by the users via their respective client computing platforms 5104. Communications may be routed to and from the appropriate users through server(s) 5102 (e.g., through the game component 5112).

A given user may input commands with specific parameters to undertake specific deeds, actions, functions, spheres of actions and/or any other types of interactions within the virtual space. For example, controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via virtual reality 5104a platform, a given user may input a broader range of commands compared to those available on non-virtual reality platform 5104b. The input commands via the virtual reality platform 5104a may include the user performing the action as an input command. The user may also be able to look around and/or move about the virtual space in which the online game is played.

The game component 5112 may be configured to execute and/or perform user actions to facilitate participation of the users in the online game and/or with each other in response to receiving game commands input by the users. Execution and/or performance of the user action by the game component 5112 may produce changes to the game state, which may reflect progresses and/or results of the user actions. In some examples, state changes caused by the execution of the user actions may be recorded in the electronic storage 5110 to facilitate persistency throughout the instance of the online game. In some examples, execution of the user actions may not produce persistent changes to the game state (e.g., a user character jumping forward and backward successively may not produce any perceivable game state changes to other users).

Gameplay component 5114 may be configured to monitor gameplay by the users via the virtual reality platforms 5104a. Monitoring the gameplay of users may include tracking and/or storing game commands and/or information related to the game commands received from virtual reality platforms associated with the users. In some implementations, monitoring the gameplay may include monitoring an amount of gameplay via the virtual reality platform and/or the non-virtual reality platform associated with the user. For example, monitoring the gameplay by the first user may include monitoring an amount of gameplay by the first user via the first platform (e.g., a virtual reality platform).

The amount of gameplay may indicate an amount of time playing the game via a given platform. For example, the amount of gameplay may indicate an amount of time the first user has played the online game via the first platform. The amount of time may include a total amount of time or an amount of time per some defined segment of time or actions. For example, the amount of time may include one or more of a cumulative amount of time, an amount of time for a given period of time (e.g., hour(s), day(s), week(s), month(s), etc.), an amount of time per play session, an amount of time per level within the online game, an average amount of time, a frequency, and/or any other amount of time. By way of non-limiting example, an amount of gameplay may indicate that the user has played the online game via the virtual reality platform for 15 minutes on a given day.

By way of another non-limiting example, an amount of gameplay may indicate that the user has played the online game via the virtual reality platform twice a day on average over the past month (e.g., frequency).

In some implementations, the amount of gameplay may relate to a user's activity within the online game. For example, the amount of gameplay may describe an accomplishment or action within the online game that the user has performed and/or completed. The amount of gameplay may include one or more of a quantity of experience segments completed, a level achieved, a boss defeated, an amount of virtual items and/or resources used and/or obtained, an amount of stamina depleted and/or obtained, one or more actions performed, and/or other amounts of gameplay. Some online games may be segmented into experience segments. Experience segments may describe portions of the online game that may be completed and/or played by the users. Experience segments may, for example, include one or more of a game tile, game level, event, challenge, quest, nodes, mini-game, and/or other experience segment within the online game. By way of non-limiting example, the amount of gameplay may indicate that the user has completed one game tile via the virtual reality platform during their current game session. By way of another non-limiting example, the amount of gameplay may indicate that the user has participated in two mini-games via the virtual reality platform.

Gameplay component 5114 may be configured to monitor the amount of gameplay by a given user via a given platform continuously and/or in a re-occurring manner. In some implementations, gameplay component 5114 may be configured to monitory gameplay of the online game by the users via the non-virtual reality platforms. Gameplay via the non-virtual reality platforms may be monitored instead of or in addition to monitoring gameplay via the virtual reality platforms.

In some implementations, system 5100 may include user component 5116. User component 5116 may be configured to manage one or more user accounts associated with individual users of the online game. The user accounts managed by user component 5116 may include user information regarding the individual users of the online game. The user information may be stored in a network storage location such as the electronic storage 5110, and/or any other storage locations. User component 5116 may be configured to manage user accounts comprising user information regarding the users. The user information managed by user component 5116 and/or included in the user accounts may include gameplay information for the users. The gameplay information may be determined by gameplay component 5114 by monitoring gameplay by the users via the virtual reality platforms and/or the non-virtual reality platforms. The user information may include information reflecting a balance of stored consideration associated with the individual user usable in the given online game. The stored consideration may include, for example virtual currencies, real-world money, virtual objects, virtual resources, real-world objects (e.g., coupons) and/or any other stored consideration usable in the online game. Balances of such stored consideration may be maintained, modified, account, retrieved, tracked, and/or otherwise managed by the user component 5116. By way of non-limiting example, the user information in the user account associated with the user for the online game may reflect that the user has 50 gems (e.g., a virtual currency) in the online game; and/or the user information in the user account associated with the user for the online game may reflect that the user has earned 30 ores (e.g., a virtual currency) in online game via a virtual reality platform or a non-virtual reality platform.

The user information in the user account associated with the given user for the online game may include historic transaction information indicating previous spending by the user in the online game via a given platform. In some exemplary implementations, such historic transaction information may reflect various statistics and details about the individual spending by the user via individual ones of the virtual reality platform(s) and/or the non-virtual reality platform(s). Examples of such statistics may include a number of times a user spends virtual currency in exchange for virtual items (e.g., a number of transactions), a frequency of such spending by the user with in a time period of interest (e.g., past 24 hours, past week, past month, etc.), a spend velocity (e.g., rate of spending), and/or any other statistics.

Platform component 5118 may be configured to limit gameplay of the online via the virtual reality platforms. Gameplay via the virtual reality platforms may be limited responsive to the amount of gameplay determined by gameplay component 5114, reaching a gameplay threshold. Limiting gameplay via the virtual reality platform may include restricting access to the online game via the virtual reality platform. Access to the online game through the virtual reality platform may be restricted for a given user based on the given user reaching a gameplay threshold. The access via the virtual reality platform associated with the user may be restricted until a requirement is satisfied. As such, for example, responsive to the amount of gameplay by the first user via the first platform (e.g., the virtual reality platform) reaching a gameplay threshold, access to the online game through the first platform may be restricted for the first user.

The gameplay threshold may be a limit on the amount of gameplay a user may participate in via a given platform (e.g., the virtual reality platform or the non-virtual reality platform) for a given period of time and/or segment of the online game. The gameplay threshold may indicate an amount of time playing the game via the given platform that a given user may play for a given period of time and/or segment of the online game prior to the virtual reality platform being restricted. In some implementations, the gameplay threshold may indicate an amount of activity a user may have within the online game via the given platform before the virtual reality platform is restricted. The gameplay threshold may be a value, outcome, achievement, action, quantity, and/or other threshold. The gameplay threshold may be reached responsive to the amount of gameplay reaching and/or breaching the threshold value, outcome, achievement, action, and/or quantity.

By way of non-limiting example, the gameplay threshold may indicate that a user is able to play up to 3 game tiles and/or quests per gaming session via the virtual reality platform. Once the user initiates gameplay on their third gameplay tile via the virtual reality platform, the gameplay threshold may be reached. By way of another non-limiting example, that gameplay threshold may indicate that a user is able to play the online game via the virtual reality platform for an hour a day. Once the user has played the online game for 60 minutes in any given day via the virtual reality platform, the gameplay threshold may be reached. The gameplay threshold may limit the virtual reality experiences of a user such that the user may be enticed to play the online game via other platforms.

In some implementations, platform component 5118 may be configured to determine the gameplay threshold. The gameplay threshold may be determined based on one or more of input and/or selection by the online game provider;

the gameplay of the online game via the virtual reality platform and/or the non-virtual reality platform monitored by gameplay component 5114, an economic valuation determined for a given user, spending of a given user in the online game, and/or other information.

Platform component 5118 may be configured to limit access to the online game through one or more of the virtual reality platforms and/or the non-virtual reality platforms. Limiting access to the online game via a given platform may include ceasing to provide the online game and/or present views of the online game to the user via the given platform, not performing operations in the game instance in response to commands received from the given platform, providing a notification of a requirement that must be satisfied to further access the game via the given platform, and/or otherwise limiting access to the online game via the given platform once the gameplay threshold has been reached and/or breached. In some implementations, access via a given platform may be limited in a manner such that the user can still interact with the online game and/or virtual space but their interactions will not be reflected in the instance of the online game and/or will not progress the user along any skill tree associated with the online game. Access to the online game via a given platform may or may not be limited immediately responsive to the gameplay threshold being reached. For example, access to the online game via the given platform may be limited after the user completes their present segment of the online game and/or reaches a breaking point.

Platform component 5118 may limit gameplay of the online game via the virtual reality platform(s). Access to the online game through the virtual reality platform(s) and/or another platform may be restricted for one of more users until a requirement is satisfied. For example, access to the online game through the first platform may be restricted for the first user until a first requirement is satisfied. Platform component may communicate with requirement component 5120 in order to determine whether the requirement has been satisfied. Responsive to a determination that the requirement has been satisfied by the user, access to the online game through the first platform may be enabled (e.g., re-enabled) for the first user.

Platform component 5118 may enable the user to play the online game via another platform when access to the online game via a given platform is limited and/or while the requirement is unsatisfied. For example, the users may be able to play the online game via the non-virtual reality platforms while the gameplay of the online game via the virtual reality platforms is restricted. As such, the first user may be able to play the online game via the second platform while the first requirement is unsatisfied. Limiting gameplay of the online game via the virtual reality platforms until a requirement is satisfied, but still allowing/enabling gameplay of the online game via the non-virtual reality platforms while the requirement is unsatisfied may encourage users to participate in the online game via the non-virtual reality platforms. As such, system 5100 may encourage a balance between virtual reality gameplay and non-virtual reality gameplay by the users.

In some implementations, the first requirement may be a requirement that must be satisfied by the user via the non-virtual reality platform. For example, the first user may have to play the online game and/or perform one or more actions within the online game via the second platform (e.g., the non-virtual reality platform) in order to regain access to the online game via the first platform (e.g., the virtual reality platform).

By way of non-limiting example, the requirement may be to either wait for 30 minutes or pay 30 gems, wherein performance of either would satisfy the requirement. By way of another non-limiting example, the requirement may include a wait period of one hour wherein the user has an option to reduce the requirement to a wait period of 10 minutes by paying 20 gems. By way of another non-limiting example, the requirement may be to play a game time (e.g., an experience segment) of the online game via the non-virtual reality platform.

Responsive to the first user satisfying the first requirement, access to the online game through the first platform (e.g., virtual reality platform) may be enabled for the first user. As such, the first user may play the online game via the first platform until a given amount of gameplay reaches a given gameplay threshold. Responsive to the given amount of gameplay reaching the given threshold, access to the online game through the first platform may be restricted until the given requirement is satisfied. Enabling and restricting access to the online game via the virtual reality platform may be performed in a continuous and/or ongoing manner as set forth herein.

In some implementations, requirement component 5120 may be configured to determine the requirement based on the amount of gameplay by the user via the virtual reality platform and/or the non-virtual reality platform. As such, requirement component 120 may be configured to determine the first requirement based on one or both of the amount of gameplay by the first user via the first platform, and the second amount of gameplay by the first user via the second platform. By way of non-limiting example, if the amount of gameplay via the virtual reality platform and the second amount of gameplay via the non-virtual reality platform indicates the user plays the online game for an hour a week, the requirement determined may be a 5 minute waiting period. In comparison, if the amount of gameplay via the virtual reality platform and the second amount of gameplay via the non-virtual reality platform indicates the user plays the online game for 6 hours a week, the requirement determined may be a 20 minute waiting period.

Requirement component 5120 may be configured to determine whether the requirement (e.g., the first requirement) has been satisfied by the user (e.g., the first user). Requirement component 5120 may determine whether the requirement has been satisfied by the user based on the user's gameplay monitored by gameplay component 5114.

Notification component 5122 may be configured to effectuate presentation of a notification to a user via a given platform. The notification presented may indicate that the gameplay threshold has been reached. In some implementations, the notification may indicate a requirement that must be satisfied in order to regain access to the online game via the virtual reality platform. For example, the notification may indicate the first requirement to the first user via the first platform (e.g., virtual reality platform). In some implementations, notification component 5122 may be configured to determine and/or present one or more offers and/or options for satisfying a given requirement (e.g., such that a user may be able to re-access the game via the virtual reality platform). The notification may include the one or more offers and/or options for satisfying the given requirement. The offers may include user selection options to satisfy the given requirement. For example, if the requirement is to pay 100 gems, the offer may include a button enabling the user to select and pay 100 gems to satisfy the requirement. The options may include one or more requirements from which the user may choose in order to satisfy the requirement. By way of non-limiting example, the requirement may include a wait period of 30 minutes required before a user can access the online game via the virtual reality platform, or a payment of 50 gems. The notification may indicate the wait period of 30 minutes and/or the option and/or offer to pay 50 gems. The notification may be presented to the user via the virtual reality platform and/or the non-virtual reality platform.

Figure 16:
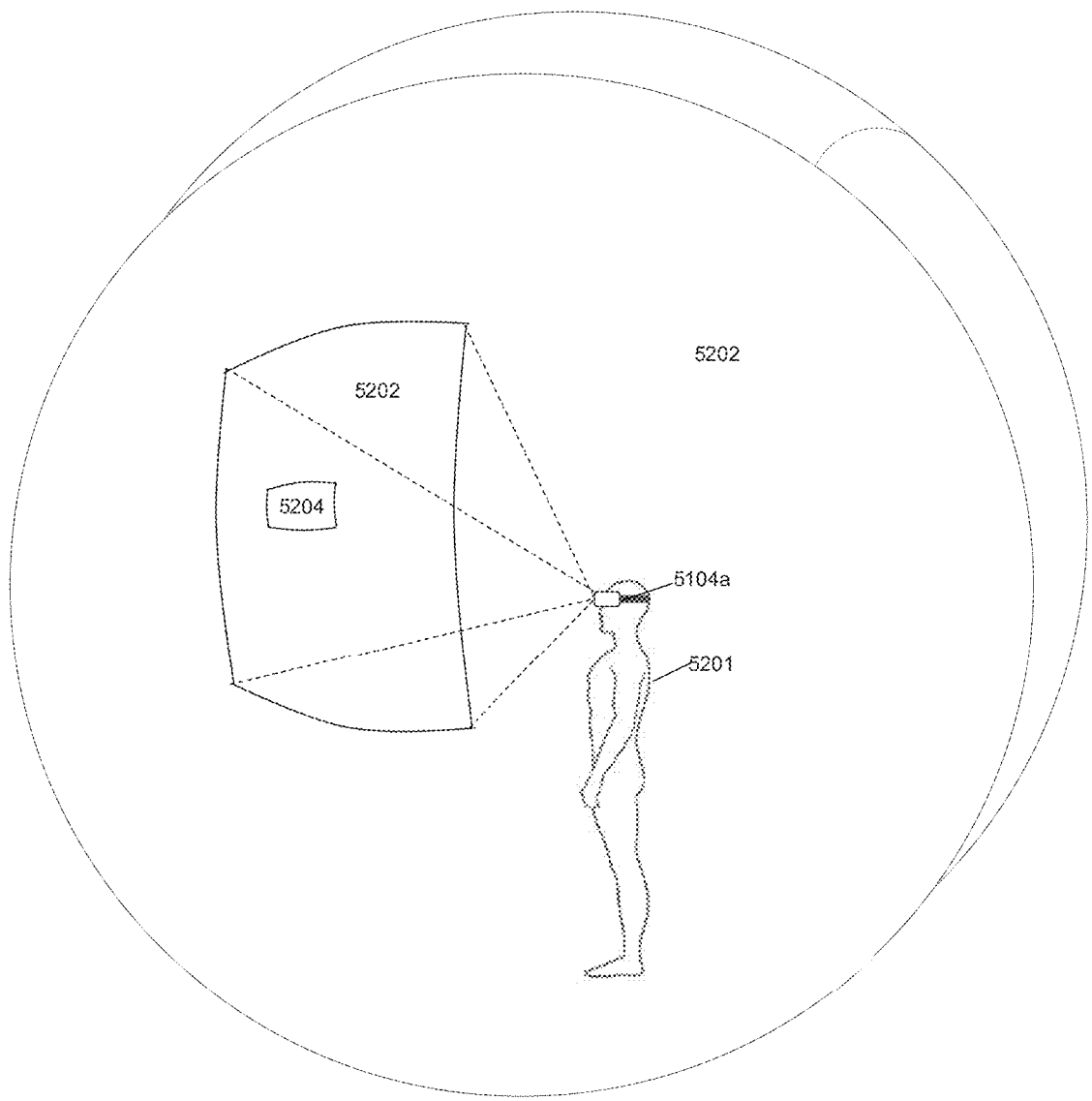
FIG. 16 illustrates a user playing the online game via a virtual reality platform, in accordance with one or more implementations

FIG. 16 depicts a user 5201 playing the online game via a virtual reality platform 5104a. Views 5202 of the online game may be presented such that user 5201 is immersed within the virtual space in which the online game is played. Responsive to user 5201 reaching a given amount of gameplay via the virtual reality platform 5200, access to the online game via virtual reality platform 5104a may be restricted for user 5201 until a requirement is satisfied. Notification 5204 may indicate the requirement that user 5201 must perform in order to regain access to the online game via the virtual reality platform 5200. Notification 5204 may be presented to user 5201 via virtual reality platform 5200. In some implementations, notification 5204 may include one or more options and/or offers for satisfying the requirement.

Figure 17:
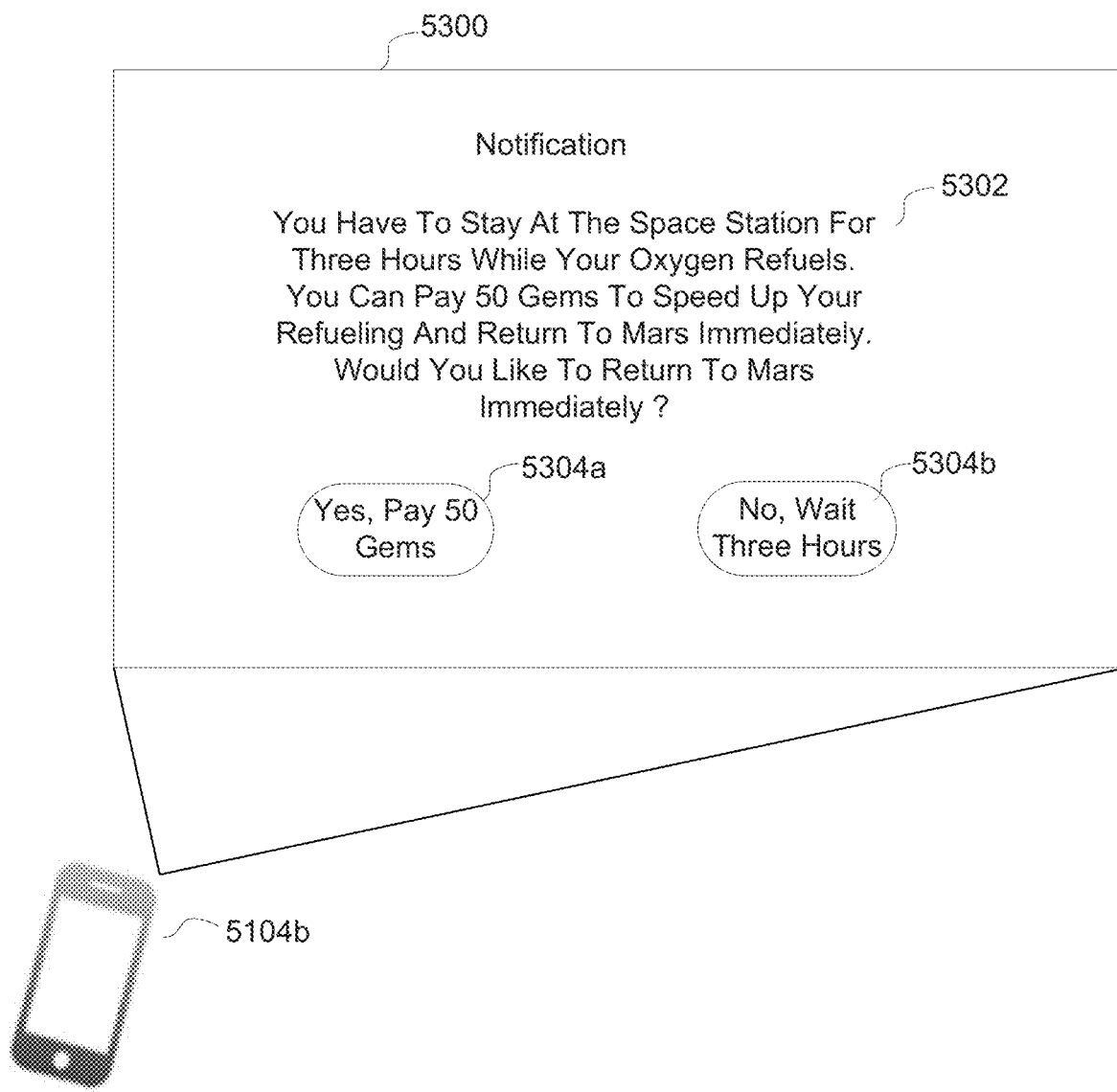
FIG. 17 illustrates an exemplary notification that includes an indication of the requirement that must be performed in order for the user to return to the virtual reality platform, in accordance with one or more implementations.

FIG. 17 depicts an exemplary notification 5300 that includes an indication 5302 of the requirement that must be performed in order for the user to return to the virtual reality platform. Notification 5300 may include options 5304. The user may perform either one of options 5304 to satisfy the requirement. Option 5304a may include an offer to "Pay 50. Gems." Responsive to the user selecting option 5304a, 50 gems may be deducted from an inventory of virtual items (e.g., including virtual currency) associated with the user. Selecting option 5304a and paying 50 gems may immediately satisfy the requirement such that access to the online game via the virtual reality platform may no longer be restricted. Selecting option 5304b may return the user to the online game played via the non-virtual reality platform 5104. Selecting option 5304b, waiting for three hours, and/or playing the online game via the non-virtual reality platform until 3 hours has passed, may satisfy the requirement.

Returning to FIG. 15, the client computing platform(s) 5104 may include one or more processors, memory, display devices, head-mounted display devices, sensors, and/or any other components. The processor(s) may be configured to execute machine-readable instructions to launch and/or implement one or more client game applications associated with the online games. In some implementations, the machine-readable instructions may cause the processors of one of more client computing platforms to perform functionality the same as or similar to the functionality performed by one or more components of system 5100.

The client computing platform(s) 5104 may be configured to: present a graphical representation of the virtual space (e.g., a virtual reality representation and/or a non-virtual reality representation) corresponding to a given online game; provide controls and/or sense input commands enabling the given user to maneuver virtual items, initiate actions, and/or purchase virtual item(s) usable in the online game(s) within the virtual space associated with the online game; determine information for implementing game interfaces for the online game(s) hosted by system 5100; obtain state information regarding a given online game hosted by the system 5100; determine view information (e.g., a view point, field of view, eye/head movement, and/or location) of the user at a given time; determine a level of rendering of a scene in the online game based on the state information and view information; determining one or more action menus for presentation to the user in the game interface; facilitate interaction by the given user in the online game(s) and/or interaction with other users; communicate with sever(s) 5102 (e.g., receive and/or transmitting information to/from servers 5102); and/or provide any other functionality. In some implementations, client computing platform 5104 may be a virtual reality platform and/or a non-virtual reality platform. Client computing platform 5104 may be configured to communicate with, transmit information to, and/or receive information from one or more of servers 5102, and/or other components of system 5100.

The server(s) 5102, client computing platform(s) 5104, and/or external resources 5106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 5102, client computing platforms 5104, and/or external resources 5106 may be operatively linked via some other communication media.

A given client computing platform 5104 may include one or more processors configured to execute computer program components. The computer program components may be configured to enable an expert or user associated with the given client computing platform 5104 to interface with system 5100 and/or external resources 5106, and/or provide other functionality attributed herein to client computing platforms 5104. By way of non-limiting example, the given client computing platform 5104 may include one or more of a virtual reality system, a head-mounted virtual reality display, desktop computer, a laptop computer, a handheld computer, a tablet computing platform, a NetBook, a Smartphone, a gaming console, and/or other computing platforms.

The external resources 5106 may include sources of information, hosts and/or providers of virtual environments outside of system 5100, external entities participating with system 5100, and/or other resources. In some implementations, some or all of the functionality attributed herein to external resources 5106 may be provided by resources included in system 5100.

The server(s) 5102 may include electronic storage 5110, one or more processors 108, and/or other components. The server(s) 5102 may include communication lines, or ports to enable the exchange of information with a network and/or other computing platforms. Illustration of server(s) 5102 in FIG. 15 is not intended to be limiting. The server(s) 5102 may include a plurality of hardware, software, and/or firmware components operating together to provide the functionality attributed herein to server(s) 5102. For example, server(s) 5102 may be implemented by a cloud of computing platforms operating together as server(s) 5102.

Electronic storage 5110 may comprise electronic storage media that electronically stores information. The electronic storage media of electronic storage 5110 may include one or both of system storage that is provided integrally (i.e., substantially non-removable) with server(s) 5102 and/or removable storage that is removably connectable to server(s) 5102 via, for example, a port (e.g., a USB port, a FireWire port, etc.) or a drive (e.g., a disk drive, etc.). Electronic storage 5110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Electronic storage 5110 may include one or more virtual storage resources (e.g., cloud storage, a virtual private network, and/or other virtual storage resources). Electronic storage 5110 may store software algorithms, information determined by processor 108, information received from server(s) 5102, information received from client computing platforms 5104, and/or other information that enables server(s) 5102 to function as described herein.

Processor(s) 5108 is configured to provide information processing capabilities in server(s) 5102. As such, processor 5108 may include one or more of a digital processor, an analog processor, a digital circuit designed to process information, an analog circuit designed to process information, a state machine, and/or other mechanisms for electronically processing information. Although processor 5108 is shown in FIG. 15 as a single entity, this is for illustrative purposes only. In some implementations, processor 5108 may include a plurality of processing units. These processing units may be physically located within the same device, or processor 5108 may represent processing functionality of a plurality of devices operating in coordination. The processor 108 may be configured to execute components 5112, 5114, 5116, 5118, 5120, 5122. Processor 5108 may be configured to execute components 5112, 5114, 5116, 5118, 5120, 5122 by software; hardware; firmware; some combination of software, hardware, and/or firmware; and/or other mechanisms for configuring processing capabilities on processor 5108.

It should be appreciated that although components 5112, 5114, 5116, 5118, 5120, 5122 are illustrated herein as being co-located within a single processing unit, in some other implementations, one or more of components 5112, 5114, 5116, 5118, 5120, 5122 may be located remotely from the other components. The description of the functionality provided by the different components 5112, 5114, 5116, 5118, 5120, 5122 described below is for illustrative purposes, and is not intended to be limiting, as any of components 5112, 5114, 5116, 5118, 5120, 5122 may provide more or less functionality than is described. For example, one or more of components 5112, 5114, 5116, 5118, 5120, 5122 may be eliminated, and some or all of its functionality may be provided by other ones of components 5112, 5114, 5116, 5118, 5120, 5122. As another example, processor 5108 may be configured to execute one or more additional components that may perform some or all of the functionality attributed below to one of components 5112, 5114, 5116, 5118, 5120, 5122.

Figure 18:
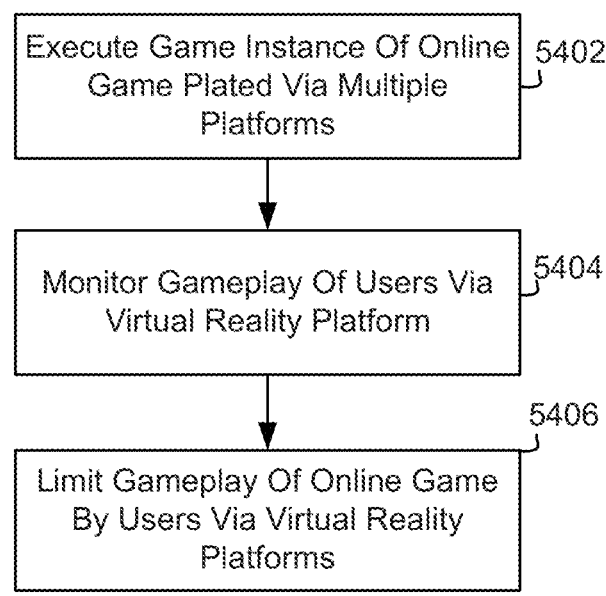
FIG. 18 illustrates a method for making game content from a single online game accessible to users via multiple platforms

FIG. 18 illustrates a method for making game content from a single online game accessible to users via multiple platforms, in accordance with one or more implementations. The operations of method 5400 presented below are intended to be illustrative. In some embodiments, method 5400 may be accomplished with one or more additional operations not described, and/or without one or more of the operations discussed. Additionally, the order in which the operations of method 5400 illustrated in FIG. 18 and described below is not intended to be limiting.

In some embodiments, method 5400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 5400 in response to instructions stored electronically on an electronic storage medium. The one or more processing devices may include one or more devices configured through hardware, firmware, and/ or software to be specifically designed for execution of one or more of the operations of method 5400.

At an operation 5402, a game instance of the online game played via multiple platforms may be executed. The game instance may be used to generate game state information that is transmitted to client computing platforms over a network. The game state information may facilitate presentation of views of the online game to the users via the client computing platforms. Execution of the game instance further enables interaction by the users with the online game and/or each other by performing operations in the game instance in response to commands received over the network from the client computing platforms. The client computing platforms may include virtual reality platforms and non-virtual reality platforms. The virtual reality platforms may include a first platform associated with a first user. The non-virtual reality platforms may include a second platform associated with the first user. In some implementations, operation 5402 may be performed by a game component the same as or similar to game component 5112 (shown in FIG. 15 and described herein).

At an operation 5404, gameplay of the online game by the users via the virtual reality platforms may be monitored. Monitoring the gameplay by the first user may include monitoring an amount of gameplay by the first user via the first platform. In some implementations, operation 5404 may be performed by a gameplay component the same as or similar to gameplay component 5114 (shown in FIG. 15 and described herein).

At operation 5406, gameplay of the online game via the virtual reality platforms may be limited. Responsive to the amount of gameplay by the first user reaching a gameplay threshold, access to the online game through the first platform may be restricted for the first user. Access may be restricted for the first user until a first requirement is satisfied. The users may be able to play the online game via the non-virtual reality platforms while the gameplay of the online game via the virtual reality platforms is restricted. As such, the first user may be able to play the online game via the second platform while the first requirement is unsatisfied. In some implementations, operation 5406 may be performed by a platform component and/or a requirement component the same as or similar to platform component 116 and/or requirement component 5118 (shown in FIG. 15 and described herein).

A system and method that makes game content from a single online game accessible to users via multiple platforms. The multiple platforms may include virtual reality platforms and non-virtual reality platforms. Amounts of gameplay of the online game by the users via the virtual reality platforms may be monitored. The gameplay of the online game via the virtual reality platforms may be limited. As such, responsive to the amounts of gameplay by the users reaching gameplay thresholds, access to the online game through the first platform is restricted for the users until corresponding requirements are satisfied. The users may be able to play the online game via the non-virtual reality platforms while the gameplay of the online game via the virtual reality platforms is restricted.

In some embodiments, a system that makes game content from a single online game accessible to users via multiple platforms, the system comprising: one or more physical computer processors configured by machine readable instructions to: execute a game instance of the online game played via multiple platforms, and use the game instance to generate game state information that is transmitted to client computing platforms over a network, the game state information facilitating presentation of views of the online game to the users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform associated with a first user and the non-virtual reality platforms including a second platform associated with the first user; monitor gameplay of the online game by the users via the virtual reality platforms, wherein monitoring the gameplay by the first user includes monitoring an amount of gameplay by the first user via the first platform; limit gameplay of the online game via the virtual reality platforms such that, responsive to the amount of gameplay by the first user reaching a gameplay threshold, access to the online game through the first platform is restricted for the first user until a first requirement is satisfied; wherein, the users are able to play the online game via the non-virtual reality platforms while the gameplay of the online game via the virtual reality platforms is restricted such that the first user is able to play the online game via the second platform while the first requirement is unsatisfied. In some embodiments, the system as described above, wherein the first requirement includes one or more of waiting a period of time, paying an amount of virtual currency, paying an amount of real currency, achieving a given level within the online game, obtaining one or more virtual items and/or resources within the online game, rebuilding or reviving one or more virtual items and/or resources within the online game, rebuilding stamina, and/or performing one or more given actions within the online game via the second platform. In some embodiments, the system as described above, wherein the one or more physical computer processors configured by machine readable instructions may also be configured to: monitor gameplay of the online game by the users via the non-virtual reality platforms, wherein monitoring the gameplay by the first user includes monitoring a second amount of gameplay by the first user via the second platform; determine the first requirement based on one or both of the amount of gameplay by the first user via the first platform and the second amount of gameplay by the first user via the second platform. In some embodiments, the system as described above, wherein the amount of gameplay indicates an amount of time playing the game via the first platform, the amount of time including one or more of a cumulative amount of time, an amount of time for a given period of time, an amount of time per play session, an amount of time per level within the online game, an average amount of time, and/or a frequency. In some embodiments, the system as described above, wherein the amount of gameplay relates to the first user's activity within the online game such that the amount of gameplay includes one or more of a quantity of experience segments completed, a level achieved, a boss defeated, an amount of virtual items and/or resources used and/or obtained, an amount of stamina depleted and/or obtained, and/or one or more actions performed. In some embodiments, the system as described above, wherein the one or more physical computer processors are further configured by machine-readable instructions to: transmit the game state information over the network causing the first platform to present the views of the online game to the first user via a headset display device associated with the first platform that causes simulated immersion of the first user in the views of online game. In some embodiments, the system as described above, wherein different but related game content is provided to the users via the non-virtual reality platforms compared to the virtual reality platforms, such that first game content is provided to the first user via the first platform and second game content is provided to the first user via the second platform, wherein the second game content is different than the first game content but related to the first game content. In some embodiments, the system as described above, wherein the one or more processors are further configured by machine-readable instructions to: monitor gameplay of the online game by the users via the non-virtual reality platforms, including monitoring the gameplay by the first user via the second platform; determine whether the first requirement has been satisfied by the first user; and enable, responsive to a determination that the first requirement has been satisfied by the first user, access to the online game through the first platform for the first user. In some embodiments, the system as described above, wherein the one or more processors are further configured by machine-readable instructions to: limit gameplay of the online game by the first user via the first platform such that, responsive to a second amount of gameplay by the first user reaching a second gameplay threshold, access to the online game through the first platform is restricted for the first user until a second requirement is satisfied. In some embodiments, the system as described above, wherein the one or more processors are further configured by machine-readable instructions to: effectuate presentation of a notification indicating the first requirement to the first user via the first platform.

In some embodiments, a method that makes game content from a single online game accessible to users via multiple platforms, the method being implemented by a computer system including one or more physical processors configured by machine readable instructions, the method comprising: executing a game instance of the online game played via multiple platforms, and use the game instance to generate game state information that is transmitted to client computing platforms over a network, the game state information facilitating presentation of views of the online game to the users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform associated with a first user and the non-virtual reality platforms including a second platform associated with the first user; monitoring gameplay of the online game by the users via the virtual reality platforms, wherein monitoring the gameplay by the first user includes monitoring an amount of gameplay by the first user via the first platform; limiting gameplay of the online game via the virtual reality platforms such that, responsive to the amount of gameplay by the first user reaching a gameplay threshold, access to the online game through the first platform is restricted for the first user until a first requirement is satisfied; wherein, the users are able to play the online game via the non-virtual reality platforms while the gameplay of the online game via the virtual reality platforms is restricted such that the first user is able to play the online game via the second platform while the first requirement is unsatisfied. In some embodiments, the method as described above, wherein the first requirement includes one or more of waiting a period of time, paying an amount of virtual currency, paying an amount of real currency, achieving a given level within the online game, obtaining one or more virtual items and/or resources within the online game, rebuilding or reviving one or more virtual items and/or resources within the online game, rebuilding stamina, and/or performing one or more actions within the online game via the second platform. In some embodiments, the method as described above, further comprising: monitoring gameplay of the online game by the users via the non-virtual reality platforms, wherein monitoring the gameplay by the first user includes monitoring a second amount of gameplay by the first user via the second platform; determining the first requirement based on one or both of the amount of gameplay by the first user via the first platform and the second amount of gameplay by the first user via the second platform. In some embodiments, the method as described above, wherein the amount of gameplay indicates an amount of time playing the game via the first platform, the amount of time including one or more of a cumulative amount of time, an amount of time for a given period of time, an amount of time per play session, an amount of time per level within the online game, an average amount of time, and/or a frequency. In some embodiments, the method as described above, wherein the amount of gameplay relates to the first user's activity within the online game such that the amount of gameplay includes one or more of a quantity of experience segments completed, a level achieved, a boss defeated, an amount of virtual items and/or resources used and/or obtained, an amount of stamina depleted and/or obtained, and/or one or more actions performed. In some embodiments, the method as described above, further comprising: transmitting the game state information over the network causing the first platform to present the views of the online game to the first user via a headset display device associated with the first platform that causes simulated immersion of the first user in the views of online game. In some embodiments, the method as described above, wherein different but related game content is provided to the users via the non-virtual reality platforms compared to the virtual reality platforms, such that first game content is provided to the first user via the first platform and second game content is provided to the first user via the second platform, wherein the second game content is different than the first game content but related to the first game content. In some embodiments, the method as described above, further comprising: monitoring gameplay of the online game by the users via the non-virtual reality platforms, including monitoring the gameplay by the first user via the second platform; determining whether the first requirement has been satisfied by the first user; and enabling, responsive to a determination that the first requirement has been satisfied by the first user, access to the online game through the first platform for the first user. In some embodiments, the method as described above, further comprising: limiting gameplay of the online game by the first user via the first platform such that, responsive to a second amount of gameplay by the first user reaching a second gameplay threshold, access to the online game through the first platform is restricted for the first user until a second requirement is satisfied. In some embodiments, the method as described above, further comprising: effectuating presentation of a notification indicating the first requirement to the first user via the first platform.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system comprising:
one or more physical computer processors configured by machine-readable instructions to:
execute a game instance of an online game played via multiple platforms, and use the game instance to generate game state information that is transmitted to user devices over a network, the game state information facilitating presentation of views of the online game to the user devices, wherein execution of the game instance further enables interaction by the user devices with the online game or other user devices by performing operations in the game instance in response to commands received over the network from the user devices, wherein the user devices include virtual reality platforms and non-virtual reality platforms, the virtual reality platforms including a first platform associated with a first user account and the non-virtual reality platforms including a second platform associated with the first user account;
determine user value metrics for the virtual reality platforms and the non-virtual reality platforms, wherein a first user value metric associated with the first platform and a second user value metric associated with the second platform are determined based on a first user profile that includes information that describes interaction with the online game through the first platform and the second platform;
determine one or more platform specific online game customizations for the online game when played via the virtual reality platforms or the non-virtual reality platforms based on the user value metrics determined for the user devices, wherein a first game customization is determined for a selected platform of the first platform or the second platform based on a comparison of the first user value metric and the second user value metric; and
based on a determination that the online game is being played via the selected platform by the first user account, implement the first game customization that customizes one or more aspects of the online game when played via the selected platform by the first user account, wherein the first game customization is configured to increase or decrease an associated difficulty of the online game in comparison to when the online game is played via a non-customized platform.

2. The system of claim 1, wherein the one or more physical computer processors are further configured by machine-readable instructions to:
transmit the game state information over the network causing the first platform to present the views of the online game via a headset display device associated with the first platform.

3. The system of claim 1, wherein the user value metrics include spend parameters that indicate spending in the online game by each of the user devices on the virtual reality platforms and the non-virtual reality platforms, such that a first spend parameter indicating spending in the online game on the first platform and a second spend parameter indicating spending in the online game on the second platform, are determined.

4. The system of claim 3, wherein the spend parameters obtained include one or more of an amount of currency spent during a period of time, a total amount of currency spent, a spend velocity, an average amount of currency spent, or a spend frequency.

5. The system of claim 1, wherein the first user profile includes payment information such that the user value metrics indicate whether the user devices have established a method of payment in one or more of the virtual reality platforms or the non-virtual reality platforms.

6. The system of claim 1, wherein the one or more processors are further configured by machine-readable instructions to:

effectuate presentation of a customization notification including information indicating the first game customization via the selected platform such that the selected platform is notified that the first game customization is configured to impact gameplay of the online game when played via the selected platform, but not when played via a non-customized platform.

7. The system of claim 1, wherein the selected platform is not made aware of the first game customization or that the first game customization is configured to impact gameplay of the online game when played via the selected platform, but not when played via a non-customized platform.

8. The system of claim 1, wherein the one or more aspects of the online game that are customized by the first game customization include one or more of: a reward, a strength or power of one or more user characters, a spawn rate or recovery rate of one or more user characters, power of attacks, resistance to attacks, speed or responsiveness of controlled units, a quality or effectiveness of virtual items, a quantity of available virtual items, wait periods associated with one or more actions, or availability of user actions.

9. The system of claim 1, wherein the one or more processors are further configured by machine-readable instructions to:

monitor interactions with the online game through the virtual reality platforms and the non-virtual reality platforms such that interaction with the online game through the selected platform is monitored.

10. The system of claim 9, wherein the one or more processors are further configured by machine-readable instructions to:

manage user profiles that include information related to participating in the online game through the virtual reality platforms and the non-virtual reality platforms such that the information is based on the monitored interactions and the user profiles including the first user profile.

11. A computer-implemented method that determines and implements platform specific online game customizations, the method being implemented by a computer system including one or more physical processors configured by machine-readable instructions, the method comprising:

executing a game instance of an online game played via multiple platforms, and use the game instance to generate game state information that is transmitted to client computing platforms over a network, the game state information facilitating presentation of views of the online game to user devices, wherein execution of the game instance further enables interaction by the user devices with the online game or other user devices by performing operations in the game instance in response to commands received over the network from the user devices, wherein the user devices include virtual reality platforms and non-virtual reality platforms, the virtual reality platforms including a first platform associated with a first user account and the non-virtual reality platforms including a second platform associated with the first user account;

determining user value metrics for the virtual reality platforms and the non-virtual reality platforms, wherein a first user value metric associated with the first platform and a second user value metric associated with the second platform are determined based on a first user profile that includes information that describes interaction with the online game through the first platform and the second platform;

determining one or more platform specific online game customizations for the online game when played via the virtual reality platforms or the non-virtual reality platforms based on the user value metrics determined for the user devices, wherein a first game customization is determined for a selected platform of the first platform or the second platform based on a comparison of the first user value metric and the second user value metric; and based on a determination that the online game is being played via the selected platform by the first user account, implementing the first game customization that customizes one or more aspects of the online game when played via the selected platform by the first user account, wherein the first game customization is configured to increase or decrease an associated difficulty of the online game in comparison to when the online game is played via a non-customized platform.

12. The computer-implemented method of claim 11, further comprising:

transmitting the game state information over the network causing the first platform to present the views of the online game via a headset display device associated with the first platform.

13. The computer-implemented method of claim 11, wherein the user value metrics include spend parameters that indicate spending in the online game by each of the user devices on the virtual reality platforms and the non-virtual reality platforms, such that a first spend parameter indicating spending in the online game on the first platform and a second spend parameter indicating spending in the online game on the second platform, are determined.

14. The computer-implemented method of claim 13, wherein the spend parameters obtained include one or more of an amount of currency spent during a period of time, a total amount of currency spent, a spend velocity, an average amount of currency spent, or a spend frequency.

15. The computer-implemented method of claim 11, wherein the first user profile includes payment information such that the user value metrics indicate whether the user devices have established a method of payment in one or more of the virtual reality platforms or the non-virtual reality platforms.

16. The computer-implemented method of claim 11, further comprising:

effectuating presentation of a customization notification including information indicating the first game customization via the selected platform such that the selected platform is notified that the first game customization is configured to impact gameplay of the online game when played via the selected platform, but not when played via a non-customized platform.

17. The computer-implemented method of claim 11, wherein the selected platform is not made aware of the first game customization or that the first game customization is configured to impact gameplay of the online game when played via the selected platform, but not when played via a non-customized platform.

18. The computer-implemented method of claim 11, wherein the one or more aspects of the online game that are customized by the first game customization include one or more of: a reward, a strength or power of one or more user characters, a spawn rate or recovery rate of one or more user characters, power of attacks, resistance to attacks, speed or responsiveness of controlled units, a quality or effectiveness of virtual items, a quantity of available virtual items, wait periods associated with one or more actions, or availability of user actions.

19. The computer-implemented method of claim 11, further comprising:
    monitoring interactions with the online game through the virtual reality platforms and the non-virtual reality platforms such that interaction with the online game through the selected platform is monitored.

20. The computer-implemented method of claim 19, further comprising:
    managing user profiles that include information related to participating in the online game through the virtual reality platforms and the non-virtual reality platforms such that the information is based on the monitored interactions and the user profiles including the first user profile.

* * * * *